US009174483B2

(12) United States Patent
Ridless et al.

(10) Patent No.: US 9,174,483 B2
(45) **Date of Patent: *Nov. 3, 2015**

(54) IMAGE DISPLAY

(71) Applicant: CIRCLE GRAPHICS, INC., Longmont, CO (US)

(72) Inventors: Hank B. Ridless, Boulder, CO (US); Evan D. Brooks, Boulder, CO (US); Keith E. Freebern, Boulder, CO (US)

(73) Assignee: Circle Graphics, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,755

(22) Filed: Oct. 31, 2012

(65) Prior Publication Data

US 2013/0059126 A1 Mar. 7, 2013

Related U.S. Application Data

(63) Continuation of application No. 13/304,303, filed on Nov. 23, 2011, now Pat. No. 8,959,812.

(60) Provisional application No. 61/521,749, filed on Aug. 9, 2011, provisional application No. 61/416,719, filed on Nov. 23, 2010.

(51) Int. Cl.
*G06F 1/06* (2006.01)
*B44C 5/02* (2006.01)
(Continued)

(52) U.S. Cl.
CPC . *B44C 5/02* (2013.01); *A47G 1/141* (2013.01); *B41M 5/52* (2013.01); *B44D 3/185* (2013.01); *B44F 11/02* (2013.01); *A47G 2001/0661* (2013.01); *G09F 1/06* (2013.01);
(Continued)

(58) Field of Classification Search
USPC .................................... 40/768, 780, 781, 788
See application file for complete search history.

(56) References Cited

U.S. PATENT DOCUMENTS

| | | | |
|---|---|---|---|
| 1,596,091 | A | 8/1926 | Fowler |
| 1,986,674 | A | 1/1935 | Gernandt |

(Continued)

FOREIGN PATENT DOCUMENTS

| | | |
|---|---|---|
| DE | 2524251 | 12/1976 |
| DE | 91/12606 | 8/1991 |

(Continued)

OTHER PUBLICATIONS

"International Search Report dated Jun. 26, 2012", International Search Report issued on PCT Application Serial No. PCT/US2011/062145, McKesson Reference, Jun. 26, 2012, 1-12.

(Continued)

*Primary Examiner* — Shin Kim
(74) *Attorney, Agent, or Firm* — Intellectual Innovations Legal Advisors

(57) ABSTRACT

An image display including an image substrate and a support structure. The image substrate has an image printed on a first surface. The support structure can include a front sheet, a back sheet and a plurality of side strips secured between the front sheet and the back sheet for forming a closed support structure. An internal support can be provided in an internal cavity of the support structure for enhancing the rigidity of the support structure. The image substrate can be adhered to an external surface of the front sheet so that the front sheet forms a rigid backing for the image substrate. A variety of image substrates are provided.

35 Claims, 21 Drawing Sheets

(51) Int. Cl.

| | |
|---|---|
| ***A47G 1/14*** | (2006.01) |
| ***B41M 5/52*** | (2006.01) |
| ***B44D 3/18*** | (2006.01) |
| ***B44F 11/02*** | (2006.01) |
| *G09F 1/06* | (2006.01) |
| *A47G 1/06* | (2006.01) |

(52) U.S. Cl.
CPC ..... *Y10T 156/1031* (2015.01); *Y10T 156/1039* (2015.01); *Y10T 428/24636* (2015.01)

(56) References Cited

U.S. PATENT DOCUMENTS

| | | | | |
|---|---|---|---|---|
| 2,085,097 | A | 6/1937 | Hansen | |
| 2,144,594 | A | 1/1939 | Katz | |
| RE22,683 | E | 10/1945 | Piper | |
| 2,470,416 | A | 5/1949 | Silver | |
| 2,660,825 | A | 12/1953 | Howard | |
| 2,950,556 | A | 8/1960 | Larios | |
| 3,024,553 | A | 3/1962 | Rowley | |
| 3,214,855 | A | 11/1965 | Winkler et al. | |
| 3,286,387 | A | 11/1966 | Poertner | |
| 3,346,105 | A | 10/1967 | Nye et al. | |
| 3,559,316 | A | 2/1971 | Galper | |
| 3,589,955 | A | 6/1971 | Edwards | |
| 3,657,796 | A | 4/1972 | Gochnauer | |
| 3,757,445 | A | 9/1973 | Stilwell | |
| 3,804,700 | A * | 4/1974 | Hoey | 428/196 |
| 3,910,168 | A | 10/1975 | Verreydt et al. | |
| 3,952,133 | A * | 4/1976 | Amos et al. | 428/354 |
| 4,050,624 | A | 9/1977 | Williams | |
| 4,112,604 | A | 9/1978 | Ott et al. | |
| 4,167,241 | A | 9/1979 | Zumbrunn | |
| 4,248,657 | A | 2/1981 | Henry | |
| 4,279,087 | A | 7/1981 | Crawford | |
| 4,738,041 | A | 4/1988 | Drueck, Jr. | |
| 4,870,766 | A | 10/1989 | Topping | |
| 4,947,922 | A | 8/1990 | Stobart | |
| 5,182,063 | A | 1/1993 | Lang et al. | |
| 5,294,040 | A | 3/1994 | Cohen et al. | |
| 5,359,794 | A | 11/1994 | Wood | |
| 5,513,455 | A | 5/1996 | Walker | |
| 5,581,923 | A | 12/1996 | Brandstetter | |
| 5,706,597 | A | 1/1998 | Brandstetter | |
| 5,721,041 | A * | 2/1998 | Baratto | 428/195.1 |
| 5,844,565 | A | 12/1998 | Mizutani et al. | |
| 5,958,470 | A | 9/1999 | Harding et al. | |
| 5,961,034 | A | 10/1999 | DeMunnik et al. | |
| 6,073,372 | A | 6/2000 | Davis | |
| 6,119,386 | A * | 9/2000 | Henry et al. | 40/769 |
| 6,163,995 | A | 12/2000 | Lucchetti et al. | |
| 6,189,251 | B1 * | 2/2001 | Wilson | 40/757 |
| 6,253,471 | B1 | 7/2001 | Strauh | |
| 6,263,602 | B1 * | 7/2001 | Seiber et al. | 40/594 |
| 6,269,569 | B1 | 8/2001 | Doone | |
| 6,422,292 | B1 | 7/2002 | Berry et al. | |
| 6,510,637 | B2 | 1/2003 | DeLozada et al. | |
| 6,684,546 | B1 | 2/2004 | Chang | |
| 6,689,517 | B1 * | 2/2004 | Kaminsky et al. | 430/11 |
| 6,920,712 | B2 | 7/2005 | Chaimberg | |
| 6,981,350 | B1 | 1/2006 | Redmon | |
| 6,983,524 | B2 | 1/2006 | Eastwood | |
| 7,191,555 | B2 | 3/2007 | Hughes | |
| 7,322,140 | B2 | 1/2008 | Peery | |
| 7,627,967 | B1 | 12/2009 | Torvik | |
| 7,823,309 | B2 | 11/2010 | Albenda | |
| 8,312,653 | B2 | 11/2012 | Fritsche | |
| 2002/0014316 | A1 | 2/2002 | Sooklaris | |
| 2002/0144445 | A1 | 10/2002 | Gomez del Campo Diaz Barrerio | |
| 2004/0010954 | A1 | 1/2004 | O'Brien et al. | |
| 2004/0016103 | A1 | 1/2004 | Eastwood | |
| 2004/0028935 | A1 * | 2/2004 | Hauke | 428/537.5 |
| 2004/0109958 | A1 * | 6/2004 | Nigam et al. | 428/32.1 |
| 2004/0127614 | A1 * | 7/2004 | Jiang et al. | 524/270 |
| 2004/0153204 | A1 | 8/2004 | Blanco | |
| 2005/0155903 | A1 | 7/2005 | Myers | |
| 2005/0274049 | A1 | 12/2005 | Schmidt | |
| 2006/0130385 | A1 | 6/2006 | Seo | |
| 2006/0155903 | A1 | 7/2006 | Soga et al. | |
| 2007/0071950 | A1 | 3/2007 | Chaimberg | |
| 2007/0186456 | A1 | 8/2007 | Wagner | |
| 2007/0193099 | A1 | 8/2007 | Peters | |
| 2008/0229641 | A1 * | 9/2008 | Slautterback | 40/773 |
| 2009/0277580 | A1 | 11/2009 | Singer | |
| 2010/0199535 | A1 * | 8/2010 | Reynolds | 40/603 |
| 2011/0016759 | A1 | 1/2011 | Ramos-Gonzalez et al. | |
| 2011/0056106 | A1 | 3/2011 | Bosma | |
| 2012/0267062 | A1 * | 10/2012 | Ainge | 160/371 |

FOREIGN PATENT DOCUMENTS

| | | | | |
|---|---|---|---|---|
| DE | 1610283 | | 12/2005 | |
| DE | 202006003166 U1 | | 2/2007 | |
| EP | 0674301 | | 3/1995 | |
| FR | 2387771 | | 11/1978 | |
| GB | 2441052 | * | 2/2008 | A47G 1/06 |
| GB | 2447918 | | 10/2008 | |
| GB | 2457005 | | 8/2009 | |
| GB | 2461863 | | 1/2010 | |
| JP | 7018227 | | 1/1995 | |
| JP | 8147543 | | 6/1996 | |
| JP | 2005022381 A1 | | 1/2005 | |
| JP | 4316949 B2 | | 8/2009 | |
| SE | 0674301 | | 9/1995 | |
| WO | WO-9112606 A1 | | 8/1991 | |
| WO | 02/43965 | | 6/2002 | |
| WO | WO 02/091333 | | 11/2002 | |
| WO | 02/102186 | | 12/2002 | |
| WO | WO/2007/008065 | | 1/2007 | |
| WO | WO2008/049176 | | 5/2008 | |
| WO | WO2009/149532 | | 12/2009 | |

OTHER PUBLICATIONS

Advisory Action mailed Jun. 26, 2014 for U.S. Appl. No. 13/304,303, filed Nov. 23, 2011, pp. 1-3.
Amendment After Final Office Action mailed Jun. 5, 2014 for U.S. Appl. No. 13/304,303, filed Nov. 23, 2011, pp. 1-10.
Amendment After Final Office Action mailed Jun. 26, 2014 for U.S. Appl. No. 13/304,303, filed Nov. 23, 2011, pp. 1.
Applicant Initiated Interview Summary mailed Jun. 10, 2014 for U.S. Appl. No. 13/304,303, filed Nov. 23, 2011, pp. 1-3.
Final Office Action mailed Mar. 25, 2014 for U.S. Appl. No. 13/304,303, filed Nov. 23, 2011, pp. 1-12.
Hirotaka, English Machine Translation of Japanese Patent Application No. 2005022381 entitled Panel for Pictures, and its Manufacturing Method, pp. 23.
Non-Final Office Action mailed Jul. 1, 2014 for U.S. Appl. No. 13/665,713, filed Oct. 31, 2012, pp. 1-16.
Non-Final Office Action mailed Jul. 5, 2013 for U.S. Appl. No. 13/665,713, filed Oct. 31, 2012, pp. 1-11.
Non-Final Office Action mailed Jun. 14, 2013 for U.S. Appl. No. 13/304,303, filed Nov. 23, 2011, pp. 1-14.
Notice of Allowance mailed Dec. 6, 2013 for U.S. Appl. No. 13/665,713, filed Oct. 31, 2012, pp. 1-10.
Response mailed Dec. 13, 2013 for Non-Final Office Action dated Jun. 14, 2013 for U.S. Appl. No. 13/304,303, filed Nov. 23, 2011, pp. 1-12.
Response mailed Nov. 13, 2013 for Non-Final Office Action dated Jul. 5, 2013 for U.S. Appl. No. 13/665,713, filed Oct. 31, 2012, pp. 1-6.
Response mailed Sep. 15, 2014 for Final Office Action dated Mar. 25, 2014 and Advisory Action dated Jun. 26, 2014 for U.S. Appl. No. 13/304,303, filed Nov. 23, 2011, pp. 1-4.
Response mailed Jul. 21, 2014 for Non-Final Office Action dated Jul. 1, 2014 for U.S. Appl. No. 13/665,713, filed Oct. 31, 2012, pp. 1-6.

* cited by examiner

IMAGE DISPLAY

CROSS REFERENCE TO RELATED APPLICATION

This application claims priority to U.S. provisional patent application Ser. No. 61/416,719 filed Nov. 23, 2010 and U.S. provisional patent application Ser. No. 61/521,749 filed Aug. 9, 2011, the entire content of each of which is incorporated herein by this reference.

SCOPE OF THE INVENTION

The present invention relates to an image display, and more particularly to a display resembling an artist's canvas mounted on a wooden stretcher frame.

BACKGROUND

Wooden stretcher frames for mounting painted or printed images have heretofore been provided. Image substrates for use with such frames include artist's canvas. The image substrate is typically stretched over the wooden stretcher frame, secured to the backside of the frame with staples or other hardware, and externally folded at the corners of the frame. Other support structures not constructed from wood, but when having an image substrate mounted thereon have the appearance of a wooden stretcher bar frame, have been additionally provided. Unfortunately, such support structures are typically expensive or do not provide a mounted image that is professional in appearance. Additionally, such artist's canvases are expensive.

There is a need for new support structures and image substrates that address such disadvantages.

DETAILED DESCRIPTION OF THE INVENTION

Figure 1:
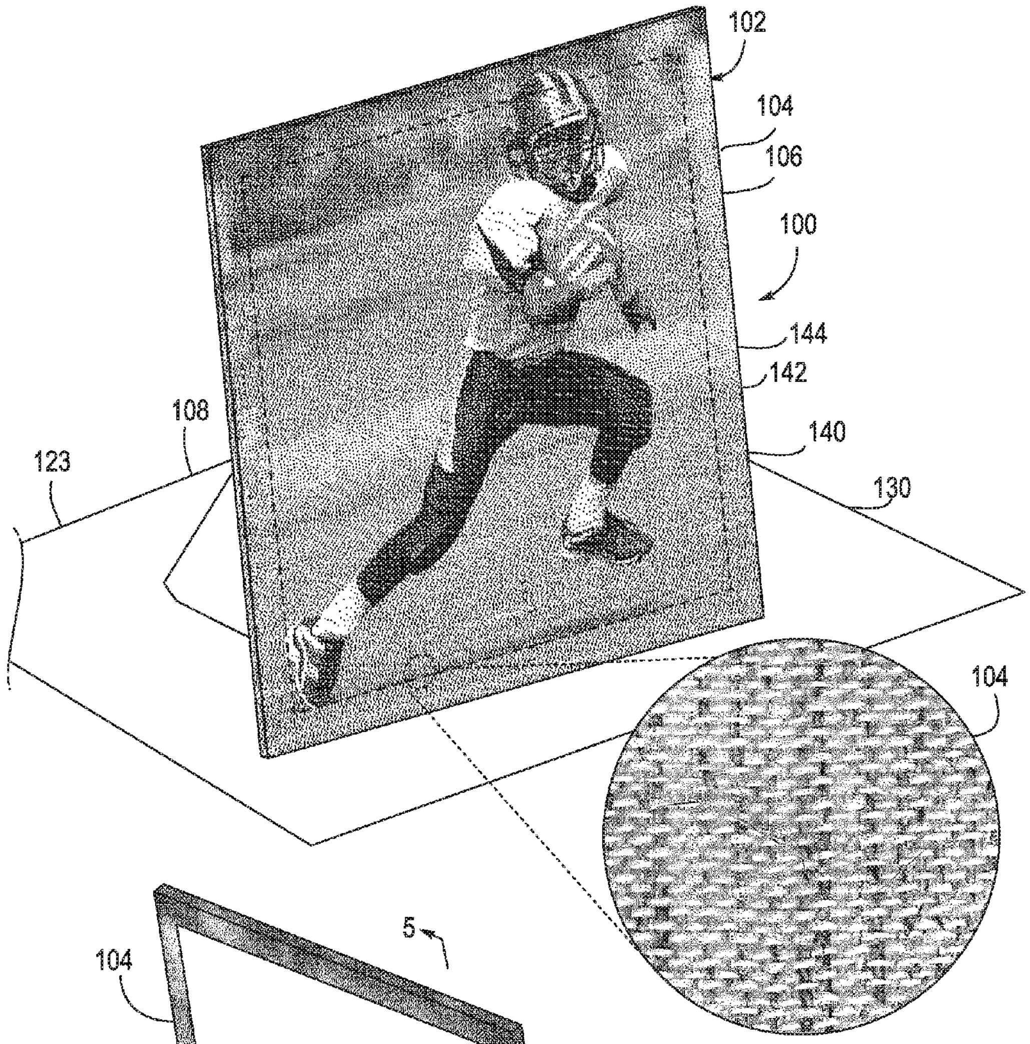
FIG. 1 is a front perspective view of the image display of the present invention.

The present disclosure relates to image displays. More particularly the disclosure relates to several embodiments of images mounted on support structures. The images may be printed on a canvas base and the canvas may be mounted on a support structure giving the appearance similar to that of an artist's canvas stretched over a stretcher bar frame. In some embodiments, the images may be digitally printed and the canvas may be adhered to a backing. The backing may include display hardware for positioning the image substantially upright for viewing.

A first embodiment of an image display 100 is described in FIGS. 1-5. The image display 100 may include a support structure 102 having an image substrate 104 arranged thereon with an image 106 imparted on the image substrate 104. In some instances, the image 106 may be imparted directly on a portion of the support structure 102 causing the respective portion of the support structure 102 to form the image substrate 104 and thus a separate image substrate 104 may not be provided. The image display 100 may also include an orientation apparatus or system 108 configured to orient the image display 100 for viewing.

Regarding the support structure 102, the support structure 102 may be configured for arrangement of the image 106 or image substrate 104 thereon and for maintaining the image 106 in a supported and viewable position. The support structure 102 may further be configured to be substantially rigid to resist deformation that may, immediately or through repetition, damage the image 106 or the medium 104 on which the image 106 is arranged. The substantially rigid nature of the support structure 102 may also resist warping. Accordingly, an image display 100 according to one of embodiments described herein may be located in areas to be viewed or handled and may preserve the integrity of the images 106 displayed thereon.

The support structure 102 may include a base 110 having a mounting surface 112 configured for mounting all or a portion of the image substrate 104 thereon or for imparting an image 106 directly on the base 110. The mounting surface 112 may be substantially flat or it may be concave, convex, or otherwise curvilinear. The mounting surface 112 may have a periphery 114 formed for example by one or more edges 115. The periphery 114 of the mounting surface 112 may define a generally rectangular, square, round, oval, or triangular shaped mounting surface 112. Other shapes may also be provided. In the case of a round, oval, or oblong shaped mounting surface 112, the periphery 114 of the mounting surface 112 may be said to be continuous. In the other cases, as shown in the FIGS. the periphery 114 may be said to be discontinuous, for example, at corners 117.

In the embodiment shown, the image substrate 104 may be sized for mounting on the mounting surface 112 and extending beyond the mounting surface 112 for wrapping around the edges 115 of the base 110. In other embodiments, the mounting surface 112 of the base 110 may include a mounting area 116 defining the location for mounting the image substrate 104. The mounting area 116 may have a boundary 118 that may coincide with the periphery 114 of the mounting surface 112 or the boundary 118 may fall within the periphery 114 of the mounting surface 112. Where the boundary 118 is within the periphery 114 of the mounting surface 112, a border 120 may be provided around the mounting area 116 positioned between the boundary 118 of the mounting area 116 and the periphery 114 of the mounting surface 112. The border 120 may have a width measured between the boundary 118 and the periphery 114 and a length extending along the periphery 114. The border 120 may have a constant width along its length or the width of the border 120 may vary along its length. The border 120 may extend fully around the mounting area 116 or only partially around the mounting area 116. Where the border 120 extends only partially around the mounting area 116, the boundary 118 of the mounting area 116 may coincide with the periphery 114 of the mounting surface 112 where the border 120 is not provided.

The base 110 of the support structure 102 may be in the form of a backing and may have a generally planar mounting surface 112 and may include a back surface 122 opposite the mounting surface 112, the two surfaces adjoining one another along the edges 115. In some embodiments, the back surface 122 may also be a planar surface. The base 110 may be a substantially rigid material providing for a relatively rigid support structure 102. The base 110 may be made from a single piece of material or multiple pieces of material. The material of base 110 may be selected from at least one of several board-like materials in the form of plastic, plastic sheeting, rubber, paperboard, cardboard, fiberboard, wood, or metal. Of the materials listed, or other materials, a medium density or high density material may be used. Other board-like materials may also be used. In this embodiment, the base 110 may have a thickness ranging from approximately 0.020 inch to approximately 0.250 inch. More particularly, the thickness may range from approximately 0.050 inch to approximately 0.125 inch. Still more particularly, the thickness may be approximately 0.050 inch.

Regarding the image substrate 104, the image substrate 104 may be selected from several media used for imparting an image 106 thereon. The image substrate 104 may be configured for receiving and holding an image 106 imparted thereon and may be selected in conjunction with the ink, paint, or other pigment-carrying medium to suitably present the image 106. That is, consideration can be given to the crispness, or alternatively blurriness, desired in the image 106 in the selection of the combination of media.

The image substrate 104 may also be configured for forming to a shape. As such, the image substrate 104 may be relatively thin and freely flexible such that it may be formed, folded, creased, or otherwise adapted to engage the support structure 102 without cracking, splitting, tearing, or showing undue stress. In one embodiment, the image substrate 104 may be formed from any suitable material and can, for example, be a membranous material in the form of a layer of thin plastic, film, textile, foil, or paper material. The image substrate 104 may include first and second surfaces 124, 126. The first surface is preferably print receptive. Other materials can also be used for forming the image substrate 104. In one embodiment, the image substrate 104 can be a textile-like material or artist canvas that can be formed from a layer of a membranous material and an overlying layer of a suitable polymer or plastic on the layer of membranous material. In one embodiment, the layer of membranous material can be a layer of any suitable textile such as a suitable woven textile. The textile can be woven from cotton, polyester, a combination of cotton and polyester or any other suitable material. Alternatively, the layer of membranous material can be a layer or sheet of any suitable nonwoven material or a fibrous material such as paper. The layer of polymer or plastic can have a print-receptive surface for forming first or print surface 124 of the image substrate 104, or the layer of polymer'or plastic can have a print-receptive coating, for example a layer or coating of acrylic or another suitable polymer, thereon for forming first surface 124 of the image substrate 104. In one embodiment, the layer of polymer, the print-receptive coating or both the layer of polymer and the print-receptive coating can be embossed, so for example to cause the image substrate to have a suitably textured first surface 124. In one embodiment where the layer of membranous material is a layer or sheet of any suitable nonwoven material or a fibrous material such as paper, the overlying layer of polymer can be the print-receptive coating and the print receptive coating and the layer of membranous material can be embossed, so for example to cause the image substrate to have a suitably textured first surface 124. The first surface 124 can have the appearance of a woven textile such as canvas, and in one embodiment the first surface 124, and some or all of the layers of image substrate 104 beneath the first surface 12, are embossed to have the appearance of a woven textile such as canvas. It is appreciated that any embodiment of an image substrate, including any of the embodiments of the image substrate disclosed herein, can be used on any of the support structures and image displays disclosed herein, and that any of the embodiments of the image substrate disclosed herein can be used on any suitable support structure or image display.

The surfaces 124, 126 may be opposite surfaces forming first and second sides of a portion of material. The image substrate 104 may have a central portion 128 and a peripheral portion or periphery 130 formed for example by one or more edges 131 of the image substrate 104. The periphery 130 may define a generally rectangular, square, round, oval, or triangular shaped image substrate 104. Other shapes may also be provided. In the case of a round, oval, or oblong shaped image substrate, the periphery 130 may be said to be continuous. In other cases, as shown in the FIGS., the periphery 130 may be said to be discontinuous, for example, at corners.

The image substrate 104 may be slightly larger than the mounting surface 112 of the support structure 102 in one or more directions. The image substrate 104 may be folded along imaginary lines 132 when arranging or mounting on the support structure 102. Defining and assisting features can be used to define or facilitate the folding of the image substrate along the lines 132.

In one embodiment, a single set of imaginary lines 132 may be used. This embodiment may be most suitable where the base 110 of the support structure 102 is relatively flat and relatively thin with a mounting surface 112 and a back surface 122. Alternatively, where the image substrate is relatively flexible and not subject to cracking or tearing due to bending, a single set of imaginary lines 132 may also be suitable, whether the base 110 is thick or thin. In this embodiment, an imaginary fold line I 32A may be provided offset from the edges 131 of the image substrate 104 and may be arranged and positioned to align with the edges 115 of the mounting surface 112 of the base 110. The imaginary fold line 132A may define an overlap flap 134 that may be folded around the edge 115 of the base 110 and against the back surface 122 of the base 110. The image substrate 104 may have a thickness ranging from approximately 0.005 inch to approximately 0.0025 inch. In other embodiments, the image substrate 104 may have a thickness ranging from approximately 0.007 inch to approximately 0.015 inch. In still other embodiments, the image substrate 104 may have a thickness of approximately 0.012 inch. The overlap flap 134 may range in width from approximately 0.06 inch to approximately 1.00 inch. In other embodiments, the overlap flap 134 may range in width from approximately 0.25 inch to approximately 0.75 inch. In still other embodiments, the overlap flap may have a width of approximately 0.38 inch.

Figure 4:
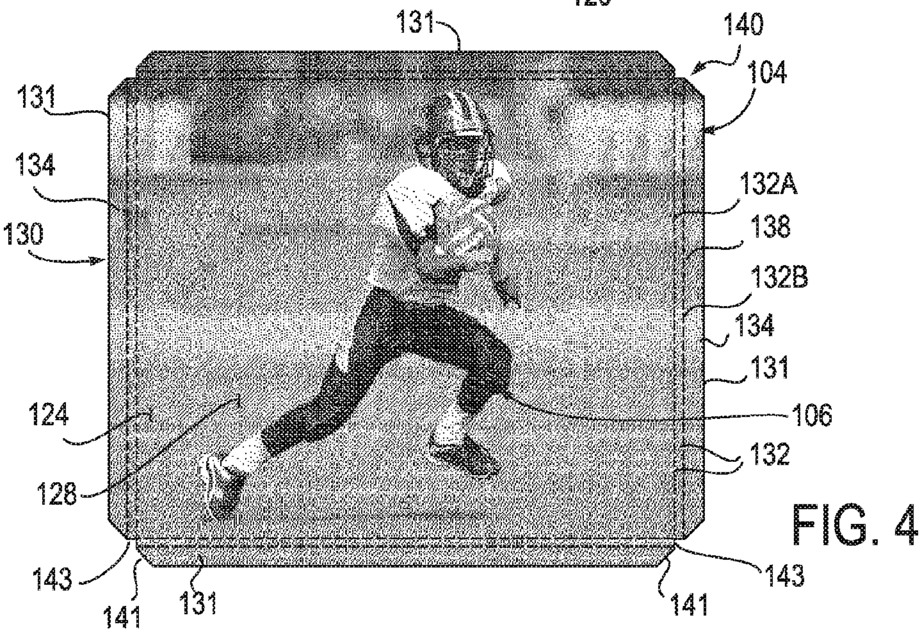
FIG. 4 is a plan view of the image substrate of the image display of FIG. 1.
Figure 5:
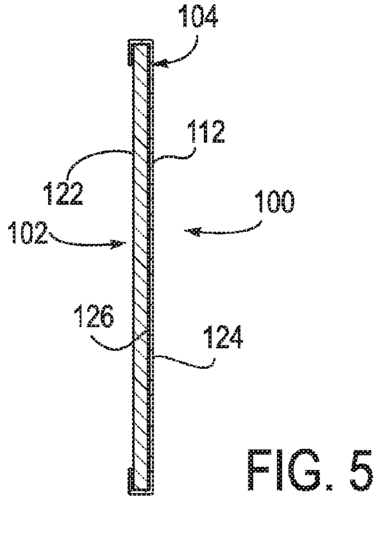
FIG. 5 is a cross sectional view of the image display of FIG. 1 taken along the line 5-5 of FIG. 2.
Figure 6:
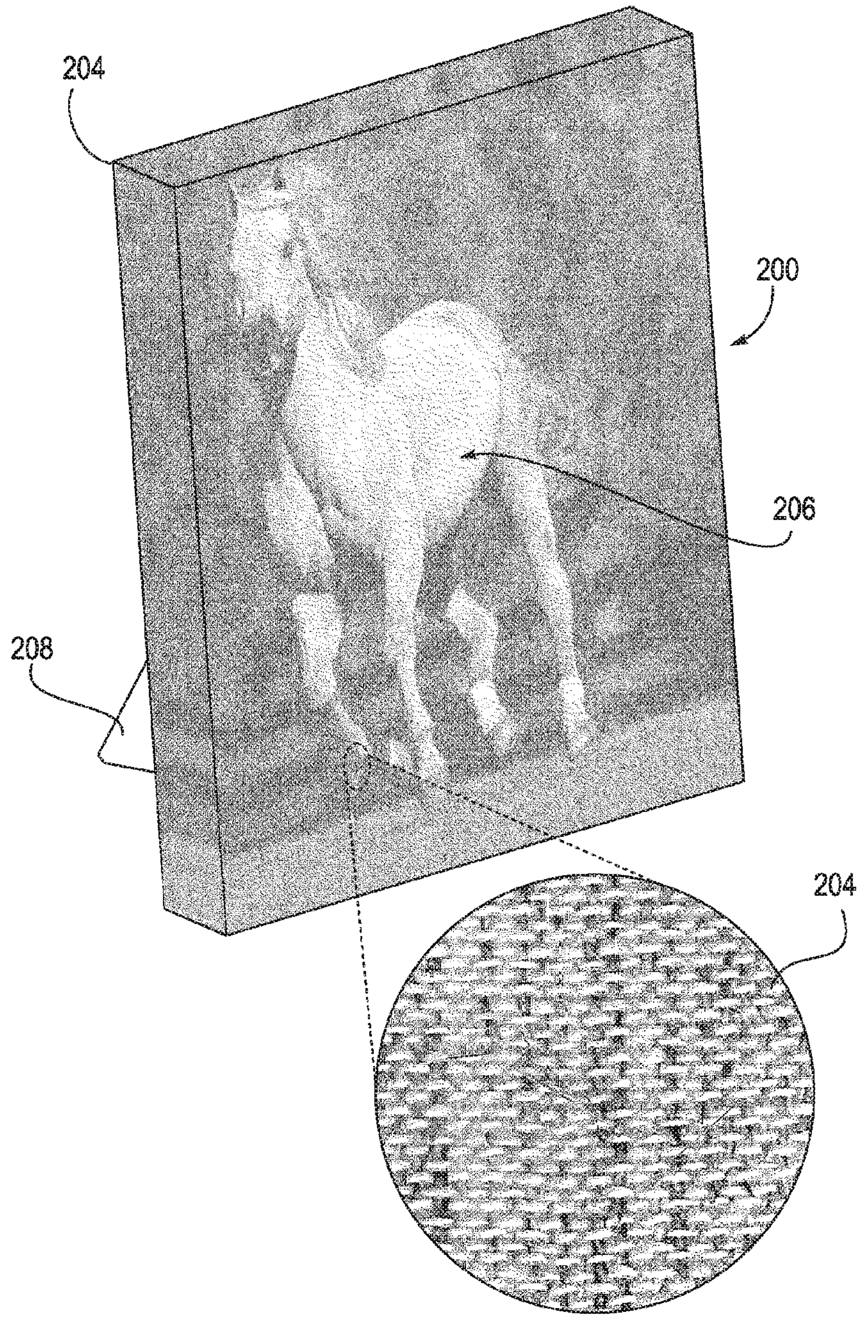
FIG. 6 is a front perspective view of another embodiment of the image display of the present invention.

In another embodiment, as best shown in FIG. 4, where, for example, the base 110 is somewhat thicker, the image substrate 104 may include an additional imaginary fold line 132B between the edge 131 of the image substrate 104 and the imaginary fold line 132A. The additional imaginary fold line 132B may be spaced from the imaginary fold line 132A a distance substantially equal to the thickness of the base 110. As such, the image substrate 104 may be folded approximately 90 degrees along line 132A forming an edge cover 138. The image substrate 104 may be further folded approximately 90 degrees along line 132B forming an overlap flap 134 that may overlap the back surface 122 of the base 110. The additional imaginary fold line 132B may accommodate the thickness of the base 110.

The image substrate 104 may include edge or corner modifications 136 such as chamfers, clips, notches, slits, or miters to accommodate folding or otherwise manipulating the image substrate 104 around the support structure 102. The modifications 136 may be arranged so as to accommodate folding of the image substrate 104 along the imaginary fold lines 132 allowing the image substrate 106 to be wrapped or folded around the periphery 114 of the mounting surface 112 and avoid interference. For example, the corners of the image substrate 104 may be clipped at substantially 45 degrees, for example, as shown in FIG. 4. The clipped corners 141 may reduce, minimize, or even eliminate interference of the overlap flaps 134 as they are folded around and positioned against the back side 122 of the base 110. In addition, as shown in FIG. 4, where the base 110 is somewhat thicker and two imaginary fold lines 132A and 132B are provided, the image substrate 104 may also include corner notches 143. The notches 143 may reduce, minimize, or even eliminate interference of the edge covers 138 as they are folded around and positioned along the edges 115 of the base 110. The notches 143 may be substantially square or triangular with dimensions corresponding to the thickness of the base 110. Where the notch 143 occurs along a clipped edge 141, the shape of the notch 143 may be triangular with the legs of the triangle having lengths equal to the thickness of the base 110. Where the notch occurs in the absence of a clipped edge 141, the shape of the notch 143 may be square with the sides of the square having lengths equal to the thickness of the base. Accordingly, as the edge covers 138 approach the corners of the base 110, the notch 143 will allow the edge covers 138 to align with the adjacent edge cover 138 along the corner 117 of the base 110 without overlapping or otherwise interfering or protruding. Generally, where the assembled position of a particular foldable part or flap is in a plane parallel to that of the mounting surface 112, the corner may be clipped at 45 degrees and if the assembled position of a particular foldable part or flap is in a plane perpendicular to the mounting surface 112, the corner may be notched as shown.

As shown in FIG. 1, the image substrate 104 may also include an image field 140 in the central portion 128 of the image substrate 104 and extending to an image boundary 142. The image 106 imparted on first surface 124 of the image substrate 104 may be limited to this image field 140. It is noted that the image field 142 and boundary 144 shown in FIG. 1 are for example only and in the particular embodiment shown, the image extends over a larger image field 140 to a different image boundary 142. In some embodiments, the image boundary 142 may coincide with the periphery 130 of the image substrate 104 or may fall within the central portion 128 of the image substrate 104 providing a border 144 around the image 106 positioned between the boundary 142 and the periphery 130. The border 144 may have a width measured between the boundary 142 and the periphery 130 and a length extending along the periphery 130. The border 144 may have a constant width along its length or the width of the border 144 may vary along its length. The border 144 may extend fully around the image 106 or only partially around the image 106, the boundary 142 coinciding with the periphery 130 where the border 144 is not provided.

Figure 2:
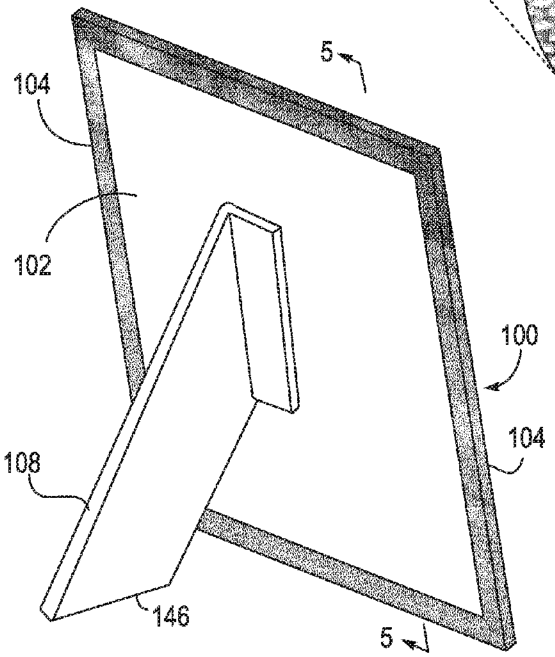
FIG. 2 is a rear perspective view of the image display of FIG. 1.
Figure 3:
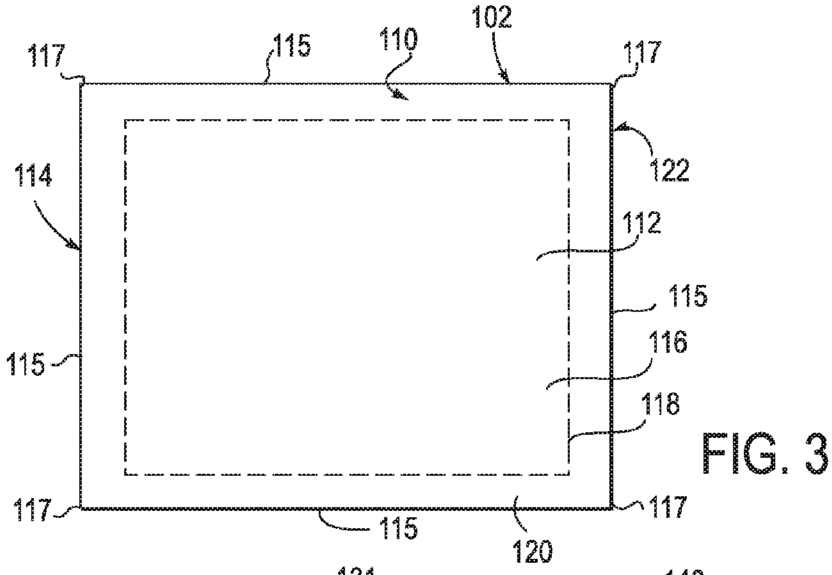
FIG. 3 is a plan view of the support structure of the image display of FIG. 1.

In some embodiments, the image boundary 142 may be arranged and positioned to align with the edges 115 of the mounting surface 112 of the base 110. In other embodiments, the image boundary 142 may be slightly larger such that a portion of the image wraps over the edges 115 of the base 110 with the image substrate 104. That is, the image boundary 142 may align with, for example, imaginary fold line 132B, and the image 106 may then be visible, not only on the mounting surface 112 of the base 110, but also along the edges 115. Where the image boundary 142 aligns with the periphery 130 of the image substrate 104, as shown in the FIGS. 1-5, the image 106 may then continue around the edges 115 of the base 110 to the back surface 122 of the base 110 as best shown in FIG. 2.

An adhesive may be provided for securing the image substrate 104 to the base 110. The adhesive be applied to the image substrate 104 and may extend across some or all of the central portion 128 of one of the first or second sides of the image substrate 104 or entirely across one of the first and second sides of the image substrate. The adhesive may be pre-applied to one or both of the image substrate 104 and the base 110 and covered with a tape-backing. Alternatively, the adhesive may not be pre-applied and may be applied to the image substrate 104 or the base 110 or both at the time of securing the image substrate 104 to the base 110. The adhesive may be applied to a back surface or side 122 of the image substrate 104 so as to display the image 106 on the opposing or front side. In one embodiment, the adhesive is applied to the entire back side 122 of the image substrate 104 and the back side of the image substrate is then pressed to the mounting surface 112 of the base 110. The adhesive can be of any suitable type and can include a polyvinyl acetate, hot melt adhesives and pressure sensitive adhesives.

Regarding the image 106, the image 106 may be a photograph, a graphic design, a painting, or other image 106 intended to be displayed. The image 106 may be drawn, printed, jetted, developed, or otherwise imparted on the image substrate 104. In the embodiment shown, the image 106 is digitally printed on an image substrate 106 and depicts an individual participating in a sporting activity. Suitable digital printing techniques include inkjet printing and laser printing. The digital printing may impart a pigment-carrying or dye-carrying medium on the image substrate 104 thereby creating an image 106. Other printing methods or other processes for imparting an image 106 on an image substrate 104 may be used.

Any suitable orientation system 108 may be utilized to orient the image display 100 for viewing. In some embodiments, the orientation system 108 may include display hardware in the form of a picture frame leg 146 hingedly secured to the back surface 122 of the base 110. As such, the image display 100 may be positioned on a support surface 123 and the picture frame leg 146 may be pivoted away from back surface 122 of the base 110 to prop up the image display 100. The image frame leg 146 may include a hinge travel limit or a tie may be provided near the bottom of the leg 146 and extending to the back surface 122 of the base 110 to prevent the leg 146 from sliding out of a supporting condition with the image display 100. It is appreciated that other picture frame leg types may be provided, such as any of the type described below. In other embodiments, the orientation system 108 may include display hardware in the form of a hanger bracket secured to the back surface of the base allowing the image display 100 to be suspended on a support surface in the form of a wall, for example. In still other embodiments, the orientation system 108 may include display hardware in the form of a series of hooks or loops allowing the image display 100 to be suspended by hanging lines from a support surface such as, for example, a ceiling. Other orientation systems 108 may be provided.

A second embodiment of an image display 200 may now be described with reference to FIGS. 6-12. As shown, an image display 200 may be provided similar to the image display 100 described with respect to FIGS. 1-5. The image display 200 may include a support structure 202 with an image substrate 204 arranged thereon. An image 206 may be imparted on the image substrate 204. In this embodiment, the image display 200 may have an appearance more akin to an image substrate stretched over a stretcher bar frame. In this embodiment, the image display 200 may have a relatively thicker appearance when viewed from the side than image display 100 described above.

Figure 9:
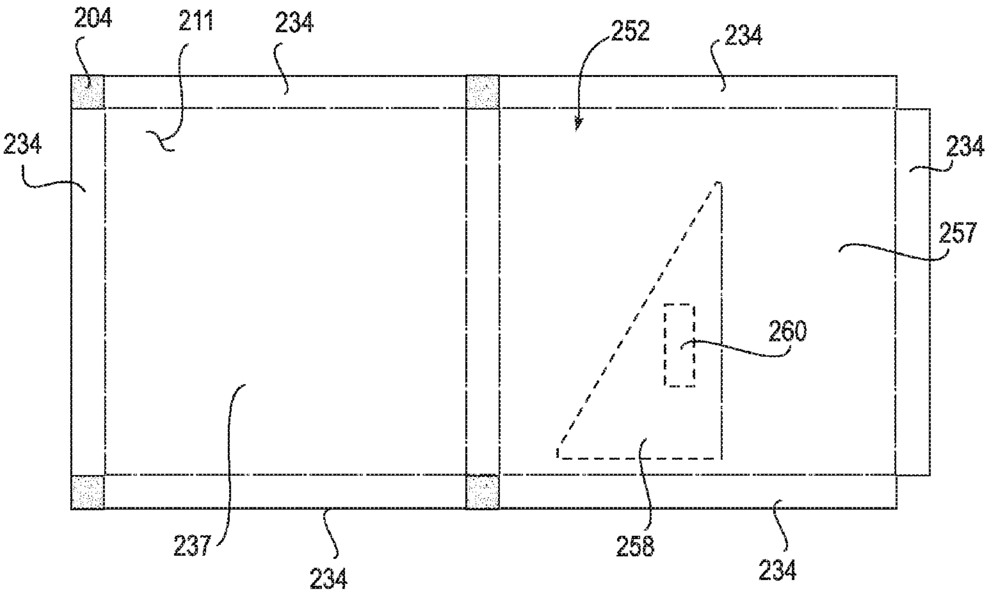
FIG. 9 is a rear plan view of a portion of the unfolded support structure overlying the back of the image substrate of the image display of FIG. 6.

Support structure 202 of image display 200 can include a base 210 formed from a suitable layer or sheet of material 211 having a planar wall 237 provided with a front mounting surface 212. Referring to FIG. 9, the sheet of material 211 may also include return flaps 234 for providing depth to the base 210 and support structure 202. Extending from one of the return flaps 234, the layer of material 211 may also include a closure element 252 formable from a planar wall 257 and additional flaps 234. When folded, the return flaps 234 may extend perpendicularly from each edge 215 of the planar walls 237, 257 of the base 210 or closure element 252 and may have a length substantially equal to the length of the corresponding edge 215 of the sheet of material 211. The return flaps 234 may have a width ranging from approximately 0.25 inch to approximately 3.00 inch. More particularly, the flaps 234 may have a width ranging from approximately 0.50 inch to approximately 2.00 inch. Still more particularly, the flaps 234 may have a width of approximately 0.625 inch. The sheet of material 211 can be folded along an imaginary line 232 for forming each of the flaps 234. The flaps 234 extending from the planar wall 237 of the base 210 may be folded rearwardly toward the back surface 222 of the base 210 to form first and second opposite side walls 238 and first and second opposite end walls 239 of the base 210.

The closure element 252 may be the same or similar to the base 210 in structure in that it may have a planar wall 257, first and second side walls 253 and first and second end walls 255. The closure element 252 may be slightly smaller than the base 210 so as to slip within the side walls 238 and end walls 239 forming the cavity 250. The flaps 234 extending from the planar wall 257 of the closure element 252 may be folded forwardly to form first and second end walls 255 and a single side wall 253. The base 210 and the closure element 252 may share a side wall 238 formed from the flap 234 that connects the base 210 to the closure element 252. The side walls 238 of the base 210 may be perpendicular to the planar wall 237 and, where the planar wall 237 is rectangular, the end walls 239 may be perpendicular to the planar wall 237 and the side walls 238. The closure element 252 may be taped or adhered to the base 210 for secured position therein. In some embodiments, the closure element 252 and associated side 253 and end walls 255 may be omitted and the support structure 202 may have the shape of a box top.

As can be seen from above, the side walls 238 and end walls 239 can be of a variety of widths so as to form image display 200 with a variety of depths. The walls 238, 239 may define a cavity 250 positioned within the folded flaps 234 and positioned behind the planar wall 237. The closure element 252, shown formed in FIG. 7, may cooperate with the base 210 and result in the support structure 202 having the shape of a parallelepiped. As such, the planar wall 257 of the closure element 252 may be substantially the same size as planar wall 237 and may be slightly smaller such that side 253 and end walls 255 may fit within side 238 and end walls 239 of the base 210. In addition, the side 253 and end walls 255 of the closure element 252 may have flap widths similar to the flap widths of the base 210 and may be slightly smaller to accommodate the thickness of the layer of material 211. Accordingly, as the side 253 and end walls 255 extend into the rear side of the base 210, the planar wall 257 of the closure element 252 may be flush with the rear edge of side 238 and end walls 239 of the base 210. The planar wall 237 of the base 210 may have an area equal to the length multiplied by the width. Similarly, the side walls 238 and end walls 239 may have an area equal to the flap width multiplied by the flap length. In some embodiments, the area of the planar wall 237 may be greater than each of the side or end walls 238, 239. In other embodiments, the area of the planar wall 237 may be greater than the sum of the combined areas of the first and second end walls 239 and the first and second side walls 238.

Figure 11:
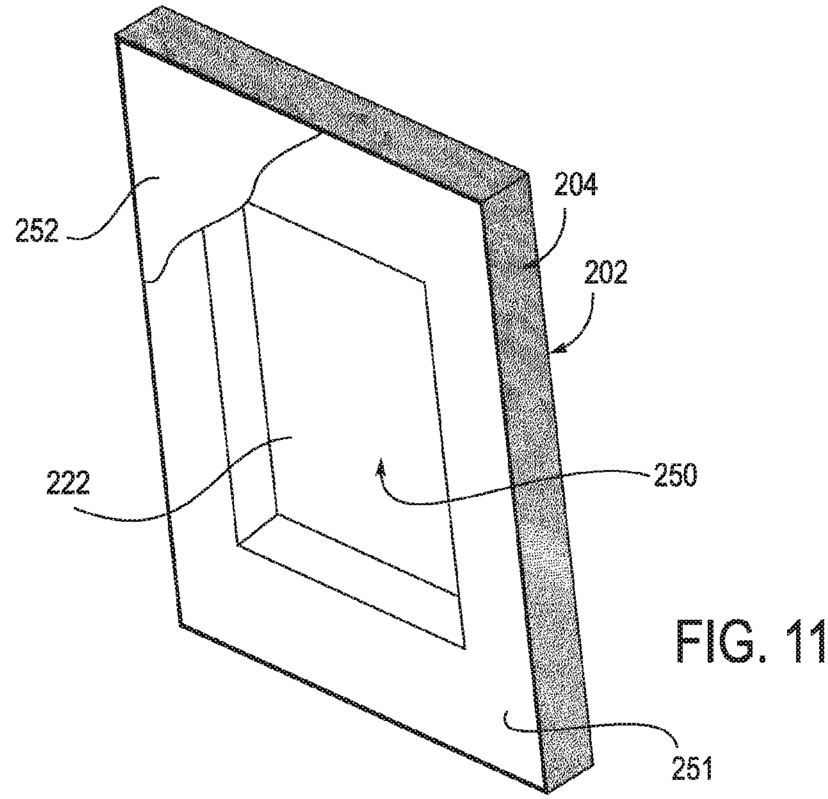
FIG. 11 is a rear perspective view, similar to FIG. 7 but partially cutaway, of the image display of FIG. 6.
Figure 12:
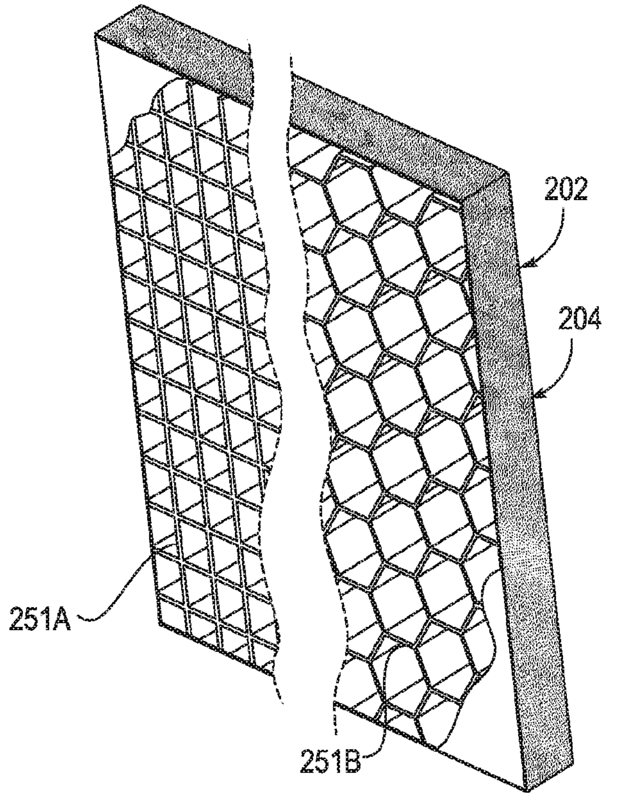
FIG. 12 is a rear perspective view, similar to FIG. 11, of other embodiments of the image display of FIG. 6.
Figure 13:
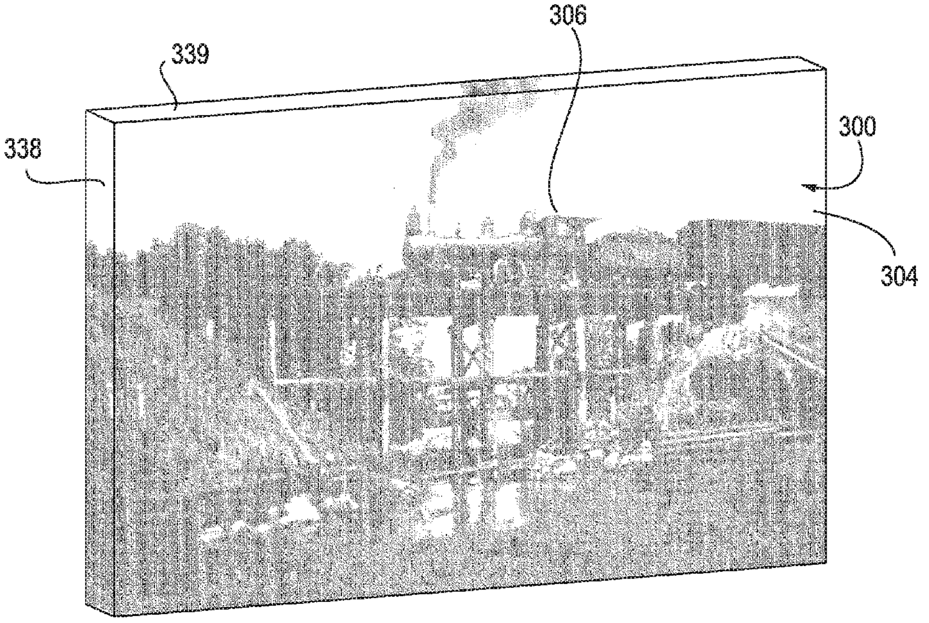
FIG. 13 is a front perspective view of a further embodiment of the image display of the present invention.
Figure 14:
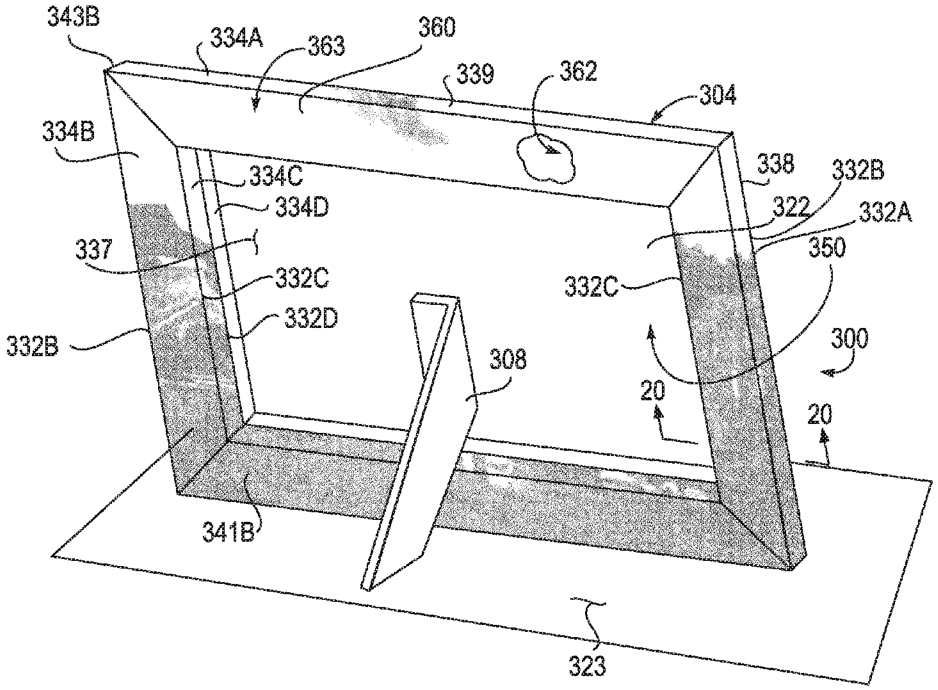
FIG. 14 is a rear perspective view of the image display of FIG. 13.
Figure 15:
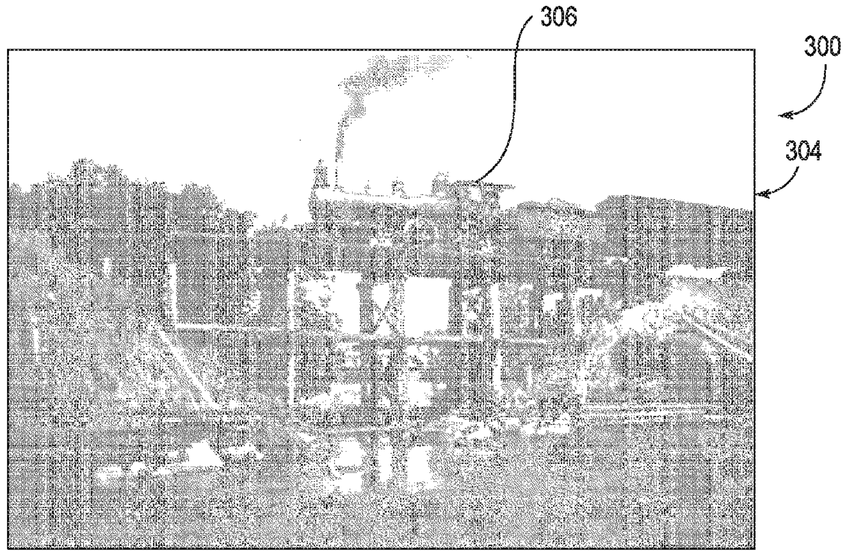
FIG. 15 is a plan view of the image substrate of the image display of FIG. 13.

The cavity 250 of the base 210 may be empty, and thus entirely free of any rigidity or support elements or other material, or the cavity 250 may include a filler or other material 251 configured for supporting the mounting surface 212 of the base 210 and providing rigidity to the support structure 202 or both. The filler 251 may be provided to fill the entire cavity 250 as shown in FIG. 12 or a portion of the cavity 250. For example, as shown in FIG. 11, a peripheral portion of the cavity 250 may be filled and a central portion of the cavity may remain empty. The filler 251 may include a substantially solid material in the form of plastic, board, foam, rubber, wood, or metal. Other substantially solid materials may be provided. The filler 251 may also include a substantially hollow filler material in the form of a rib matrix 251A or honeycomb structure 251B as both shown in FIG. 12. In some embodiments, for example, corrugated cardboard may be provided and oriented such that the flutes of the cardboard are arranged orthogonally relative to the planar wall 237. In still other embodiments, the filler 251 may include bracing elements extending across or along the length of the cavity 250 to provide out of plane support to the planar wall 237 of the base 210. The bracing elements may be folded paper, paperboard, cardboard, or fiberboard or may be made from plastic, wood, metal or other materials. The elements may have the cross-sectional shape of a T, I, or other cross-sectional shape. The bracing elements may also include rods or ribs. Other elements may be provided to span across the expanse of the cavity 250 and provide out of plane rigidity to the planar wall 237 of the base 210.

The image substrate 204 of the present embodiment may be the same or similar to the image substrate 104 described with respect to FIGS. 1-5. As shown in FIG. 9, the image substrate 204 has approximately the same size as the base 210 when the flaps 234 of the base 210 are in the non-folded position such that periphery 230 of the image substrate 204 substantially aligns with the outer edge 233 of the flaps 234. Alternatively, the image substrate 204 may be sized such that the periphery 230 aligns with the edges 215 of the mounting surface 212 of the base 210 (not shown) or it may be sized to fit within the mounting surface 212 of the base 210 (not shown).

Figure 10A:
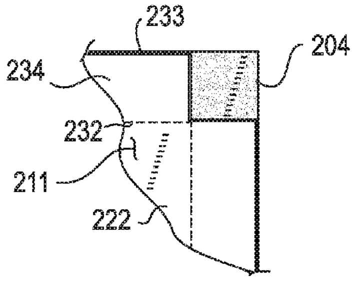
FIGS. 10A to 10D are a series of drawings illustrating the assembly of the portion of the unfolded support structure and image substrate of FIG. 9.
Figure 10B:
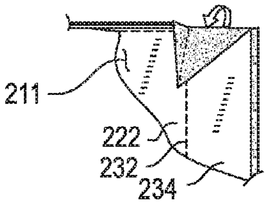
Figure 10C:
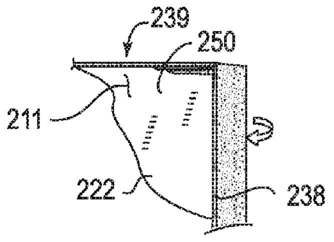
Figure 10D:
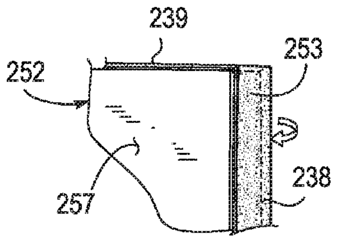

A process for forming the base 210 from the sheet of material 211 and the image substrate 204 is illustrated in FIGS. 10A-10D. FIG. 10A is a close-up view of a corner of the image display 200 of FIG. 9. In FIG. 10B, the first base flap 234 is shown folded about imaginary line 232 toward the back 222 of the base 210 approximately 90 degrees. The corner of the image substrate 204 is shown positioned toward the cavity 250 creating a crease extending from the corner of the image substrate 204 to the corner of the base 210. In FIG. 10C the second base flap 234 is shown folded about imaginary line 232 toward the back 222 of the base 210 approximately 90 degrees. In FIG. 10D, the planar wall 257 of the closure element 252 is shown in spaced apart relationship from the planar wall 237 of the base 210 and is positioned to extend across the cavity 250. Also shown in hidden lines, the side wall 253 of the closure element 252 is positioned within the side wall 238 of the base 210.

Adhesives may be provided to secure the image substrate 204 to all or a portion of the base 210 of the support structure 202. That is, the image substrate 204 may be secured to all or a portion of the planar wall 237 and may also be secured to the flaps 234 forming side walls 238 and end walls 239 of the base 210. The adhesives of this embodiment may be the same or similar to the adhesives of the embodiment described with respect to FIGS. 1-5.

Figure 7:
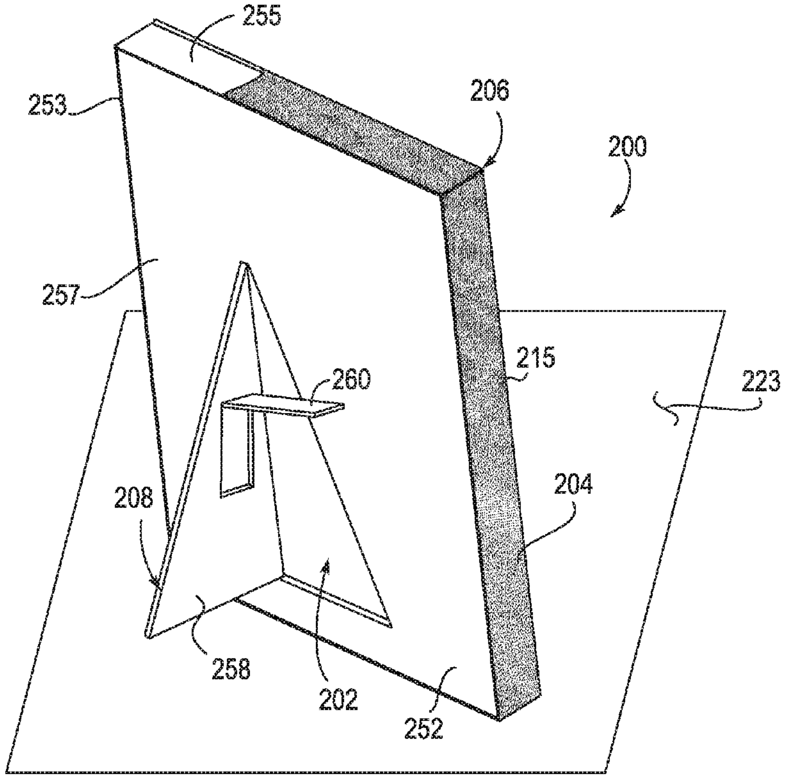
FIG. 7 is a rear perspective view of the image display of FIG. 6 with a portion of the support structure and image substrate cut away and showing a closure element.
Figure 8:
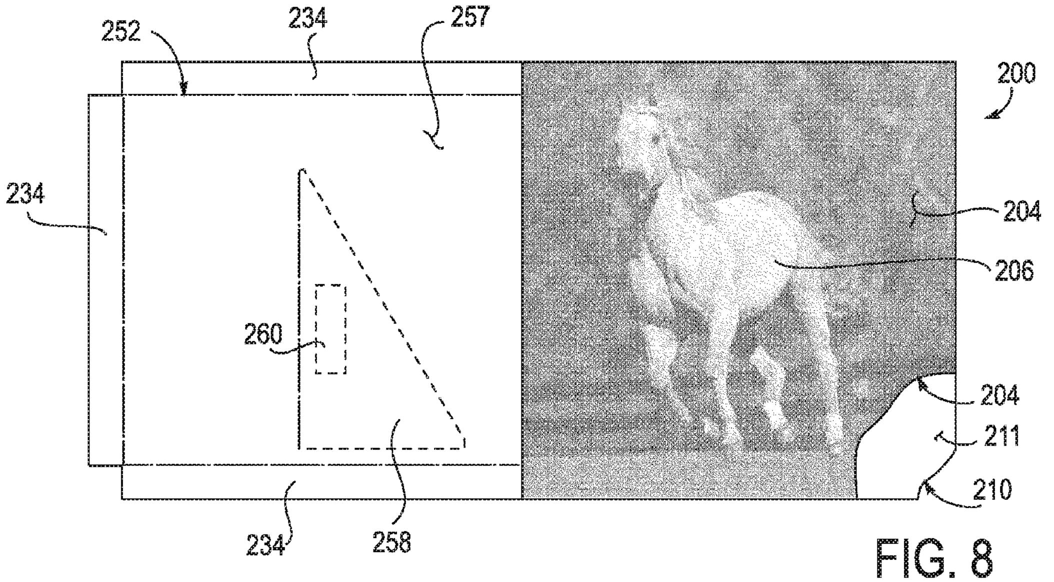
FIG. 8 is a plan front view of the image substrate of the image display of FIG. 6 overlying the unfolded support structure with a portion of the image substrate cut away.

The orientation device 208 of image display 200 may be similar to the orientation device 108 of display 100. In this regard, the orientation device 208 may be a cut-out portion of the planar wall 257 of the closure element 252 as shown in FIG. 7. The cut-out portion may be of any suitable shape for example generally triangular in shape and forming a toe support 258, and may include a locking mechanism 260. The locking mechanism 260 may include a cut-out portion of the toe support 258. The toe support 258 may be folded out of plane from the closure element 252 allowing the toe of the triangularly shaped support to contact a support surface 223. The locking mechanism 260 may be folded out of plane of the toe support 258 thereby resisting the tendency of the toe support 258 to collapse back into the plane of the closure element 252. The orientation device 208 may also include a hanger bracket or other device as described and the hanger bracket may be secured to the closure element 252 or other rear surface of the support structure 202. In addition, the orientation device 208 may be in the form or a hole or other opening provided in closure element 252 for receiving a nail, screw, hook or other suitable hardware mounted on a support wall or other surface for supporting the image display 200.

A third embodiment of an image display of the present invention is described in FIGS. 13-20. The image display 300 may be similar to the image displays described above. The image display 300 includes a support structure 302 having substantially rigid side and end surfaces extending perpendicularly of the front surface of the display so as to have an appearance akin to a canvas mounted on a stretcher bar frame.

The support structure 302 may be similar to the support structure 202 in that portions of base 310 of the support structure 302 may be foldable to form side walls 338 and end walls 339. The base 310 may include a sheet of material 311 having a central portion or planar wall 337. The sheet of material 311 may further include side portions and end portions positioned along the edges of the central portion and configured for forming side walls 338, end walls 339. In one embodiment, the side portions and end portions may be configured to form portions of a peripheral tubular member or structure 360 extending behind the planar central wall 337 and having a peripheral cavity 362 extending therethrough. The peripheral structure 360 is part of a rigidity frame 363 for supporting the mounting surface 312. The side portions and end portions of the peripheral structure 360 may be formed from folding flaps 334. The support structure 302 and rigidity frame 363 may also include stiffening elements 364 arranged to be folded within the peripheral cavity 362 of the peripheral structure 360 to provide additional stiffness to the frame 363. As with the previous embodiments, the base 310 may include a mounting surface 312 on one side of the planar wall 337 and an opposing or back surface 322. In one embodiment, the mounting surface 312 and the opposing or back or rear surface 322 may be planar surfaces.

Figure 16:
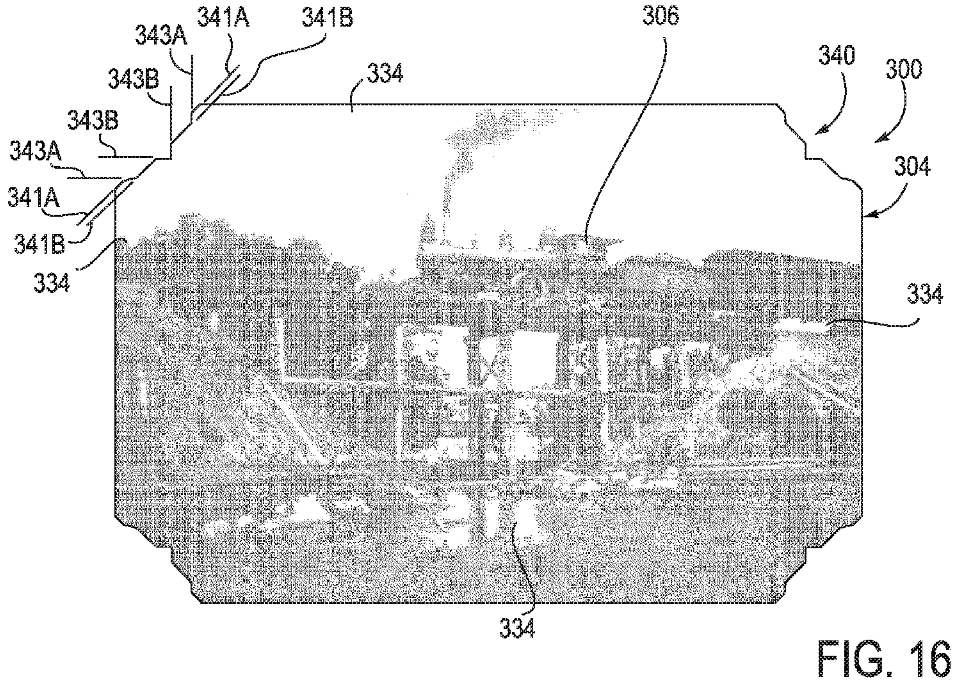
FIG. 16 is a plan view of the image substrate of FIG. 15 further processed in accordance with the invention.

As shown in FIG. 16, sheet of material 311 may include folding flaps 334 having a plurality of imaginary fold lines 332 configured for forming the rigidity frame 363. As with previously described image displays, the sheet of material 311 may be made from paper, foil, fiberboard, paperboard, or cardboard. Other foldable materials may also be used. Referring now to FIGS. 17-20, the several imaginary fold lines 332 of the folding flaps 334 will be described in detail. As with the first and second embodiments, the fold lines 332 can be in the form of a marking or other indication on one or more surfaces of the base. The fold lines 332 may also include perforations, slits, crimp regions, or other features allowing for more easily folding the portions of the base 312.

In the embodiment shown, the folding flap 334 includes the following folds and regions listed sequentially in an outboard direction in relation to the central portion 337 of the sheet of material 311. The terms inboard and outboard are being used to refer to portions of the folding flap in its unassembled or flat lying position as opposed to its assembled position. Accordingly, an outboard edge of an element that rotates 180 degrees due to the folding of a flap remains an outboard edge for consistency.

The folding flap 334 may include an edge fold 332A, an edge portion 334A, a flap fold 332B, a flap portion 334B, a return fold 332C, a return portion 334C, a flange fold 332D, and a flange portion 334D. The edge fold 332A may be positioned along the edge of the mounting surface 312 allowing the folding flap 334 to be folded toward the back 322 of the base 312 approximately 90 degrees creating an edge of the rigidity frame 363 with the edge portion 334A of the folding flap 334. The flap fold 332B may be offset from the edge fold 332A and may define the width of the edge portion 334A and a resulting thickness of the rigidity frame 363. The flap fold 332B may allow the portion of the folding flap 334 outboard thereof to be folded an additional 90 degrees creating a rear surface of the rigidity frame 363 with the flap portion 334B of the folding flap 334. The return fold 332C may be offset from the flap fold 332B and may define the width of the flap portion 334B and the rear surface and a resulting width of the rigidity frame 363. The return fold 332C may allow the portion of the folding flap 334 outboard thereof to be folded an additional 90 degrees creating an inboard surface of the peripheral structure 360 with the return portion 334C of the folding flap 334 and returning the folding flap 334 to the back 322 of the mounting surface 312. The resulting peripheral structure 360 and peripheral cavity 362 extending therethrough may have a rectangular cross-section. Other cross-sections can be provided. The flange fold 332D may be offset from the return fold 332C a distance equal to the thickness of the rigidity frame 363. As such, the inboard surface of the rigidity frame 363 and the edge of the rigidity frame 363 may have substantially equal widths allowing for a substantially constant thickness of the rigidity frame 363 across its width. The flange fold 332D may allow the flange portion 334D of the folding flap 334 to be folded to a position parallel to the back 322 of the mounting surface 312 allowing for adhering the flange portion 334D thereto. The folding flaps 334 may be folded as described on each side of the mounting surface 312 together creating the peripheral structure 360 and part of the rigidity frame 363 positioned behind the mounting surface 312 and extending around the periphery of the mounting surface 312.

A strip of adhesive 366 may be positioned on the back surface 322 of the mounting surface 312 to receive the flange portion 334D and secure the flange portion 334D and thus the rigidity frame 363 in position. The strip 366 may be formed from a tape, for example a double-sided pressure sensitive tape. Alternatively, the strip 366, or may be formed from a layer of a suitable adhesive applied to the back surface 322. Such a layer may be applied in liquid form, to either one of the surfaces being bonded, and can be any suitable adhesive such as polyvinyl acetate glue, a hot melt adhesive or a pressure sensitive adhesive. Suitable pressure sensitive adhesives include acrylic pressure sensitive adhesives, a solvent type natural rubber pressure sensitive adhesive or a polyurethane reactive adhesive. In some embodiments, the adhesive may include a backing-tape that can be peeled off to expose the adhesive and allow the flange portion 334D to be adhered pressed thereto and adhered.

Figure 17:
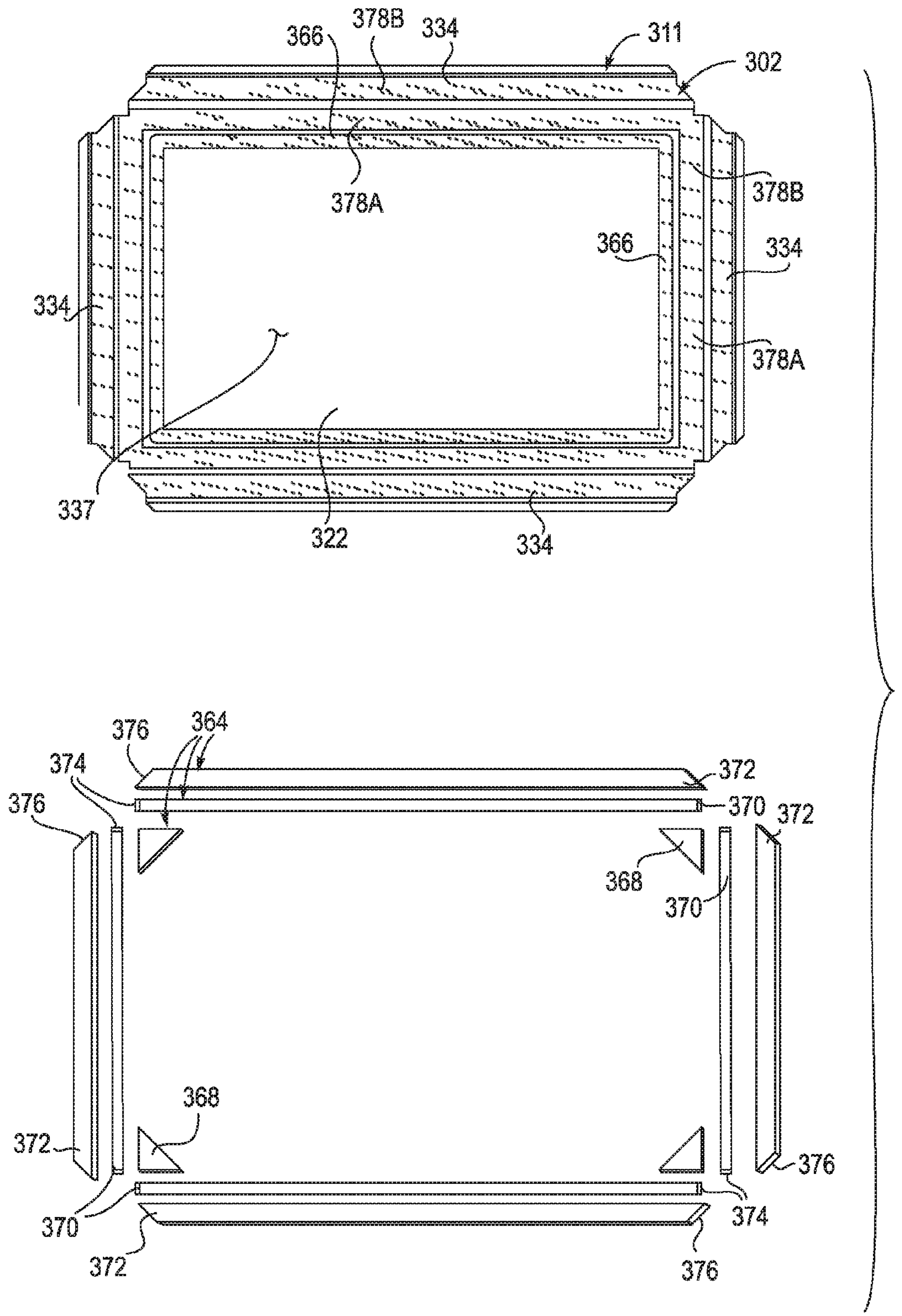
FIG. 17 is a rear view of the disassembled support structure of the image display of FIG. 13.
Figure 18:
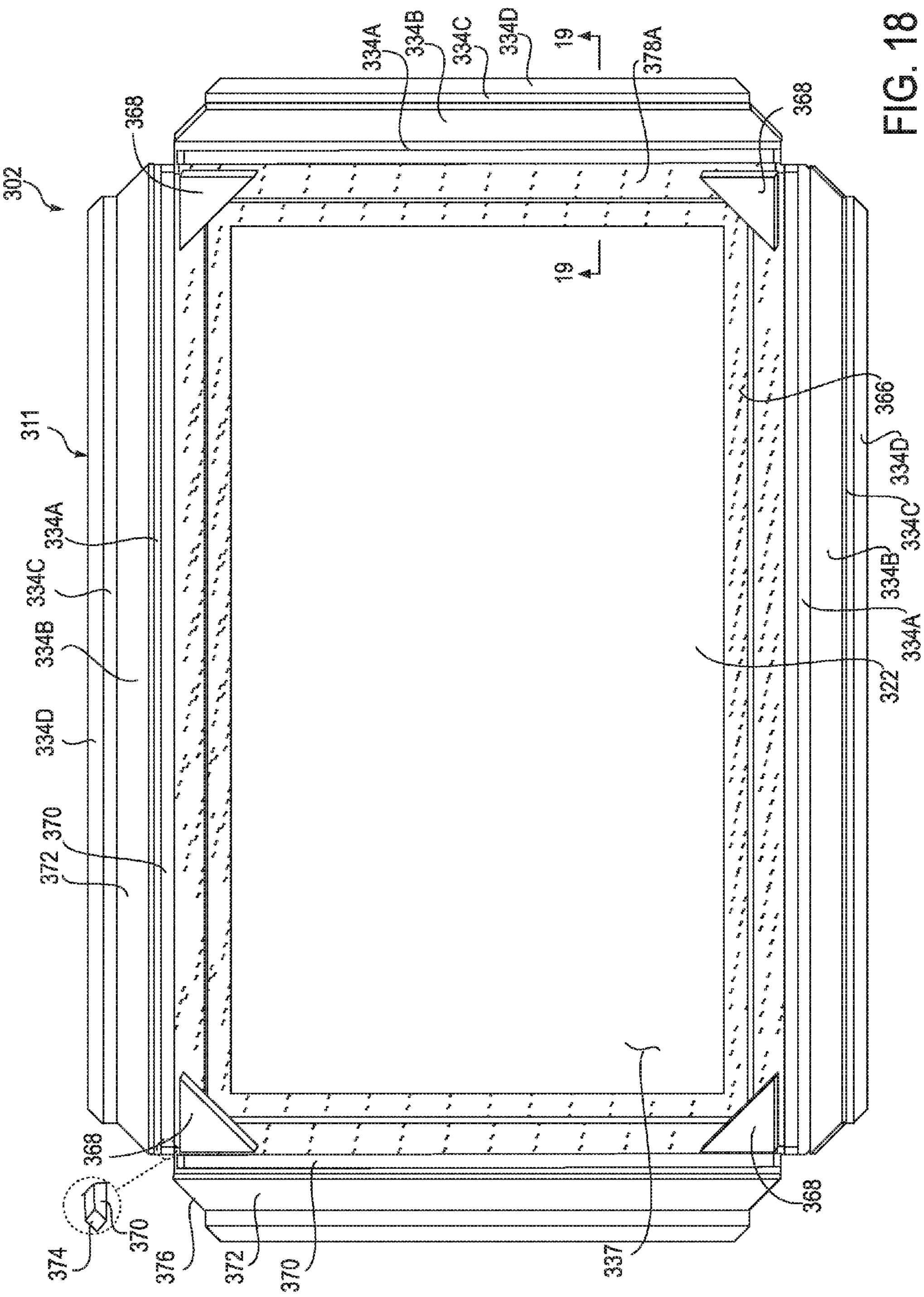
FIG. 18 is a rear view of the partially assembled but not folded image display of FIG. 13.
Figure 19:
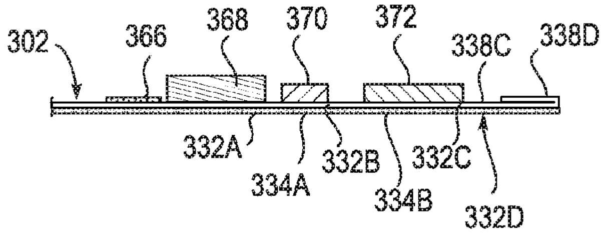
FIG. 19 is a cross-sectional view of the partially assembled but not folded image display of FIG. 13 taken along the line 19-19 of FIG. 18.

The folding flap 334 may include clipped corners and notches as shown in FIGS. 16, 17, and 18 and as previously described with regard to the embodiment of FIGS. 1-5. That is, where the assembled position of a portion of the flap 334 is parallel to the mounting surface 312, the corner may be clipped at, for example 45 degrees, to minimize interference of in plane flaps when folded. Where the assembled position of a portion of the flap 334 is orthogonal to the mounting surface 312, the corner may be notched to minimize interference of the respective portions of the flap 334. As described with respect to the image display 200, the clips may be 45 degree clips and the notches may be square or triangular depending on whether they are positioned on a corner clip. In the present embodiment, a corner clip 341A is provided at 45 degrees and to allow the flange portion 334D to avoid interference with adjacent flange portions 334D. A notch 343A is provided to allow return portions 334C to avoid interference with adjacent return portions 334C. A corner clip 341B is provided at 45 degrees and to allow the flap portion 334B to avoid interfering with adjacent flap portions 334B at corners. A notch 343B may be provided to allow edge portions 334A to avoid interference with adjacent edge portions 334A.

The stiffening elements 364 may be positioned on the back surface 322 of the sheet of material 311 to be positioned within the rigidity frame 363 in the assembled position. Stiffening elements 364 may be positioned on and adhered to a side of each folding flap 334 opposite the mounting surface 312 such that folding of the folding flap 334 away from the mounting surface 312 tends to engulf the stiffening elements 364. Additional stiffening elements 364 may be positioned on the back 322 of the mounting surface 312 to be covered by the folded position of the folding flap 334.

A corner element or block 368 may be included in the rigidity frame 363 and be positioned in the corners of the base 310 for providing additional stiffness and rigidity to the base 310. The stiffening elements 364 and corner blocks 368 can each be made from any suitable material such as paperboard, cardboard, fiberboard, plastic, wood or metal. Suitable paperboards and cardboards include those that can be folded, and suitable fiberboards and plastics include those that can extruded and chopped to size and those that can be molded. A suitable metal is a metal that can be stamped and formed. The corner blocks 368 can be of any suitable type and shape, and can be all of the same size and shape or of different sizes and shapes. In one embodiment, all of the corner blocks 368 are triangular in shape, as shown in FIGS. 17-20. Alternatively, one or more of the corner blocks 368 can be L-shaped. In another embodiment, the corner element 368 may include metal brackets in addition to or in lieu of the aforementioned corner blocks.

Figure 20:
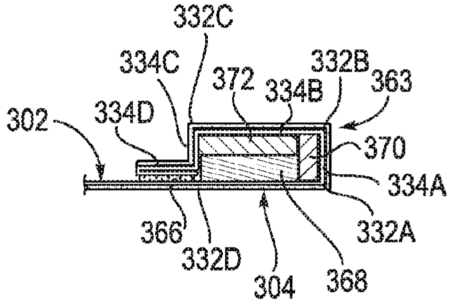
FIG. 20 is a cross-sectional view of the display of FIG. 13 taken along the line 20-20 of FIG. 14.
Figure 21:
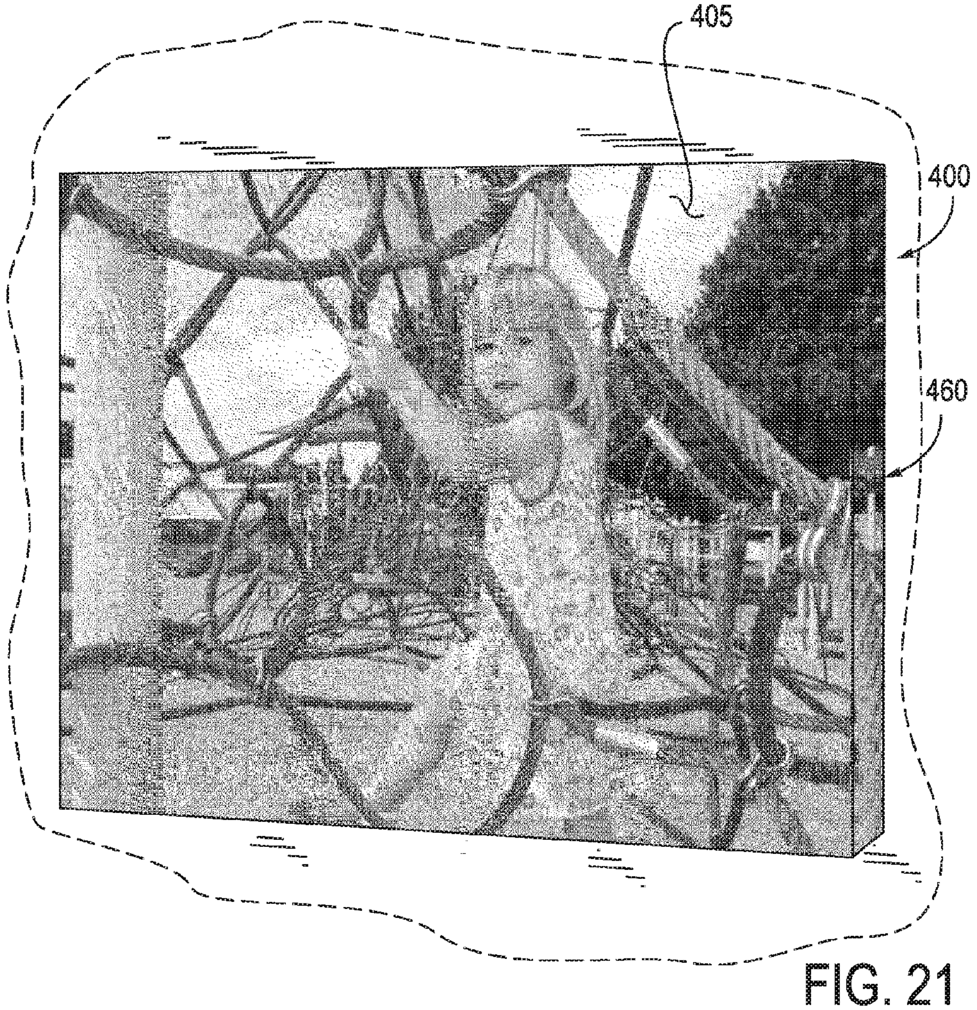
FIG. 21 is a front perspective view of yet another embodiment of the image display of the present invention.
Figure 22:
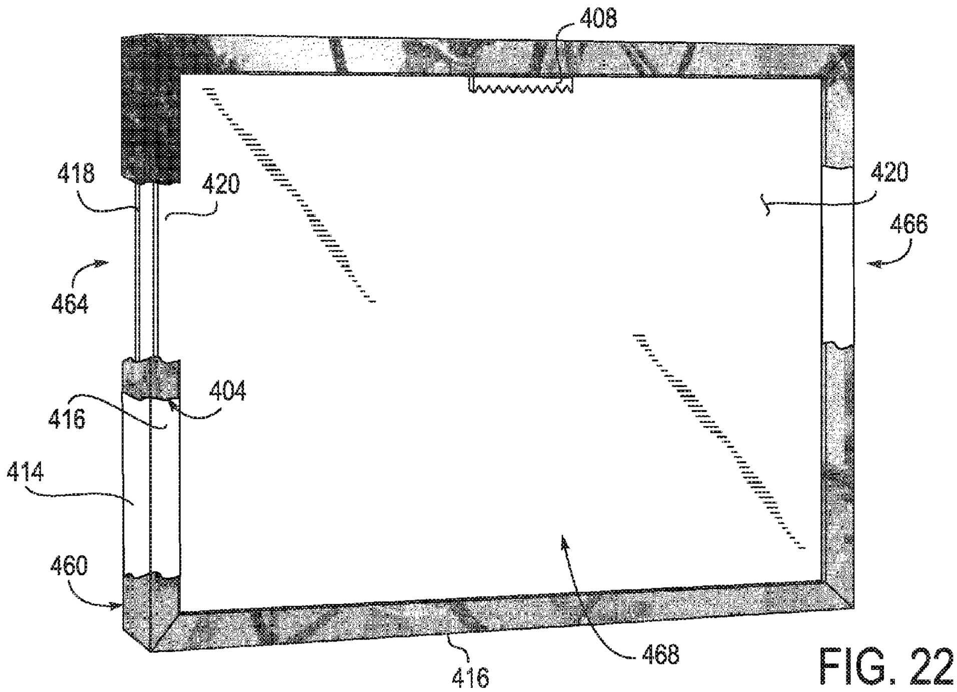
FIG. 22 is a rear perspective view, partially cut away, of the image display of FIG. 21.

An edge stiffening element 370 may be positioned on the edge portion 334A of the flap 334 and a rear surface stiffening element 372 may be positioned on the flap portion 334B of the folding flap 334. The stiffening elements 370, 372 may be sized and positioned suitably to allow the folding flap 334 to be folded into assembled position without interference from the stiffening elements. For example, the corner blocks 368 may be offset inwardly from the edge of the mounting surface 312 a distance substantially equal to the thickness of the edge stiffening element 370 and the edge stiffening element 370 may be positioned with an inboard edge aligned with the edge fold 332A. Accordingly, as best shown in FIG. 20, the edge fold 332A can be made and the offset of the corner block 368 allows the edge stiffening element 370 to rotate and abut the outboard edge of the corner block 368. The edge stiffening element 370 may have a width substantially equal to the width of the edge portion 334A of the folding flap 334 and the rear surface stiffening element 372 may be offset from the flap fold 334 a distance substantially equal to the thickness of the edge stiffening element 370. Accordingly, as best shown in FIG. 20, the flap fold 334 can be made and the offset of the rear surface stiffening element 372 allows the inboard edge of the rear face stiffening element 372 to rotate with the flap portion 334B of the folding flap 334 and pass along the inside face of the assembled position of the edge stiffening element 370. The rear surface stiffening element 372 may have a width substantially equal to the flap portion 334B of the folding flap 334 less the thickness of the edge stiffening element 370. The rear surface stiffening element 372 may be positioned to align with the return fold 332C as shown in FIG. 20 and the return fold 332C may allow the return portion 334C of the folding flap 334 to pass along the inside face of the assembled position of the rear face stiffening element 372. In position, the rear surface stiffening elements 372 may rest on the triangular blocks 368 at each corner and span along the edges of the support structure 302 to the other triangular block. The stiffening elements 372 may be supported by edge stiffening elements 370 adding to the rigidity of the frame. The rigidity frame may have a thickness equal to the width of the edge stiffening element 370, which may be equal to the sum of the thicknesses of the triangular block and the rear face stiffening element. The stiffening elements may be held in relation to one another by the being adhered to the layer of material 311 folded around them.

The stiffening elements 364 may form parts of a set of stiffening elements. That is, the side portions and end portions may each have an edge stiffening element 370 and a rear face stiffening element 372 forming a set of edge stiffening elements and a set of rear face stiffening elements respectively. The stiffening elements 364 may each have opposing ends that are in abutting relationship with corresponding stiffening elements in the set at the corners of the support structure 302. The inclination of the ends of the stiffening elements 364 depends on the orientation of the stiffening elements 364 to each other. For example, where the stiffening elements 364 are aligned relative to each other so as to form a rectangular structure, as shown in FIGS. 17 and 18, and four stiffening elements are provided, each of the stiffening elements can have an end surface that is mitered, beveled, or otherwise inclined at an angle of 45 degrees so that adjoining stiffening elements abut flush with each other. In the embodiment described and illustrated herein, each of stiffening elements 370 and 372 has first and second opposite ends that are angled, inclined at 45 degrees relative to the sides and longitudinal axis of the stiffening elements. More specifically, each of the stiffening elements 370 has an end surface 374 with a beveled angle of 45 degrees and each of the stiffening elements 372 has an end surface 376 that is mitered or angled at 45 degrees.

Alternatively, each of the elements 364 may have square ends. That is, end surfaces 374 and 376 can extend at a right angle to the sides of the respective stiffening elements 370 and 372. The lengths of the stiffening elements 364 may be suitably shortened in this regard. For example, the edge stiffening elements 370 in the end walls 339 may be shortened by twice the thickness of the edge stiffening elements 370 in the side walls 338 allowing the edge stiffening elements 370 in the side walls 338 to pass by and allow for abutment into the side of the edge stiffening elements 370 in the side walls 338. The reverse may also be provided where the stiffening elements 370 in the side walls 338 are shortened. The rear face stiffening elements 372 may similarly be shortened by twice the width of the rear face stiffening elements 372.

The stiffening elements 364 can be adhered to the back surface 322 of the base 310 with a strip 378 of adhesive or any other suitable means. The strip 378 can be of any suitable type, such as for example a strip similar to strip 366 discussed above. In some embodiments, the adhesive may include a backing-tape that can be peeled off to expose the adhesive and allow the stiffening elements to be adhered to the base. In the embodiment shown, a strip 378A of adhesive is provided to secure both the corner blocks 368 and the edge stiffening element 370. In other embodiments, the separate adhesive strips or regions may be provided for the corner blocks 368 and the edge stiffening elements 370. For example, adhesive regions may be positioned just in the corner block 368 areas rather than along the full length of the side and an additional adhesive strip may be provided in the location of the edge stiffening element 370. As also shown, an adhesive strip 378B may be provided for securing the rear face stiffening element 372.

Similar to image display 200, a cavity 350 may be provided behind the mounting surface 312 and within the rigidity frame 363 of image display 300. A filler 351, such as any of the fillers discussed above with respect to image display 200, can be provided in all or a portion of cavity 350, bracing elements can be provided in the cavity, or both. Alternatively, the cavity 350 can be empty and thus free of any fillers or other materials. In addition, a closure element 352 for covering the cavity 350 may also be provided and may be sized to fit within the rigidity frame or cover the frame.

The image substrate 304 of the present embodiment may be the same or similar to the image substrate 104, 204 of the previously described embodiments. The image substrate 304 may be sized and shaped the same as the unassembled or flat support structure 302. The image substrate 304 may thus include clipped corners and notches matching that of the support structure 302 as can be seen by a comparison of FIGS. 16 and 17. The image substrate 304 may be adhered to the mounting surface 312 and the corresponding sides of the folding flaps 334. In some embodiments, the image substrate 304 may include indications of the fold locations and may include perforations or other features previously described for assisting the folding of the base 310 together with the image substrate 304. As with the previous image displays 100 and 200, the image substrate may extend across the full extent of the support structure 302. It may also extend beyond the periphery of the support structure 302 or it may be sized to be smaller than the support structure. Accordingly, the image substrate may be sized as desired and adhered to the support structure.

In one embodiment, the image 306 may be imparted directly on the support structure 302 and the support structure 302 may thus function as the image substrate 304. In other embodiments, the image substrate 304 may be provided separate from the support structure 302, but it may be sized to be smaller than the base 310 and may not include the corner clips and notches as described.

An orientation device 308 in the present embodiment may be the same or similar than the embodiments previously described. That is, a horizontal surface 323 support leg or a hanger system for a wall or suspension hooks may be provided. Other orientation devices 308 can be provided.

A fourth embodiment of an image display 400 of the present invention is shown in FIGS. 21-30. The image display 400 may be similar to the image displays described above. The image display 400 includes an image substrate 404 supported by a support structure 402 having substantially rigid side and end surfaces extending perpendicularly to a substantially taut front surface of the display so as to have an appearance akin to a canvas mounted on a stretcher bar frame. In the present embodiment, the support structure 402 may not directly support the frontward facing portion of the image substrate 404, that is not be secured or in direct contact with the image substrate 404, and instead may provide a structure for stretching and holding the image substrate 404 in a taut condition.

The support structure 402 of the image display 400 may include a plurality of elongate peripheral or side elements 414 arranged end-to-end to form a closed peripheral structure 460 defining an internal cavity 462. The support structure 402 may further include a plurality of elongate structural elements 416 arranged end-to-end to each other and positioned alongside and inside the elongate peripheral elements 414. The support structure 402 may also include one or more diaphragm or board elements 418 and 420 extending across the cavity 462 and engaging the elongate peripheral or side elements 414.

The elongate peripheral elements 414 may be configured to extend along the sides and ends, that is the periphery, of the image display 400 to define a peripheral or side surface of the support structure 402 and maintain the front surface of the image display 404 in a taut condition. The peripheral elements 414 may be flat strip-like elements or strips having a rectangular cross section that is generally constant along the length of the element 414. Other cross-sections may be provided, including square, round, or triangular, and the cross-section may vary along the length of the member. The peripheral elements 414 may each have a first outer side surface or face 424 and a second inner side surface or face 426 opposite the outer surface 424. The outer side surfaces or faces 424 of each peripheral element 414 when joined together can form the outer or peripheral surface of the support structure 402.

In general, image display 400 can resemble an image mounted on a conventional stretcher bar frame. In this regard, each of the peripheral elements 414 may have a length 425 so that when joined together the resulting support structure 402 has the shape or configuration of a stretcher bar frame. For example, the peripheral elements 414 may range in length 425 from approximately one inch to approximately 48 inches. In other embodiments, the peripheral elements 414 may range from approximately three inches to approximately 24 inches long. In other embodiments, the peripheral elements 414 may range from approximately eight inches to approximately ten inches long. Other lengths 425 of peripheral elements 414 larger or smaller than the ranges mentioned, may be provided. The peripheral elements 414 may also have a width 427 measured across the side surfaces 424, 426 ranging from approximately 0.25 inch to approximately six inches. In other embodiments, the width 427 may range from approximately 0.5 inch to approximately two inches. In other embodiments, the width 427 may range from approximately one inch to approximately 1.5 inch.

The peripheral elements 414 may each have a first or front edge 428 and a second or rear edge 430 opposite the front edge 428 and may also include second opposite ends 432. The opposite ends 432 may have corner modifications similar to the stiffening elements 364 of the image display 300. That is, where the peripheral elements 414 are arranged relative to each other to form a rectangle and four peripheral elements 414 are provided, for example, each of the peripheral elements 414 may have an end surface 433 that is inclined at 45 degrees so that adjoining peripheral elements 414 abut each other to form flush intersections where their respective sides 424, 426 and edges 428, 430 align to form a clean or flush corner. In some embodiments, the opposite ends 432 of each peripheral element may be a square end rather than an inclined end and one of the peripheral elements 414 at each corner may be positioned to intersect with the side of the intersecting element 414 near its end thereby providing a flush corner. Other arrangements of peripheral elements 414, with or without edge modifications, may be used to provide flush corners.

Similar to the opposite ends 432 of the peripheral element 414, the rear edge 430 of the peripheral elements 414 may also include an edge modification inclined at 45 degrees, for example, providing an inclined longitudinally extending surface 431 configured to engage a corresponding surface on an adjacent structural element 416. The front edge or surface 428 of the peripheral elements 414 may be a generally square edge, that is the front surface 428 extends substantially perpendicular to each of the adjoining side surfaces of the peripheral element 414. In other embodiments, a bull nosed or arcuate edge 428 may be provided to more gradually support the image substrate 404 as it transitions from the front surface of the image display 400 to the peripheral surface of the image display 400. Other shaped front edges 428 may also be provided.

The elongate peripheral elements 414 may further include longitudinally extending slots or grooves 436 and 438 for receiving the board elements 418 and 420. It is noted that the slots 436 and 438 have been omitted from FIG. 23 for clarity, but are shown in several other FIGS. including FIGS. 24-27, 29, and 30. The slots may be positioned on the inner face 426 and may extend along the full length of the peripheral element 414 through the corner modification at each end 432. The first or front slot 436 may be spaced apart from the front edge 428 a distance 434 defining an image compartment 439. The second or rear slot 438 may be positioned adjacent to the rear edge 430 immediately adjacent to the edge modification as shown in FIG. 24.

The slots 436 and 438 may be configured to receive the board elements 418 and 420 and maintain the relative position of the board elements 418 and 420 and the peripheral elements 414. In addition, as will be discussed with respect to the assembly below, the front slot 436 may prevent the board element 418 from sliding along the surface of the peripheral element 414 when the board element 418 is used as a fulcrum during assembly. Still further, the slots 436 and 438 may strengthen the connection between the board elements 418 and 420 and peripheral elements 414. As such, each of the slots 436 and 438 may have a generally rectangular cross-section for receiving a substantially rectilinear edge of a board element 418 and 420. Other slot cross-sections may be provided and may be coordinated and selected to match or correspond to the shape of the edge on the board elements 418 and 420. The slots 436 and 438 may have a width 435 substantially equal to or slightly smaller than the thickness of the board elements 418 and 420 providing for a tight fit. The slots 436 and 438 may have a depth 437 measured from the inner surface 426 and extending through the thickness of the peripheral elements 414 approximately 0.125 to approximately 0.75 of the thickness of the peripheral element 414. In other embodiments, the slots 436 and 438 may have a depth 437 of approximately 0.25 to approximately 0.5 of the thickness of the peripheral element 414. In still other embodiments, the slots 436 and 438 may have a depth 437 of approximately ⅓ the thickness of the peripheral element 414 thickness. Other depths 437 may also be provided.

The elongate structural elements 416 of the image display 400 may be similar to the peripheral elements 414. The elongate structural elements 416 may be configured to extend along the rear periphery of the image display 400 adjacent to the peripheral elements 414. The structural elements 416 may function to close the rear of the support structure 402 and in embodiments where the rear board element 420 is omitted, may also function stiffen the peripheral elements 414 against displacement parallel to the plane of the front surface of the image display 400. The structural elements 416 may be flat plate-like elements having a rectangular cross section that is generally constant along the length of the element 416. Other cross-sections may be provided including square, round, or triangular. Still other cross-sections may be provided and the cross-section may vary along the length of the member. The structural elements 416 may have a first rear surface or face 440 and a second front surface or face 442. The rear surface 440 of each of the structural elements 416 may combine to form a rear peripheral surface.

Figure 23:
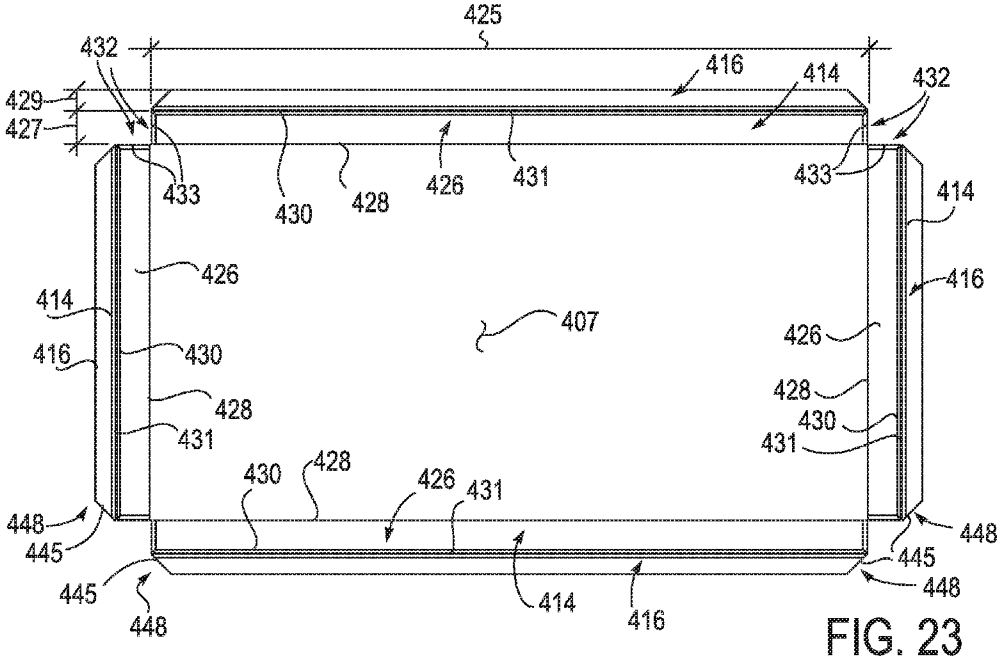
FIG. 23 is a rear view of a portion of the disassembled image display of FIG. 21.
Figure 24:
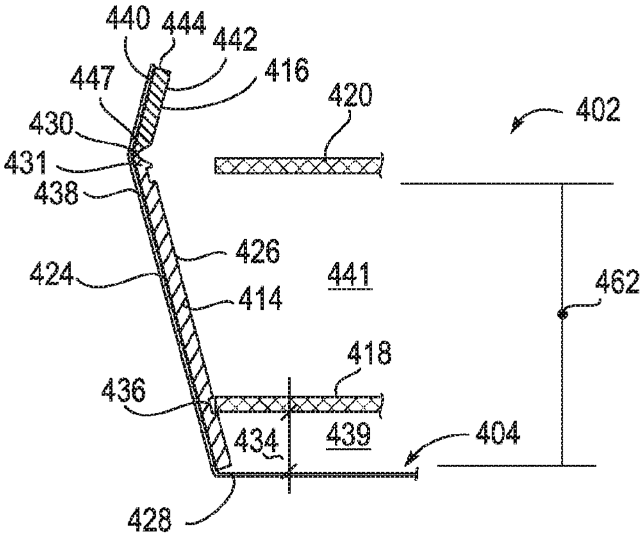
FIG. 24 is a cross-sectional view of the image display of FIG. 21 during the assembly thereof.
Figure 25:
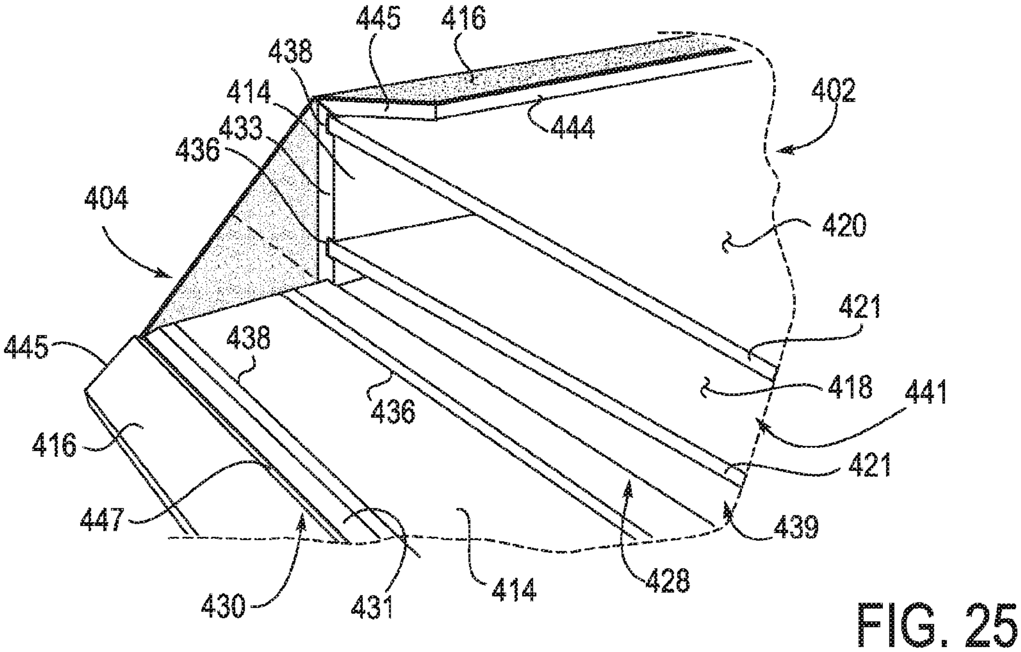
FIG. 25 is a side perspective view of the image display of FIG. 21 during the assembly thereof.
Figure 26:
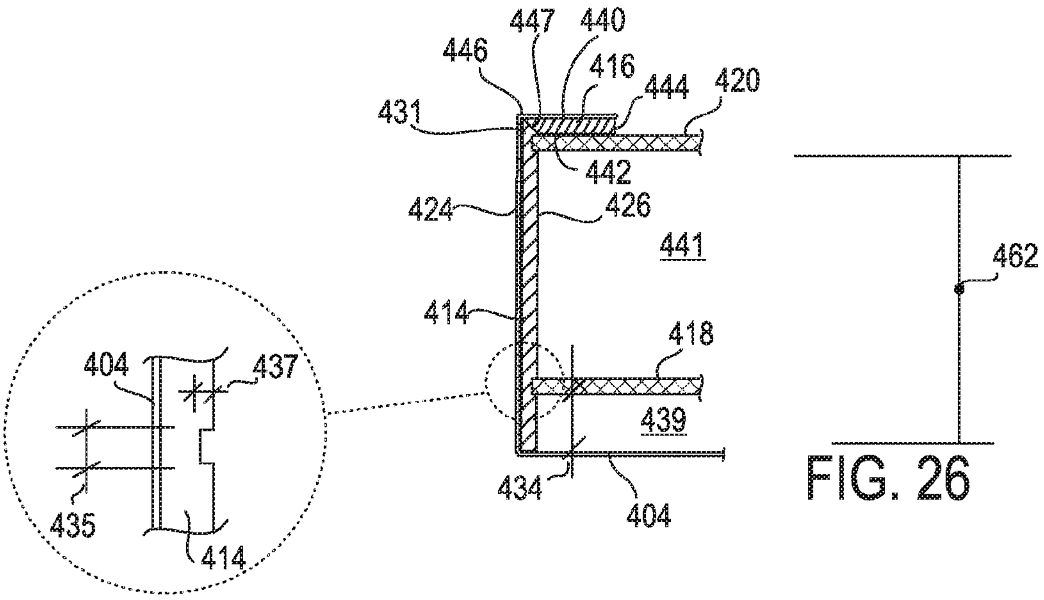
FIG. 26 is a cross-sectional view, similar to FIG. 24 but taken along the line 26-26 of FIG. 22, of the assembled image display of FIG. 21.

The structural elements 416 may have a length corresponding to the length of the peripheral elements 414 as best shown in FIG. 23. The structural elements 416 may also have a width 429 measured across the front and rear surfaces 440, 442 ranging from approximately 0.25 inch to approximately six inch. In other embodiments, the width 429 may range from approximately 0.5 inch to approximately two inch. In other embodiments, the width 429 may range from approximately one inch to approximately 1.5 inch. The width 429 of the structural elements 416 may be slightly smaller than the width 427 of the peripheral elements 414.

The structural elements 416 may each have a first or inner edge 444 and a second or outer edge 446. Still further, the structural elements 416 may each have first and second opposite ends 448. Like the peripheral elements 414, the opposite ends 448 of the structural elements 416 may have corner modifications. Where the structural elements 416 are arranged relative to each other to form a rectangle and four structural elements 416 are provided, for example, each of the structural elements 416 may have an end surface 445 that is inclined at 45 degrees relative to the elongate axis of the structural element 416 so that adjoining structural elements 416 abut each other to form flush intersections where their respective faces 440, 442 and edges 444, 446 align to form a clean or flush corner. Again, and like the peripheral elements 414, the opposite ends 448 of the structural elements 416 may be square ends rather than inclined ends and one of the structural elements 416 at each corner may be positioned to intersect with the side of the intersecting element 416 near its end thereby providing a flush corner. Other arrangements of structural elements 416, with or without edge modifications, may be used to provide flush corners.

The outer edge 446 of the structural elements 416 may also include an edge modification inclined at 45 degrees, for example, providing a longitudinally extending inclined surface 447 configured to engage inclined surface 431. Accordingly, the rear edge 430 of the peripheral element 414 and the outer edge 446 of the structural element 416 may intersect to form a flush longitudinally extending corner edge. In some embodiments, the rear edge 430 of the peripheral element 414 and the outer edge 446 of the structural element 416 may each be square edges where one of the elements is positioned to intersect with the side or face of the intersecting element near the edge thereby providing a flush corner. Other arrangements of peripheral 414 and structural 416 elements, with or without edge modifications, may be used to provide flush corners. The inner edge 444 of the structural element 416 may be a generally square edge. Other shaped inner edges 444 may also be provided where, for example, the inner edge 444 tapers toward the board element 420 to form a smooth transition.

The diaphragm or board elements 418 and 420 may be configured to maintain the peripheral elements 414 in position relative to one another. The board elements 418 and 420 can also serve to provide rigidity or stiffness to the support structure 402, and can further serve to provide mass or weight to the image display 400. The elements 418 and 420 may be in the form of a frame, a plate, a board, or other element having a generally rigid in-plane stiffness to maintain the intersecting angles between the peripheral elements 414. The elements 418 and 420 may have openings to reduce the material required for these elements while maintaining a suitable rigidity. In addition to in-plane stiffness, the diaphragm or board elements 418 and 420 may have a suitable out of plane compressive buckling resistance to resist tension induced in the image substrate 402. For purposes of discussion, the diaphragm or board elements 418 and 420 will be referred to as board elements 418 and 420.

The board elements 418 and 420 may be generally flat board-like or plate-like elements and may have a generally constant thickness. The board elements 418 and 420 may be generally rectangular or square with four peripheral ends 421 and four peripheral 414 and structural 416 elements may be provided. Other shapes, for example, triangular, parallelograms, circular, or other shapes of board elements 418 and 420 may be provided and corresponding numbers of peripheral 414 and structural 416 elements may be provided to accommodate the number of peripheral ends 421 of the board elements 418 and 420. For example, where a triangular board element 418 and 420 is provided, three peripheral elements 414 and structural elements 416 may be provided.

The front or inner board element 418 may be arranged in the front slot 436 and the rear or back board element 420 may be arranged in the rear slot 438. As discussed with respect to the cross-sectional shape of the slots 436 and 438, the board elements may have generally rectilinear edge extending along each peripheral end 421 or another edge may be provided. The cross-sectional shape of the slots 436 and 438 may be coordinated with the edges of the board elements 418 and 420 to provide a snug fit when the peripheral elements 414 are positioned along the peripheral ends 421 of the board elements 418 and 420. In addition to the rigidity provided by the board elements 418 and 420, the front board element 418 may be configured to provide a fulcrum for pivoting the peripheral element and tensioning the image substrate 404 during and after assembly. The rear board element 420 may also provide a closure element for the back of the display consistent with premium wall decor. As such, the rear board element 420 may have a black color, brown color, gray color, or another color, for example coordinated with the image being displayed. Other colors may also be used.

The elongate peripheral elements 414, elongate structural elements 416, and board elements 418 and 420 may be made from any suitable substantially rigid material. Each of the elements may be made from the same material or combinations of materials may be used. In one embodiment, the elongate peripheral elements 414 and elongate structural elements 416 may be made from one material and the board elements may be made from a different material. Any combination of materials for the several elements may be used. The elements may be made from one or a combination of several materials including, paper board, cardboard, fiberboard, wood, plastic, or metal. In one embodiment, the elongate peripheral elements 414 and elongate structural elements 416 are made from medium-density fiberboard (MDF) and board elements 418 and 420 are made from corrugated cardboard.

The peripheral elements 414, structural elements 416, and board elements 418 and 420 may each have the same or different thicknesses and any combination of thicknesses may be provided. In one embodiment, each of the peripheral elements 414 and structural elements 416 has a thickness ranging from 0.05 to 0.125 inch. In another embodiment, each of the peripheral elements 414 and structural elements 416 has a thickness ranging from 0.06 to 0.10 inch, and in another embodiment each of the peripheral elements 414 and structural elements 416 has a thickness of approximately 0.09 inch. In one embodiment, each of the board elements 418 and 420 has a thickness ranging from 0.06 to 0.25 inch. In another embodiment, each of the board elements 418 and 420 has a thickness of approximately 0.125 inch. In one embodiment, each of the board elements 418 and 420 has an edge crush strength of approximately 323 kilonewtons per meter. Other thicknesses may be provided, it being appreciated that the size, thickness and dimension of the elements 414, 416, 418 and 420 can be dependent on the size and shape of the image display 400 as well as the desired weight and mass of the image display.

The image substrate 404 of the present embodiment may be similar to the previously described embodiments and may include a layer of any suitable material, such as for example canvas. Other materials may also be used and an image may be imparted on a front surface 405 of the layer of material. The image substrate 404 may be sized and shaped the same as the unassembled or flat support structure 402. For example, as shown in FIG. 23, the image substrate 404 may be generally rectangular and the peripheral elements 414 and structural elements 416 may be arranged and secured to a back surface 407 opposite the front surface 405 of the image substrate 404 such that, when the image substrate 404 is folded the opposite ends 432 of the peripheral elements 414 intersect to form a corner and when the image substrate 404 is folded a second time, the opposite ends 448 of the structural elements 416 also intersect to form a corner. The corners of the otherwise rectangular image substrate 404 may be clipped at an angle, for example 45 degrees, such that they align with the edge modifications of the opposite ends 448 of the structural elements 416.

As with the previously described embodiments, the image substrate 404 may be adhered to the support structure 402 with adhesives of the types previously mentioned for securing the image substrate to the support structure. The image display 400 may be assembled generally by folding the image substrate 404, which rotates the peripheral elements 414 about the fold line of the image substrate 404. While the image substrate 404 is folded and peripheral element 414 is rotated, the board elements 418 and 420 may also be positioned into the slots 436 and 438 of the peripheral elements 414.

As shown in FIG. 24, as the image substrate 404 is folded and two peripheral elements 414 on opposite sides of the display 400 are brought into contact with the front board element 418, the engagement of the front slot 436 and the board element 418 may create a fulcrum at the board element for tensioning the front surface of the image substrate 404. As mentioned above, the slot 436 may receive the board element 418 in this condition and help to prevent the board element 418 from sliding along the peripheral element 414 as the board element 418 is compressed between opposing peripheral elements 414. As the assembler presses the rear edges 430 of such opposite or opposed peripheral elements 414 toward one another, the front edges 428 of the opposite or opposed peripheral elements 414 may be caused to displace or rotate away from one another due to the relative stationary position of their respective slots 436 being pressed against the board element 418 and the fixed pivot axis of the respective peripheral element relative to the board element 418. The continued rotation of such two first peripheral elements 414 relative to the board element 418 may create tension in the image substrate 404 across the front surface of the image display 400 creating a taut condition of the image substrate 404. The first peripheral elements 414 may be rotated to a generally perpendicular position relative to the front surface of the image display 400 and the rear slot 438 of the peripheral elements 414 may engage the rear board element 420. As such, the two first peripheral elements 414 each extend perpendicular to the front board element 418. The respective structural elements 416, may be rotated together with an additional fold of the image substrate 404 to position such first structural element 416 against the rear surface of the rear board element 420 and perpendicular to the respective first peripheral element 414. The structural element 416 may be secured to the rear board element 420 with an adhesive as previously described to preclude the adjacent peripheral elements 414 from rotating outwardly relative to each other and thus maintain the taut condition of the image substrate 404.

Figure 27:
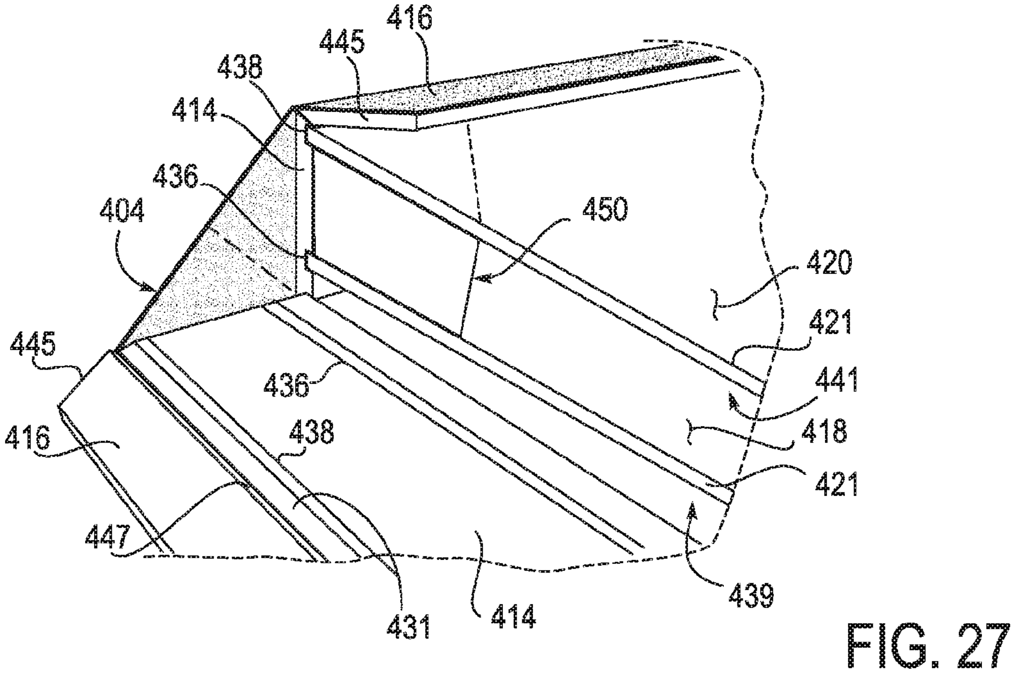
FIG. 27 is a side perspective view, similar to FIG. 25, of another embodiment of the image display of the present invention during the assembly thereof.

As shown in FIG. 27, as the additional two peripheral elements 414 on the adjacent sides of the image display 400, that is the two peripheral elements 414 extending substantially perpendicular to the two first-named peripheral elements discussed above, are rotated into position in a manner similar to the two first-named peripheral elements 414, the excess image substrate 404 at the corners may be pulled between the intersecting corners of the additional, opposed peripheral elements 414 and may be sandwiched between the edge modifications of the additional peripheral elements 414 to create a clean corner on the image substrate 404. The additional or second peripheral elements 414 may be rotated against the front board element 418 creating tension in the image substrate 404 in a direction perpendicular to the previously induced tension on the image substrate 404. The ends of adjoining first and second peripheral elements 414, such as abutting inclined end surfaces 433, can be secured together by any suitable means, such as by any of the adhesives discussed herein, to secure the four peripheral elements 414 together in a rectangular or other closed configuration and abutting the front and rear board elements 418 and 420. Once the second peripheral elements 414 are rotated into position, the respective additional or second structural elements 416 may be rotated and secured to the rear surface of the rear board element 420. The ends of adjoining first and second structural elements 416, such as abutting inclined end surfaces 445, can be secured together by any suitable means, such as by any of the adhesives discussed herein, to secure the four structural elements 416 together in a rectangular or other closed configuration and overlying the rear surface of rear board element 420. Accordingly, the image substrate 404 may be maintained in a taut condition allowing for clear and clean display of the image imparted on the image substrate 404.

The assembled image display 400 may include closed peripheral structure 460 formed from the four elongate peripheral elements 414. The closed peripheral structure 460 may define an internal cavity 462 with first and second ends 464, 466. The image substrate 404 may extend across the first end 464 and the rear board element 420 may be positioned adjacent the second end 466 to close the cavity 462. The internal cavity 462 may be divided into a plurality of compartments. For example, the space between image substrate 404 and the front board element 418 may include an image compartment 439 and the space between the board elements may include a board compartment 441.

The structural elements 416 folded over the rear surface of the rear board element 420 may create a rear recess 468 having a depth substantially equal to the thickness of the structural elements 416. An orientation device 408 in the form of a picture hanger may be provided having a thickness substantially equal to the recess depth allowing the image display 400 to be hung on a wall, for example, in a flush condition. This in contrast to the often outwardly tipped position of common wall art. Other orientation devices 408 may be provided including legs for supporting the image display 400 on a horizontal surface such as a table for example. The orientation device 408 may be separate from and attached to the rear board element 420 or may be a cutout portion thereof similar to that shown with respect to image display 200 in FIG. 7.

Figure 28:
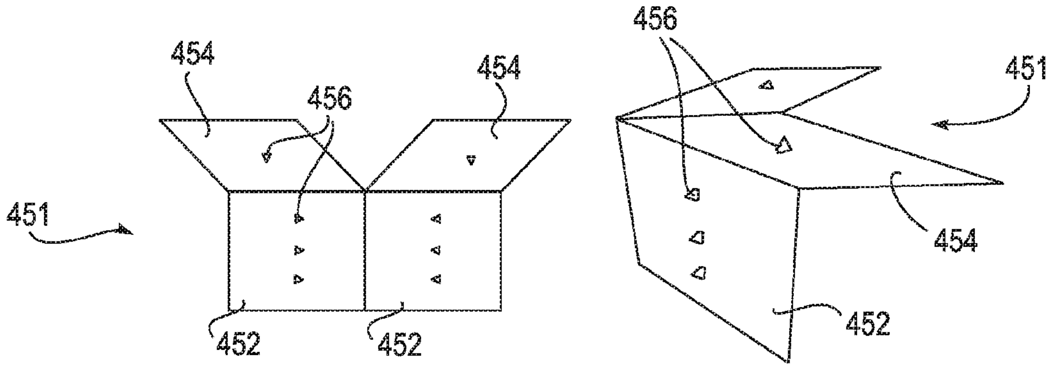
FIG. 28 is a perspective view of an unformed corner brace for use in yet another embodiment of the image display of the present invention.
Figure 29:
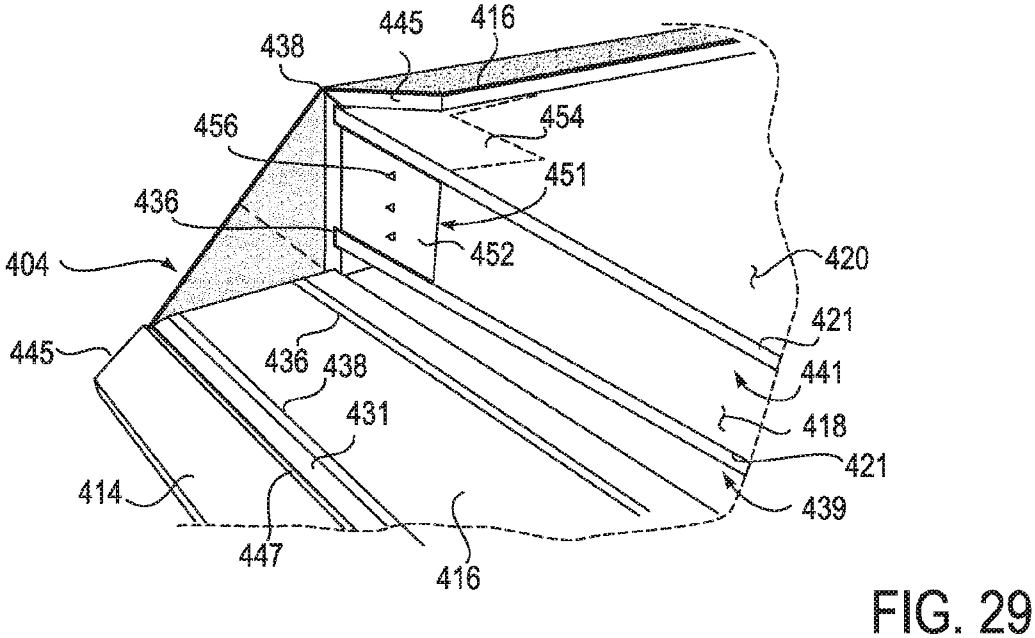
FIG. 29 is a perspective view, similar to FIG. 27, of the image display utilizing the corner brace of FIG. 28.

As shown in FIGS. 27-29, the image display 400 may also include corner braces 450. The corner braces 450 may be secured by any suitable means to the inner side faces 426 of adjoining peripheral elements 414 at the ends of the elements 414 so as to enhance the connection of the ends of the adjoining peripheral elements 414 and thus better maintain the image substrate in tension and the front board 418 in compression. The braces 450 are configured to further secure adjoining peripheral elements 414 together at each corner of the image display 400 and thus prevent the peripheral elements from separating under the force of the taut image substrate 404. In addition, the corner braces 450 may reinforce the corners of the image display 400 and resist damage due to impact. Still further, the corner braces 450 may resist cracking of the image display 400 where the board elements 418 and 420 shift laterally relative to one another. The corner braces may be positioned in the corners of the image display and between the board elements 418 and 420 within the board compartment 441. Accordingly, the corner braces 450 may have a formed height not greater than the distance between the board elements 418 and 420. To further enhance the rigidity and strength of the support structure 402, and thus resist the separation of adjoining peripheral elements 414 under the force of the tensioned image substrate 404, the corner braces 450 may optionally secured to the front or inners surface of the rear board element 420. Further optionally, the corner braces 450 may be secured to the rear surface of the front board element 418. Accordingly, the corner braces 450 may be positioned between the board elements 418 and 420 and may be adhered to the board elements 418 and 420 and the peripheral elements 414. In other embodiments, the corner braces 450 may be adhered to the peripheral elements 414 and one of the board elements 418 and 420. As shown in FIG. 27, the corner braces 450 may be solid blocks cut from, for example, wood, foam, plastic, or other suitably rigid materials. In some embodiments, the corner braces 450 may be polystyrene, polyvinyl chloride (PVC), acrylonitrile butadiene styrene (ABS), medium-density fiberboard (MDF), polyethylene, or polypropylene. In some embodiments, the corner brace 450 may be a triangular block or an L-shaped block. Other shaped blocks may also be provided.

In another embodiment, as shown in FIGS. 28 and 29, formable corner braces 451 may be provided. The formable corner braces 451 may be formable from a flat piece of material or blank as shown. The formable braces may have two side portions 452 with rear flaps 454. The side portions 452 may be separated by a fold line, score mark, or crease allowing the side portions 452 to be folded relative to one another to form an angle, for example 90 degrees. The rear flaps 454 may be extend from the side portions 452 at an angle, for example 45 degrees and may be separated from their respective side portions 452 by a fold line or crease. Accordingly, the flaps 454 may be folded relative to the side portions 452, for example 90 degrees, and when the side portions are folded relative to one another, the flaps 454 may be brought together to form the corner brace 451. As shown, the corner brace 451 may also include teeth or spikes 456 for engaging the inner surface 426 of the ends of adjoining peripheral elements 414 and for optionally engaging the board elements 418 and 420, all as discussed above with respect to corner braces 450. While the present corner braces 451 are shown to include a single flap 454 for each side portion 452, two flaps 454 may be provided, one on each opposite side of the side portion 452. The corner braces 451 may have a size similar to corner braces 450, and may be formed from a light gauge metal or plastic material. In one embodiment, the corner brace 451 may be formed from any suitable metal such as steel. In another embodiment, the corner braces 451 can be injection molded and formed from a suitable material such as plastic. Other materials may also be used.

In the process of assembly discussed above, the corner braces 451 may be formed by folding as described and may be positioned between the board elements 418 and 420 and secured to the inner surface 426 of the ends of adjoining peripheral elements 414. The corner braces 451 may optionally be secured to one of the board elements 418 and 420, for example rear board 420 for enhancing the rigidity and strength of support structure 402 as discussed above, by any suitable means such as teeth 456, an adhesive or both. The corner braces 451 may be engaged with the peripheral elements 414 as they are folded to form the display 400. In other embodiments, flaps 454 can be provided on each side of the side portion 452 of the corner brace 451 so that the corner brace can be secured to both board elements 418 and 420.

Figure 30:
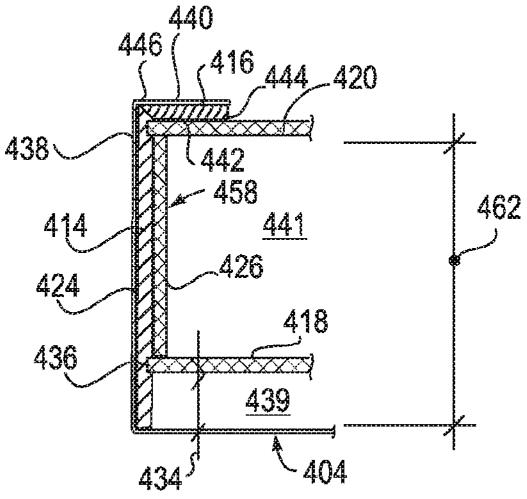
FIG. 30 is a cross-sectional view, similar to FIG. 25, of yet a further embodiment of the image display of the present invention during the assembly thereof.

In some embodiments, as shown in FIG. 30, the board elements 418 and 420 may be separated by a spacer strip 458 extending around the periphery of the cavity and positioned between the board elements 418 and 420. The spacer strip 458 may be placed on end and function to maintain the spacing between the board elements. In addition, the ends of the spacer strip may provide a surface or stop against which the board elements 418 and 420 may be pressed when being placed. This can be particularly advantageous if the adhesive being used relies on pressure for securing the elements. In this embodiment, the slots 436 and 438 may be omitted, so as to reduce the complexity of the configuration of the peripheral elements 414, or the spacer strip may be used in conjunction therewith. The spacer strip 458 may extend along the full internal length of the peripheral elements 414 and may have end modifications similar to the peripheral elements 414 to provide flush intersections at the corners. In some embodiments, the spacer strip 458 may be a foldable flap secured to the inner surface 426 of the peripheral elements 414. In other embodiments, the spacer strip 458 may be a raised portion of the inner surface 426 of the peripheral element 414. In other embodiments, the slots 436 and 438 and the spacer strip 458 may be omitted and the board elements 418 and 420 may be adhered to the peripheral elements 414. In still further embodiments, the board elements 418 and 420 and spacer strips 458 on opposite sides of the cavity 462 may be one piece, for example, a cut length of a hollow or solid extrusion for example. In the case of a hollow extrusion, the adjacent ends may be left open or they may be closed with additional spacer strips 458.

Figure 31:
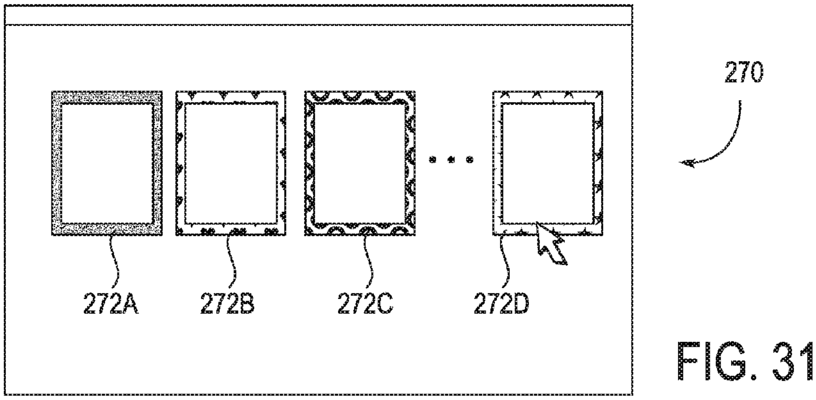
FIG. 31 is a schematic computer screen shot of an online process for ordering an image display of the present invention.
Figure 32A:
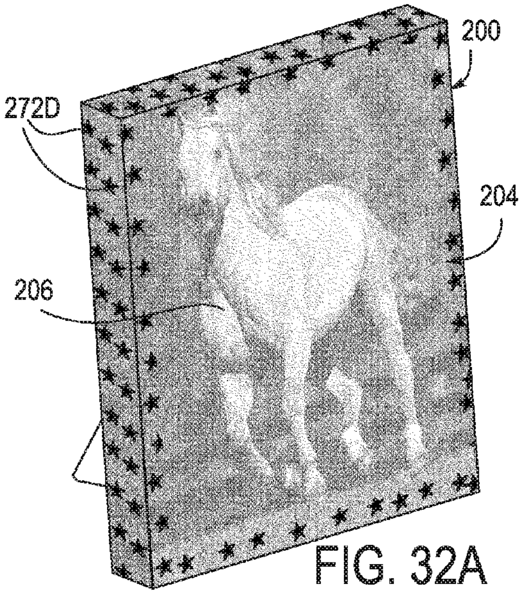
FIGS. 32A and 32B are two embodiments of the image display of FIG. 6 ordered in accordance with the online process of FIG. 31.
Figure 32B:
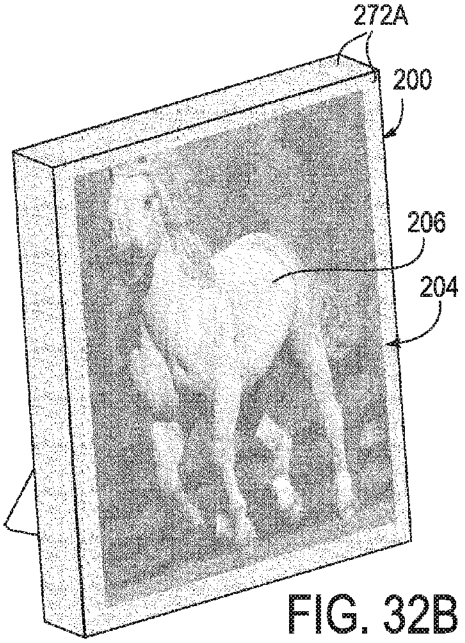

A method of ordering an image display according to the present disclosure is illustrated in FIGS. 31-32. FIG. 31 shows an exemplary view of a series of borders or designs that may be made available for framing or otherwise utilizing with an image. For simplicity, the procedure illustrated in FIGS. 31-32 is shown with respect to image display 200, although it is appreciated that such procedure is applicable to any image display of the present invention. As shown, a user may log on to a webpage 270 of a suitable website and may be presented with a screen of options relating to the type of image display 200 they are interested in. The user may select from the available options and the resulting image display 200 may reflect the selection made. For example, border options 272 may be provided in the form of a texture border 272A, a heart border 272B, a circle border 272C, or a star border 272D. If a star border 272D is selected, an image display 200 having a star border as shown in FIG. 32A may be provided. As shown, the star boarder 272D may infiltrate the image 206 and may be superimposed thereon or the border, for example, 272A may cover or crop the image 406. In this latter example, the image substrate 204 may extends down the edges of the support structure 210, but the image 406 may be limited to a portion of the planar wall 237 smaller than the full extent of the wall 237. The portion beyond the image 206 may be covered and may depict a border 272A, for example.

A clear polymer coating may be applied atop any of the printed images of the display images of the present invention. Such a coating can provide a scratch resistant and washable surface over the printed image and protect against cracking and ultraviolet light.

While the image display has been described with reference to four embodiments, modifications or changes to the embodiments described may be made and still be within the scope of the invention. For example, the base of the support structure may be a block, a ball, or some other three-dimensional shape, where the mounting surface is just one surface thereof. That is, the base is not limited to a planar structure. In another embodiment, the support structure may include a curved surface or jagged surface for displaying the image. Where a jagged surface is provided, edges, corners, or other discontinuities in the surface may correspond to features of the image being displayed.

In another example, where the edge of the support structure or image substrate is continuous, that is for example a round or oval periphery, folding of the edge may be difficult due to an arcuate shaped edge. In these cases, the edge of the support structure or image substrate may include intermittent slits which may reduce the length of the arc to be folded thereby reducing any warping of the edge due to folding. As such, the edge modifications described may include such slits.

In yet another example of a modification to the embodiments described, the peripheral structure forming the peripheral cavity and being part of the rigidity frame may have a cross-section other than the rectangular cross-section show in FIG. 20. That is, for example, the cross-section may be two sided in a situation where a flap is merely folded over and secured to the back surface of the mounting surface. In another embodiment the cross-section may be three sided or triangular where the flap fold is folded more than 90 degrees such that the flap portion of the folding flap returns diagonally to the back surface of the mounting surface. In still another embodiment, the triangular cross section may be provided where the edge fold is folded more than 90 degrees and the edge portion of the folding flap extends diagonally rearward and inward away from the edge of the mounting surface. A return fold may then be provided and a return portion of the folding flap can return to the back surface of the mounting surface. In still other embodiments, the folding flap may be merely rolled backward away from the mounting surface similar to a scroll providing a round or oval cross-section for the peripheral structure and cavity.

In any of the above embodiments, the rigidity frame can include stiffening elements provided to fit within the peripheral cavity of the peripheral structure extending around all or a portion rear periphery of the mounting surface and formed by the folding flap.

In still other embodiments, the image substrate, either as part of the support structure or separate therefrom, may alternatively be a board-like material in the form of plastic, rubber, cardboard, fiberboard, wood, or metal. Other board-like materials can also be used.

Figure 33:
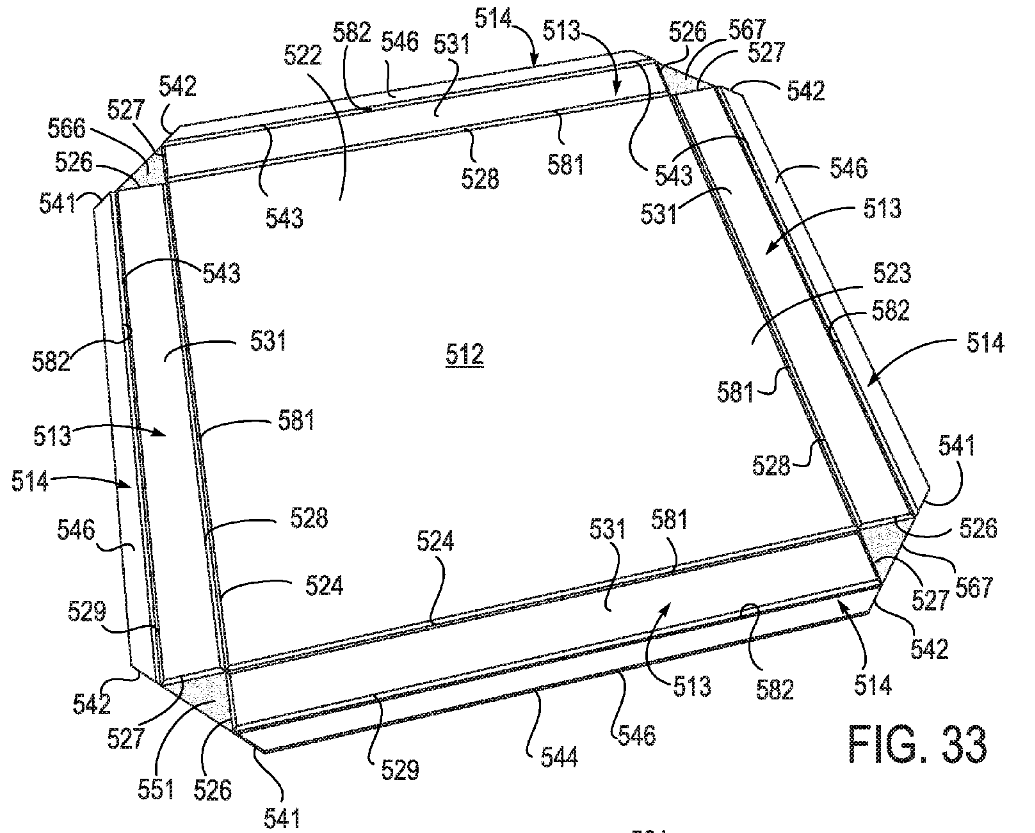
FIG. 33 is a rear view of a portion of a disassembled support structure of another embodiment of the image display of present invention.
Figure 34:
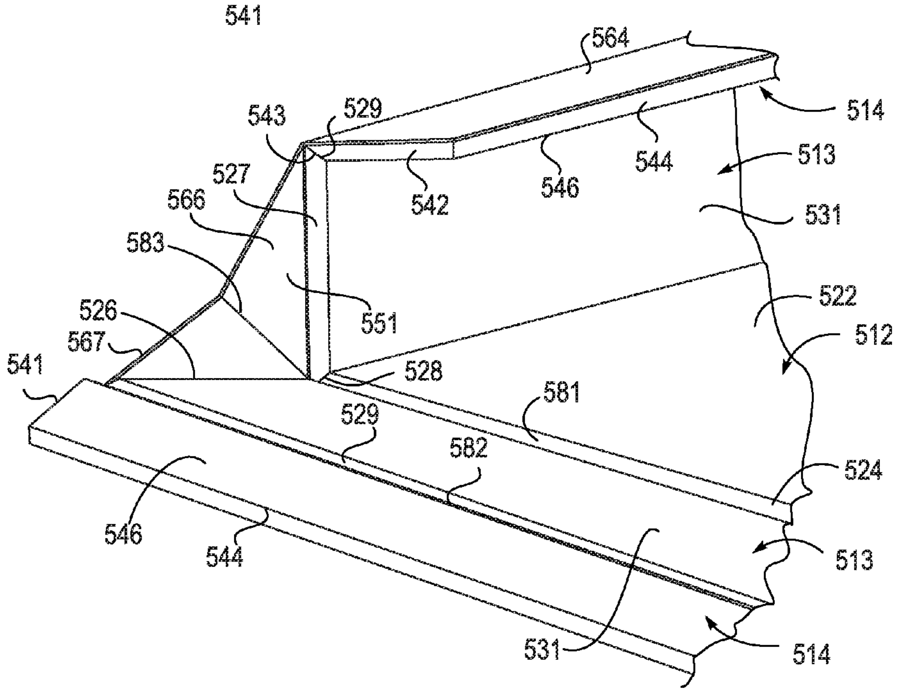
FIG. 34 is a side isometric view of the image display of FIG. 33 during the assembly thereof.
Figure 35:
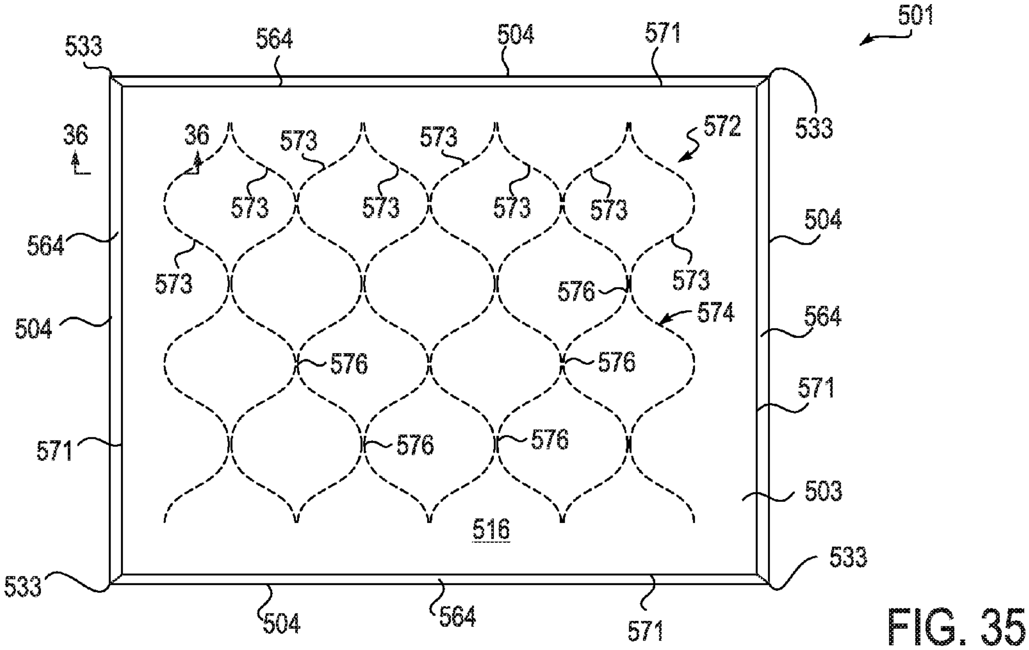
FIG. 35 is a rear plan view of the assembled image display of FIG. 33.
Figure 36:
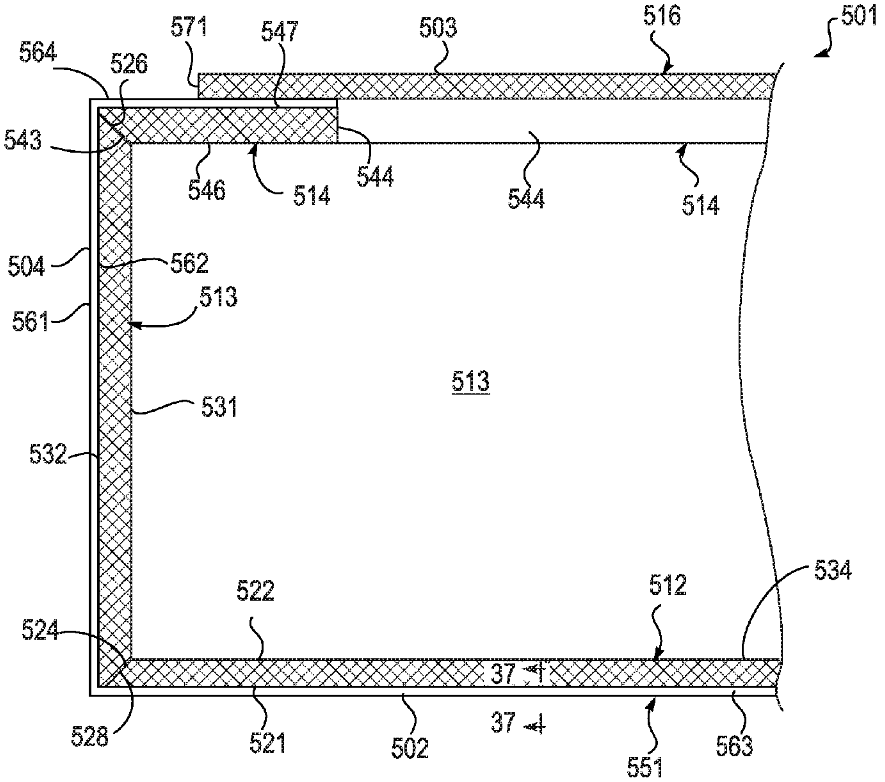
FIG. 36 is a cross-sectional view, taken along the line 36-36 of FIG. 35, of the assembled image display of FIG. 33.

Another embodiment of an image display of the present invention is illustrated in FIGS. 33-38. Image display 501 therein has the appearance of a sheet of a suitable image substrate stretched over a wooden stretcher bar frame. Image display 501 can be of any suitable size and shape, and is generally planar in construction and has a thickness or depth ranging from 0.5 to 4.0 inches. In certain embodiments, the image display has a thickness or depth of approximately 0.5, 1.25, 2.0 or 4.0 inches. It is appreciated that the image displays of the present invention can be circular in plan, have a peripheral edge or other periphery that is arcuate, linear or a combination of arcuate and linear segments, or be spherical or other than a parallelpiped in shape. In one embodiment, the image display has the appearance of a polygon when viewed in plan, and thus has a plurality of linear or planar side surfaces and can be formed with a plurality of linear segments that are joined end-to-end to form a polygon. In one embodiment, image display 501 is rectangular in plan and, as illustrated in FIGS. 35-36, is provided with a first or front planar surface 502, an opposite second or rear planar surface 503 and four planar side surfaces 504 extending perpendicularly between the front and rear surfaces 502, 503.

In place of a conventional wooden stretcher bar frame, images display 501 include a support structure 511 formed from a front or central sheet 512, a plurality of peripheral or side strips 513 and a plurality of optional backs strips 514. An optional back sheet 516 can be included in the support structure, and the support structure 511 can be made from any suitable materials such as paperboard, cardboard, fiberboard, wood, metal or plastic. One suitable fiberboard is medium density fiberboard or MDF or high density fiberboard or HDF. In one embodiment, the central sheet 512, side strips 513 and back strips 514 are each made from fiberboard and the back sheet 516 is made from either fiberboard or paperboard. Support structure 511 can be substantially rigid, and each of the elements of the substantially rigid support structure 511 can be of any suitable thickness, and where central sheet 512, side strips 513, back strips 514 and back sheet 516 are made from fiberboard in one embodiment have a thickness ranging from 0.020 to 0.250 inch, in one embodiment have a thickness ranging from 0.020 to 0.150 inch, and in one embodiment have a thickness of approximately 0.060 inch. In FIGS.

33-36, each of the central sheet 512, side strips 513, back strips 514 and the back sheet 516 can be made of fiberboard.

When image display 501 is substantially rectangular when in viewed in plan, central sheet 512 can be similarly rectangular in plan and have a length and width approximating the length and width of the image display 501. Although the planar central sheet can be perforated, for example be provided with a central rectangular or circular opening so as to reduce the material of the central sheet, in one embodiment the substantially rigid central sheet 512 is a solid, non-perforated and continuous sheet having a first or front surface or front 521, an opposite second or rear surface or rear 522 and a periphery 523 formed from a plurality of four edges 524. The external or front surface 521 can be substantially planar, and in one embodiment each of the elements of the support structure 511 are substantially planar. Each such edge 524 extends perpendicular to the two adjacent edges 524.

A plurality of four peripheral or side strips 513 extend alongside the periphery of the central sheet 512 and more specifically each side strip 513 extends along a respective edge 524 of the central sheet and is inclined rearwardly of the central sheet. In one embodiment, each of the planar side strips 513 is rectangular in plan and has a length approximating the length of the respective sheet edge 524 along which the strip 513 extends. The side strips 513 each have a width approximating the width of the image display 501. Each of the strips has opposite ends 526 and 527, and in one embodiment where the strips 513 extend perpendicularly of the central sheet 512, the strips 513 are joined end-to-end such that end 526 of one strip 513 adjoin end 527 of the adjacent strip 513. Each of the strips 513 is provided with a first side edge 528 and an opposite second side edge 529, the first edge extending alongside the respective edge 524 of the central sheet 512. Strips 513 further include a first or inner surface 531 and an opposite second or outer surface 532. When the support structure 511 is assembled, the outer surfaces of the end-to-end side strips 513 form a peripheral side surface of the support structure.

In one embodiment, each edge 524 of the sheet 512 is beveled at a suitable angle such as 45° between front 521 and rear 522 of the sheet, and the first edge 528 of the each strip 513 is beveled at a suitable angle such as 45° relative to the inner surface 531 and outer surface 532 of the strip so that respective adjoining edges 524 and 528 seat flush with each other. Similarly, the first end 526 and the second end 527 of each strip 513 is angled or beveled at a suitable angle such as 45° relative to inner surface 531 and outer surface 532 of the strip such that the ends 526 and 527 of adjoining strips 513 seat flush with each other at the corner 533 formed by such adjoining strips 513. Rear surface 522 of central sheet 512 and inner surfaces 531 of the strips 513 form a cavity 534 behind central sheet of 512 of the support structure 511.

The plurality of planar back strips 514 are preferably equal in number to the plurality of side strips 513. Each of the back strips 514 has a first end 541 and an opposite second end 542, and a first edge 543 and an opposite second edge 544 extending between ends 541 and 542. A first or inner surface 546 and an opposite second or outer surface 547 extend between the ends and edges of each strip 514. The back strips 514 can each have a width, that is between edges 543 and 544, ranging from 0.250 to 1.00 inch and in one embodiment a width of approximately 0.50 inch. A back strip 514 extends alongside each side strip 513 and in one embodiment extends perpendicular to the side strip 513 and thus parallel to central to sheet 512. Second edge 529 of each side strip 513 can be beveled at a suitable angle such as 45° between surfaces 531 and 532 of the strip of 513, and first edge 543 of each back strip 514 can be beveled at a suitable angle such as 45° between surfaces 546 and 547 of the back strip 514, such that abutting edge 529 of the side strip and edge 543 of the back strip are flush with each other. Second edge 544 of each back strip can be of any suitable angle and in one embodiment is a butt edge, that is at 90° relative to inner and outer surfaces 546,547 of the back strip 514. The first end 541 and second end 542 of each back strip 514 can be mitered between edges 543 and 544 at a suitable angle such as 45° such that ends 541 and 542 of adjoining back strips 514 seat flush with each other when the back strips 514 are joined end-to-end at 90° relative to each other. The back strips 514 extend inwardly of respective side strips 513 and overlie at least a portion of periphery 523 of central sheet 512 and a portion of cavity 534.

Figure 37:
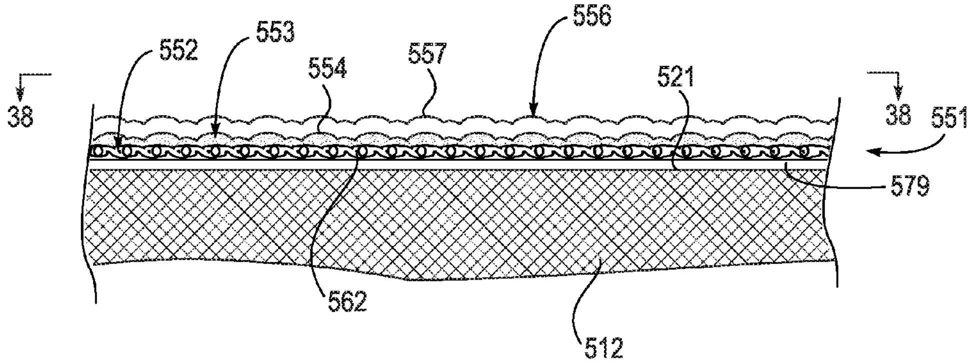
FIG. 37 is an enlarged cross-sectional view, taken along the line 37-37 of FIG. 36 and rotated 180°, of a portion of the image display of FIG. 33.
Figure 38:
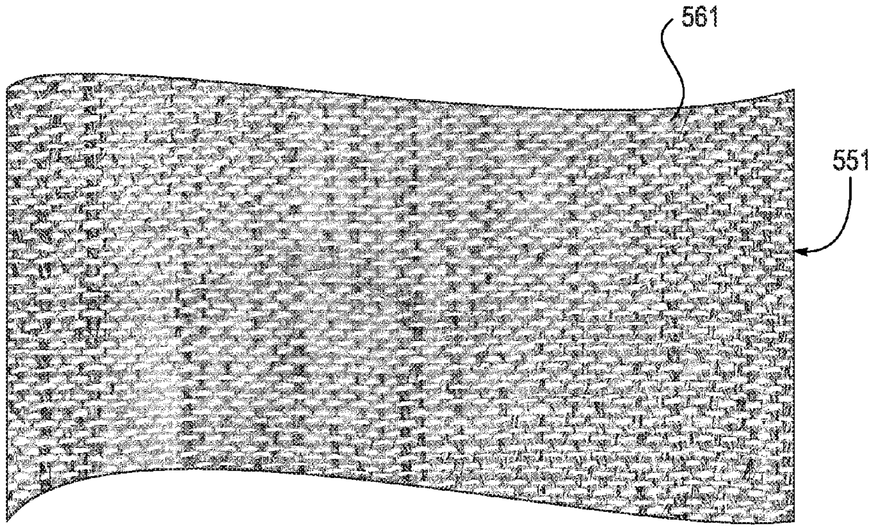
FIG. 38 is a plan view, taken along the line 38-38 of FIG. 37, of a portion of the image display of FIG. 33.

Image display 501 includes an image substrate 551 that overlies at least central sheet 512 of the support structure 511. Image substrate 551 can be of any suitable type, for example image substrate 104 discussed above. In one embodiment, image substrate 551 can be a textile-like material that resembles artist's canvas, as illustrated in FIGS. 37-38. In one embodiment, image substrate 551 includes a membranous layer 552 made from any suitable material such as a textile fabric and in one embodiment a suitable woven textile fabric. The membranous or textile layer 552 can be formed from a cotton woven textile, a polyester woven textile or other synthetic or natural fiber woven textile, a linen, or a combination or blend of some or all of the foregoing. In one embodiment, the layer 552 can be formed from a microporous film, for example one which is polyolefin-based with 60% of its weight comprised of non-abrasive filler and 65% of its volume comprised of air. A suitable such film is the TESLIN™ substrate manufactured by PPG Industries of Monroeville, Pa. The woven textile can be a coarse woven textile, such as canvas, an open weave textile, a fine or tightly woven textile, a loosely woven textile or a combination of the foregoing. The weight of the woven textile can range from 2-12 ounces per square yard, and can include woven textiles ranging from 2 to 5 ounces per square yard or from 3 to 4 ounces per square yard, sometimes referred to as light weight woven textiles, woven textiles ranging from 7 to 9 ounces per square yard, sometimes referred to mid-range woven textiles, and woven textiles ranging from 10 to 12 ounces per square yard, sometimes referred to as a heavy-weight woven textiles. In one embodiment, textile layer 552 is formed from a fine, tightly-woven textile, which can be smooth so as to minimize any texture in the layer 552, and has a weight ranging from 2 to 5 ounces per square yard. Textile or base layer 552 can have a thickness ranging from 0.005 to 0.030 inch and in one embodiment has a thickness of approximately 0.015 inch. Textile or base layer 552 can be printable.

Image substrate 551 can further include at least one optional plastic layer overlying substrate layer 552. Such at least one plastic layer can include a plastic or polymer layer 553 overlying base or substrate layer 552. Suitable plastics include thermoplastics or thermo softening plastics, as well as thermosetting plastics. Layer 553 can be joined or adhered to base layer 552 by any suitable means and in one embodiment can be a preformed or other film that is laminated to the base layer 552. In one embodiment, the layer 553 can be applied over the base layer 552 as a liquid. In one embodiment, the layer 553 is extruded onto the base layer 552, for example in the form of a sheet or film and allowed to solidify affixed to the base layer. Suitable materials for plastic or polymer layer 533 include polyurethanes, polyesters, acrylics, vinyl polymers, polyolefins, polyamides, polyethers, epoxy based polymers, cellulosic polymers, polycarbonates and synthetic and natural rubbers, as well as mixtures, blends and copolymers utilizing some or all of the foregoing materials and other materials included to achieve the desired properties of the layer 553. The polymers may be thermoplastics, thermosets or cross-linked. Examples of thermoset materials include melamine, urea or benzoguanamine formaldehyde polymers, isocyanates and epoxy cross-linked materials. Examples of cross-linked materials include ultraviolet or electron beam cured acrylates, epoxys, vinyl ethers and polyols. The foregoing materials and compositions are not confined to any particular polymer architecture and the polymers can be linear, branched or dendritic. The plastic or polymer layer 553 can have a thickness ranging from 0.0005 to 0.020 inch and in one embodiment has a thickness of approximately 0.001 inch. The thickness and composition of the plastic or polymer layer 553 can be dependent upon factors that can include the composition and any texture of the membranous layer 552, the depth of any desired emboss of the image substrate 551, the amount of the material of the polymer layer 553 needed to provide a white or other desired color to the polymer layer 553, the desired opacity of the layer 553, any desired anti-fungal, anti-static and/or ultraviolet resistant properties of the layer 553, the desired rigidity of the layer 553, the finish of the layer 553, for example a matte or glossy finish, any desired moisture resistance or barrier coating properties of the layer 553 and any desired darkening effect of the layer 553 when exposed to light. The thickness and composition of the layer 553 can also be chosen to prevent deterioration when the image substrate 551 is exposed to the environment, for example ultraviolet light or humidity, to provide resistance to chemicals such as household cleaners and sprays and to serve as a flame retardant. Plastic or polymer layer 553 has a top or outer surface 554.

Image substrate 551 can optionally include one or more additional layers or coatings overlying the substrate layer 552. In certain embodiments, substrate layer 552 is printable without the need of a print-receptive coating and thus one or more such additional layers or coatings may not be needed for image substrate 551. In one embodiment, however, the at least one plastic layer includes a suitable print-receptive coating 556 that can overlie the top surface of substrate layer 552, or the top surface 554 of plastic or polymer layer 553. Print receptivity can include all or a combination of any of the following qualities: good adhesion to suitable inks such as water-based inks, solvent-based inks, ultraviolet or UV inks and oil-based inks, whether dye based or pigment based, and any suitable combination of the foregoing inks; good adhesion to toner based printing; a controlled and well defined immediate and long-term dot gain, for example from an ink-jet printer; hold out, for example the retention of the ink on the top surface of the coating or layer and not penetrating into the coating or layer or otherwise losing color strength; and no dot skip, for example undulations may occur in the surface being printed that can cause ink jet drops to be hidden and give the appearance of poor print quality. Where receptivity is to dye-based inks, the dye can be anchored to inhibit or prevent migration or bleed. Suitable print-receptive coatings can include thermoplastics or thermo softening plastics, as well as thermosetting plastics, and can include polyurethanes, polyesters, acrylics, vinyl polymers, polyolefins, polyamides, polyethers, epoxy based polymers, cellulosic polymers, polycarbonates and synthetic and natural rubbers, as well as mixtures, blends and copolymers utilizing some or all of the foregoing materials and other materials included to achieve the desired properties of the coating. The polymers may be thermoplastics, thermosets or cross-linked. Examples of thermoset materials include melamine, urea or benzoguanamine formaldehyde polymers, isocyanates and epoxy cross-linked materials. Examples of cross-linked materials include ultraviolet or electron beam cured acrylates, epoxys, vinyl ethers and polyols. The foregoing materials and compositions are not confined to any particular polymer architecture and the polymers can be linear, branched or dendritic. Coatings 556 can be of any suitable thickness and can range in thickness from 0.001 to 0.020 inch and in one embodiment approximately 0.004 inch. The thickness and composition of the coating 556 can be dependent upon factors that can include the composition and any texture of the membranous layer 552, the composition and thickness of the plastic or polymer layer 553, the depth of any desired emboss of the image substrate 551, the amount of the material of the coating 556 needed to provide a white or other desired color to the coating 556, the desired opacity of the coating 556, any desired anti-fungal, anti-static and/or ultraviolet resistant properties of the coating 556, the desired rigidity of the layer 553, the finish of the layer 553, for example a matte or glossy finish, any desired moisture resistance or barrier coating properties of the layer 553 and any desired darkening effect of the layer 553 when exposed to light. The thickness and composition of the coating can also be chosen to prevent deterioration when the image substrate 551 is exposed to the environment, for example ultraviolet light or humidity, to provide resistance to chemicals such as household cleaners and sprays and to serve as a flame retardant. It is appreciated that the desired qualities of coating 556 can be depend on the composition and thickness of any underlying plastic or polymer layer 553, and thus the composition and thickness of one or both of layer 553 and coating 556 can be adjusted to effect the qualities of coating 556. In one embodiment, image substrate 551 can be free of a print-receptive coating overlying the plastic or polymer layer 533, for example where plastic or polymer layer 553 is print receptive. It is further appreciated that the image substrate 551 can be free of plastic or polymer layer 553. For example, the print receptive coating 556 can be joined or adhered directly to substrate layer 552.

Image substrate can be further optionally treated with a flame retardant to render it flameproof, to hinder damage due to ultraviolet light, moisture or humidity or any combination of the foregoing or any other protective coating (not shown) which can serve as the top or outer surface of the image substrate 551. Such a protective coating can overlie the penultimate outer layer of the image substrate 551, which as discussed above can be the substrate layer 552, the plastic or polymer layer 553 or the print-receptive coating 556 or can be any other layer of the image substrate 551.

Image substrate 551 has a top or outer surface 557, which for example can be the top surface of substrate layer 552 or the top surface 554 of plastic or polymer layer 553 where no print-receptive coating 556 is included in the image substrate or can be the top surface of the print-receptive coating where such a coating 556 is utilized in image substrate 551 and, for example, overlies the substrate layer 552 or the polymer layer 553, or can be any protective coating provided as an outer layer of the image substrate 551. Under some circumstances the top surface 557 can reflect the weave or other texture of the base layer 552 and, as such, top surface 557 is textured or provided with a texture or design thereon. The amount of the texture or weave of base layer 552 that carries over or is reflected in top surface 555 is dependent upon a number of factors, including the coarseness of the weave, the amount of texture in base layer 552, the thickness and consistency of plastic or polymer layer 553 and the thickness of any print-receptive coating 556.

In another embodiment of image substrate 551, base or substrate layer 552 of the image substrate 551 can be formed from a non-woven textile or a fibrous material such as paper. The weight of such a non-woven textile or fibrous layer 552 can be chosen so as to provide image substrate 551 with the desired qualities of thickness and weight. In one embodiment where the substrate layer is formed from paper, the weight of paper layer 552 can range from 15 to 80 pounds per 3000 square feet and in one embodiment has a weight of approximately 30 pounds per 3000 square feet. As discussed above, a plastic or polymer layer 553 can optionally overlie the base layer 552, now formed from paper, and a print-receptive coating 556 can optionally overlie the top surface of the base layer 552 or the top surface 554 of the plastic or polymer layer 553. In one embodiment where substrate layer 552 is formed from a non-woven textile or a fibrous material such as paper, a print-receptive layer 552 is applied directly to such substrate layer 552 without an intervening plastic or polymer layer 553, and thus the image substrate 551 is free of a plastic or polymer layer 553. An optional protective coating can be provided as an outer layer of such embodiment of image substrate 551.

Top or front surface 557 of the image substrate 551 can be optionally embossed or otherwise treated so as to provide a desired texture or other appearance to all or a portion of the top surface 557. In one embodiment, top surface 557 is embossed as to have the appearance of a woven textile such as canvas. The embossing or other treating of top surface 557 may be particularly desirable where base layer 552 has little texture. For example, where base layer 552 is a fine, tightly woven textile with a surface that is relatively smooth, or the base layer 552 is formed from a non-woven textile or a fibrous material such as paper, top surface 557 can be embossed with the texture or appearance of a course, heavy or other woven textile, thus for example providing image substrate 551 with an appearance that resembles an artist canvas or other material with a coarse, heavy or other woven textile appearance. In a woven textile, the warp is the set of lengthwise yarns and the yarn that is inserted over-and-under the warp yarns is called the weft, woof or filler. Thus, top surface 557 of the image substrate 551 can be embossed to have the appearance of woven warp and weft yarns, for example of a woven textile such as canvas. For example, top surface 557 can be embossed to have the appearance of cotton duck canvas coated with an acrylic, of coated cotton canvas or of coated canvas, where in each case the canvas can be of any weight, and thus have the appearance of an artist canvas. It is appreciated that all or any portion of top surface 554 can be embossed with any suitable pattern, design, texture, image or novel effect, for example the top surface 554 can be embossed with a fanciful image, drawing or picture that underlies the image to be printed on the substrate 551. Suitable textures include the texture of paint brush strokes, the texture of paint brush strokes on artist canvas, the texture of bamboo or cork, the texture of the outer surface of an orange.

Top surface 557 of image substrate 551 can be embossed in any suitable manner. For example, the top surface 557 can be embossed with a roller. The depth of the embossing can vary, and depend for example on the depth of the texture or design to be created in the top surface 557. The embossing can extend into some or all of the layers of the image substrate. For example, the embossing can extend through both the plastic or polymer layer 553 and any print-receptive coating 556, only the polymer layer 553 or only the print-receptive coating 556. Where the layers being embossed are in a solid state, or otherwise not capable of retaining a deformity created therein without being heated or elevated in temperature, a heated roller can be utilized. Thus for example where both the polymer layer 553 and coating 556 are in a solid state, or in a state in which they cannot be deformed without the application of heat, whether after having been respectively applied for example as respective films and laminated to respective underlying layers or sequentially applied as coatings that have respectively solidified, a heated roller (not shown) can be utilized to emboss into or deform one or both of such layers and provide top surface 557 with a textured appearance. Where the one or more layers of the image substrate 551 to be embossed are in a liquid or other deformable state, the roller may not have to be heated. In one embodiment where substrate layer 552 is formed from a membranous or textile layer that is not deformable or otherwise not suitable for being embossed, and where image substrate 551 includes both polymer layer 553 and coating 556, both layer 553 and coating 556 are embossed or deformed to provide the top surface 557 of the image substrate with the desired texture, design or appearance. In one embodiment where substrate layer 552 is formed from a non-woven textile or fibrous material such as paper, and where image substrate 551 does not include polymer layer 553 but instead print-receptive coating 556 directly overlies the paper layer 552, coating 556 and paper layer 552 are embossed or deformed to provide the top surface 557 of the image substrate with the desired texture, design or appearance. It is appreciated that at least certain papers and other materials suitable for layer 552 can be embossed or deformed, and thus one of polymer layer 553 or coating 556 may not be needed and thus not included in the layered structure of the image substrate 551.

As discussed above, image substrate 551 has a first or front surface 557, formed by the outer surface of print-receptive coating 556 or where no such coating is provided formed by the outer surface of image substrate 551 or the outer surface 554 of plastic or polymer layer 553. As discussed above, the first or front surface 557 can also be formed by a protective coating, including any of the protective coatings discussed above. Additionally, the image substrate 551 has an opposite second or rear surface 562, formed by the bottom surface of base or substrate layer 552 (see FIGS. 33-36). The image substrate further includes a central portion 563 and a peripheral portion 564. An image (not shown) is printed on front or outer surface 557, and more specifically on any texture or design provided, embossed or otherwise formed on front surface 557. The image can be printed or otherwise created on outer surface 557 either before or after any embossing of the image substrate 551 and any embossing of the outer surface 557. The image can be created from a single printing pass or multiple printing passes, some or all of which can occur before, after or before and after any embossing of the image substrate. For example, where the image substrate 551 is embossed to have a texture, for example a texture of cork or bamboo, the appearance or image of cork or bamboo can be created in a first printing pass and another desired image, for example an image of a person, created in a second printing pass. It is also appreciated that the appearance or image of an underlying texture, such as the appearance or image of cork or bamboo, can be created in a single printing pass with the other desired image. Thus, for example, a complex or aggregate image of a person overlying the appearance or image of cork or bamboo could be printed in a single printing pass on an image substrate embossed to have the respective texture of cork or bamboo.

It is appreciated that outer surface 557 need not be embossed or otherwise treated, and instead any suitable appearance can be created on the outer surface 557 in a single printing pass or in multiple printing passes. For example, the appearance or image of cork or bamboo can be created in a first printing pass and another desired image, for example an image of a person, created in a second printing pass. It is also appreciated that the appearance or image of an underlying texture, such as the appearance or image of cork or bamboo, along with the other desired image such as an image of a person, can be created in a single printing pass. Thus, for example, a complex or aggregate image of a person overlying the appearance or image of cork or bamboo could be printed in a single printing pass on an image substrate 551 that has not been embossed. Similarly, an image substrate 551 that has not been embossed can be printed to have the appearance of any of the woven textiles or textile-like materials discussed above beneath the other desired image, for example the image of a person.

The image substrate 551 extends across the front of support structure 511 and around the side surfaces of the support structure, that is outer surfaces 532 of side strips 513, and is secured to the support structure so as to have the appearance of being mounted a conventional stretcher bar frame. In this regard, the image covers at least a portion of the central portion 563, can cover all of the central portion 563 and can cover some or all of the peripheral portion 564 in addition to some or all of the central portion 563. Back surface 562 of central portion 563 of the image substrate overlies front 521 of central sheet 512 of the support structure and peripheral portion 564 of the image substrate 551 can optionally extend over outer surfaces 532 of the side strips 513 and can further optionally extend over outer surfaces 547 of the back strips 514. Hence the image substrate 551 can extend across some or all of the central portion 563, some or all of the peripheral portion 564, some or all of outer surfaces 532 of the side strips 513 and some or all of the outer surfaces 547 of the back strips 514. The image formed on outer surface 557 of the image substrate 551 can extend across all or any portion of such outer surface 557. In one embodiment, the back or rear surface 562 of the image substrate is secured directly to the central sheet, the side strips and the back strips in any suitable manner such as being adhered or glued thereto. Image substrate 551 is illustrated, for simplicity, as a single layer in FIGS. 33-36, and is shown as being secured directly to the support structure 512 therein. The image substrate 551 is taunt relative to support structure 511 so that there are no wrinkles or other deformities in the image substrate 551 and the image substrate 551 thus has the appearance of being mounted on a conventional stretcher bar frame. Central sheet 512 provides a rigid backing for central portion 563 of the image substrate 551.

Image display 501 has a clean appearance at each of its corner 553, and in this regard is free of visible flaps or other gathered portions of the image substrate 551. The image substrate 551 is cut to a size which approximates the plan size and shape of the unfolded support structure 511. A flap 566, which can be triangular in shape, extends between the end folded ends 526 and 527 of each adjacent pair of side strips 513. Each flap 566 has an outer edge 567 that is collinear with angled edges 543 and 544 of the adjacent back strips 514. Flaps 566 and edge 567 are illustrated in FIGS. 33-34, wherein back surface 562 of the image substrate 551 is shown at flaps 566 and otherwise underlies central sheet 512, side sheets 513 and back strips 514 of the support structure 512.

Back sheet 516 overlies cavity 534 and is securely coupled to outer surfaces 547 of the back strips 514. The back sheet has a size and shape approximating the plans dimensions of image display 501, and in one embodiment back sheet 516 is rectangular in plan and is formed from a plurality of four linear edges 571 that form the rectangular shape of back sheet 516. The back sheet 516 can have a size and shape not larger than the size and shape of central sheet 512 of the support structure 511. In one preferred embodiment, the back sheet is dimensioned slightly smaller than the dimensions of the central sheet 512. Securement means is provided for rigidly coupling the back sheet 516 to the back strips 514, for example to outer surfaces 547 of the back strips 514. In one embodiment, such securement means includes any suitable adhesive such as glue, and the back sheet 516 is rigidly coupled to back strips 514 by being adhered to or glued to front surface 557 of a portion of the image substrate 551 overlying and adhered to outer surfaces 547 of the back strips 514.

The back sheet provides support structure 511 with a box-like structure, and thus forms a closed support structure 511. Back sheet 516 enhances the retention of side strips 513 and back strips 514 in their positions relative to central sheet 512. In this regard, the rigid coupling of the back sheet 516 to the back strips 514 counterbalances any forces imparted by the image substrate 551 on the support structure 511 that may otherwise urge back strips 514 to pivot away from each other and side strips 513 and the side strips 513 to pivot outwardly from the central sheet 512.

Back sheet 516 further provides image display 501 with a clean appearance from the rear that is free of any staples, fasteners or other retaining devices and hardware for securing the image substrate 551 to the back strips 514.

Edges 571 of the back sheet 516 are inset, that is spaced inwardly, from side surfaces 504 of the image display 501, and outer surfaces 532 of the side strip 513, a distance ranging from 0.100 to 0.375 inch and in one embodiment a distance of approximately 0.025 inch. Such insetting or recessing of back sheet edges 571 from the side surfaces 504 inhibit if not preclude viewing of the edges 571 when image display 501 is mounted on a support surface such as a wall. In addition, such exposed periphery on the rear of the support structure 511 provides an area to clamp or grip the back surface of the image display 501, and more specifically the back strip 514, when positioning and securing back sheet 516 to the support structure 511.

It is appreciated that other embodiments of a substantially rigid support structure can be provided. In one embodiment, such a support structure can include front sheet 512, back sheet 516 and a plurality of side strips 513 secured between the front sheet 512 and the back sheet 516 by any suitable means for forming a closed support structure with an internal cavity 534. In such embodiment, the side strips 513 can be secured to the back sheet 516 without the need of back strips 514, for example in a manner similar to the means in which sides strips 513 are secured to front sheet 512 as discussed above or otherwise. In one embodiment, where four side strips 513 are provided, the support structure would have a box-like structure, or have the shape of a parallepiped. The front sheet 512, side strips 513 and back sheet 516 can be made from any suitable material, for example fiberboard. In one embodiment, the substantially rigid support structure can be formed from a front sheet 512, four side strips 513 and a back sheet 516, each made from fiberboard and joined together in any suitable manner, so as to have the shape of a parallepiped.

An optional internal support 572 can be included in internal cavity 534 of the support structure 511 for enhancing the rigidity of the front sheet 512 of the support structure 511 (see FIG. 35). Although any suitable internal means or structure can be provided for enhancing the rigidity of the front sheet 512, in one embodiment the internal support 572 is a plurality of elements such as strips 573 extending between front sheet 512 and back sheet 516. The strips 573 can be made from any suitable material such as folded paper, paperboard, cardboard, fiberboard, plastic, foam, wood or metal. In one embodiment strips 573 are made from paperboard and secured to each of the sheets 512 and 516 by any suitable means such as an adhesive. Where a plurality of elements 573 are provided, the elements can extend substantially parallel to each other in spaced-apart position in the cavity 534 so as to extend between the sheets 512 and 516 at spaced positions within the cavity, for example substantially throughout the cavity. The elements 573 and can be joined together in any suitable manner so as to form a structure 574 for enhancing rigidity between the elements and thus the rigidity of the front sheet 512. In one embodiment, internal support 572 is formed from a plurality of elements or strips 573 wherein adjacent strips 573 are joined together in spaced-apart positions 576 by any suitable means such as an adhesive and then pulled apart to form a honeycombed internal support or honeycomb structure 572. The two opposite edges of the internal support, for example the opposite edges of each of elements or strips 573, are secured to the respective sheet 512 and 516 by an adhesive or any other suitable means. In one embodiment, the internal support is foam that fills all or a part of the internal cavity 534. Such foam can be flexible or rigid, and can be either added as a liquid and then expanded into foam or be in the form of preformed sheets, strips or other shapes. The foam can extend to the outer periphery of the internal cavity 534, so as to engage the inner surfaces 531 of side strips 513, or be spaced inwardly from some or all of the side strips.

An optional support layer 579 can be included in image display 501 for enhancing the rigidity of support structure 511, for example to hinder twisting or warping of the support structure 511 in all directions, to hinder a concave or convex appearance of the image substrate 551 provided on the front of the support structure 511 or both. Such support layer, which can be made from any suitable material such as paper, paperboard or plastic, can be disposed between image substrate 551 and support structure 511. For simplicity, such optional support layer 579 is shown only in FIG. 37. In one embodiment, support layer 579 is adhered to front 521 of the central sheet 512, outer surfaces 532 of the side strips 513 and outer surfaces 547 of the back strips 514 by any suitable means such as an adhesive or glue. The image substrate 551 can be similarly secured to the support layer 579. Similar to as discussed above with respect to the size and shape of image substrate 551, support layer 579 can have a size and shape approximating the plan size and shape of the unfolded central sheet 512, side strips 513 and back strips 514, as illustrated in FIG. 33. In one embodiment, the at least one layer or support layer 579 does not extend alongside flaps 566, but instead terminates at edges 543 and 544 of the back strips 514. Accordingly, in such embodiment, support layer 579 would not be visible in FIG. 33.

A method is provided for creating an image display such as image display 501. In a providing step of such method, a single sheet of material is provided for forming the support structure of the image display. The sheet of material, which can be a substantially rigid sheet, has opposite first and second surfaces and can be made from any suitable material such as any of the materials discussed above with respect to support structure 511. In one embodiment, the sheet is made from fiberboard and has a thickness corresponding to the thickness of central sheet 512, side strips 513 and back strips 514 of support structure 511 discussed above.

In a next adhering step of the method, at least one layer of material is adhered to the first surface of the sheet of material. Such at least one layer can include support layer 579, image substrate 551 or a combination of support layer 579 and image substrate 551. For example, in one embodiment the at least one layer can be the support layer 579. In another embodiment, the at least one layer can be image substrate 551, without support layer 579 or any other layer, such that image substrate 551 overlies and is adhered directly to support structure 511. In another embodiment, the at least one layer can include the support layer 579 and the image substrate 551 overlying the support layer. It is appreciated that other layers or combinations of layers can be provided for the at least one layer. When the at least one layer includes the image substrate, an image can be printed or formed on the image substrate prior to adhering the at least one layer to the sheet of material. The at least one layer is shown as image substrate 551 in FIGS. 33, 34 and 36.

In a next shaping step of the method, the sheet of material is shaped so as to correspond to the shape of the unfolded support structure to be formed. In one embodiment of the method, the sheet of material in plan is shaped into the form or a central portion having a periphery and a plurality of peripheral strips extending around the periphery. For example, if the support structure were to consist of center sheet 512 and side strips 513, the sheet would have a shape corresponding in plan to central sheet 512 and side strips 513 extending around the periphery 523 of the central sheet 512 illustrated in FIG. 33. In such example of the method, the sheet of material would correspond to central sheet 512 and side strips 513, and the first surface of the sheet would correspond to front 521 of the central sheet and outer surfaces 532 of the side strips 513. The second surface of the sheet of material would correspond to rear 522 of the central sheet and inner surfaces 531 of the side strips 513. It is appreciated that shape formed in such shaping step can vary in accordance with the size and shape of the desired support structure. Thus, for example, if a image display having an octagonal shape and plan was desired, the sheet would be formed so as to have an octagonal central portion and a plurality of eight side strips extending around such central portion.

In a next forming step of the method, a plurality of groves can be formed in the second surface of the sheet of material, that is the surface to which the at least one layer of material is not adhered, between the central portion and peripheral strips. For example, in the embodiment of a support structure consisting of a central sheet 512 and four side strips 513, four groves 581 can be formed between the central sheet 512 and the four side strips 513, that is one groove 581 between the central sheet 512 and each side strip 513. The groves 581 can be of any suitable shape. In FIG. 33, each groove 581 can have a V-shaped profile formed by the respective edge 524 of central sheet 512 and the opposing first edge 528 of the adjacent side strip 513, the opposing edges 524 and 528 extending at an angle at approximately 90° relative to each other. The at least one layer of material adhered or otherwise secured to the first surface of the sheet of material, enhances retention of the central portion and periphery strips, such as central sheet 512 and peripheral or side strips 513, together after formation of plurality of groves 581. Although the groves need not extend completely through the sheet of material, in one embodiment the groves 531 extend through the sheet of material so that the central sheet 512 and side stripes 513 are held together in registration with each other substantially solely by the at least one layer of material.

If it is desired that the support structure include a plurality of back strips, such as optional back strips 514 of support structure 511, the shaping step can additionally include shaping the sheet of material such that the sheet of material in plan additionally includes a plurality of back strips extending around the central portion alongside the respective plurality of peripheral strips. In the embodiment illustrated in FIG. 33, the sheet of material would thus have a shape in plan resembling the shape of the central sheet 512, the four side strips 513 extending alongside or around periphery 523 of the central sheet and the four back strips 514 extending alongside or around the four side strips. When such back strips are included in the support structure, the forming step can additionally include forming an additional plurality of groves 582 in the second surface of the sheet of material between the respective plurality of peripheral and side strips. In the embodiment illustrated in FIG. 33, such additional groves can consist of four additional groves 582 extending between the respective back strips 514 and side strips 513. The additional groves 582 can be substantially similar in conformation in groves 581 and may, as such, thus form respective second edges 529 of side strips 513 and opposing first edges 543 of back strips 514, each set of such edges 529 and 544 extending at an angle of approximately 90° relative to each other such that each additional grove 582 is V-shaped. In one embodiment, the additional groves 582 each extend substantially though the entire sheet of material such that the back strips 514 and side strips 513 are held in registration relative to each other substantially solely by the at least one layer of material.

In a next folding step, the peripheral strips are folded relative to the central portion at the plurality of grooves so that the peripheral strips extend end-to-end around the periphery of the central portion. For example, in FIG. 33, peripheral or side strips 513 are folded, at grooves 581, toward rear 522 of central sheet 512 until first edges 528 of the side strips 513 engage flush with edges 524 of the central sheet and thus the respective ends 526 and 527 of adjacent side strips 513 engage and the side strips extend perpendicular to rear 522 of the central sheet. The beveled edges 524 of the central sheet 512 and the beveled first edges 528 of the side strips 513 inhibit over folding of the side strips relative to the central sheet.

When the support structure additionally includes a plurality of back strips, such as back strips 514, the folding step can additionally include folding such back strips relative to the peripheral strips at the additional plurality of grooves so that the back strips extend end-to-end over the periphery of the central portion. For example, in the embodiment of support structure 511 shown in FIG. 13, back strips 514 can be folded at additional grooves 582 towards inner surface 531 of the respective side strips 513 and towards rear 522 of the central sheet 512 until the back strips 514 extend substantially parallel to central sheet 512 and respective ends 541 and 542 of adjacent back strips 514 engage each other such that the back strips extend substantially in a plane extend parallel to the central sheet 512, as illustrated in FIGS. 35-36. The beveled second edges 529 of the back strips 513 and the beveled first edges 543 of the back strips 514 inhibit over folding of the back strips relative to the side strips.

As part of the folding step of the method, each flap 566 is folded inwardly, for example at a central or other crease 583 illustrated in FIG. 35, so that the inwardly folded flap extends between the abutting ends 526 and 527 of adjoining side strips 513 and between abutting ends 541 and 542 of adjoining optional back strips 514 when the support structure 511 and image display 510 are fully formed, as illustrated in FIGS. 35-36. Such inward folding of the corners of image substrate 551 into support structure 511 advantageously provides the image display with corners 533, side surfaces 504 and a rear surface 503 that is clean in appearance and free of visible folds in the image substrate 551. In this manner, the appearance of the image substrate is enhanced.

In a next securing step of the method, the peripheral strips are secured together so that the central portion and peripheral strips forms a substantially rigid support structure. For example, in the embodiment of FIG. 33 where the support structure includes central sheet 512 and side strips 513, the side strips 513 and central sheet 512 are secured together. In one embodiment, first edges 528 of the side strips 513 are glued to respective edges 524 of the central sheet 512, and ends 526 and 527 of adjacent side strips 513 are glued or otherwise adhered together.

When the embodiment of the support structure additionally includes back strips, such as back strip 514 of support structure 511, the back strips and peripheral side strips are secured together. In one embodiment, first edges 543 of the back strips are glued or otherwise adhered to second edges 529 of the side strips 513, and ends 541 and 542 of adjacent back strips 514 are glued or otherwise adhered together.

In optional additional steps of the method, a substantially rigid back sheet can be provided and the back sheet can be securely coupled to the back strips so as to provide a closed support structure formed from the central portion, the peripheral strips, the back strips and the back sheet. For example, in the embodiment of support structure 511 shown in FIGS. 33-36, back sheet 516 can be provided and placed over back strips 514 and secured to the back strips in the manner discussed above so as to provide a closed support structure 511, for example a support structure that resembles a box. As discussed above, peripheral edges 571 of the back sheet 516 are inset, that is spaced inwardly, from outer surfaces 532 of the side strips 513.

Optional internal support 572 is placed within cavity 534 before closure of the cavity, for example by placement of sheet 516 on the rear of the support structure 511. The internal support 572 is formed, for example by a plurality of strips 573 in the manner discussed above, and secured at one end or edge to rear surface 522 of front or central sheet 512 and at its other end or edge to the rear surface of back sheet 516.

Where the at least one layer of material in the adhering step is solely support layer 579, or any other combination of layers that does not include image substrate 551, an additional step can be provided in which image substrate 551 is adhered to the support layer 579 or such other combination of layers constituting the at least one layer. The image substrate 551 can be joined to the support layer or such other combination of layers either before or after the folding step. Further, an additional step of printing or otherwise forming an image on the at least one layer of material can be provided. In one embodiment the image is formed by any suitable digital printing technique such as ink jet printing. In one embodiment in which the at least one layer includes image substrate 551, the image can be printed or otherwise formed on front surface 557 of the image substrate 551, for example print-receptive coding 556 or top surface 554 of the polymer layer 553. The image can be so printed or otherwise formed on the image substrate 551 prior to the image substrate 551 being adhered to the sheet of material, for example central sheet 512, side strips 513 and optional back strips 514, or after the image substrate is adhered or otherwise secured to such sheet of material.

It is further appreciated that the steps of the foregoing method can be sequenced in any suitable order, for example, an order other than that described above.

In operation and use, image display 501 can be utilized with any of the foregoing support surfaces discussed above. The closed-box nature of support structure 511 provides for a substantially rigid image display 501 that is aesthetically pleasing in appearance and not flimsy in weight or appearance. Internal support 572 enhances the stiffness of front sheet 512 and inhibits any warping of the sheet 512 dues to moisture or other factors. Where front sheet 512 is formed from relatively lightweight fiberboard, for example fiberboard having a thickness of approximately 0.060 inch, such relatively thin fiberboard inhibits the front sheet 512 from hardening and thus retaining any warping that may occur in the sheet as a result of moisture or other factors. The relatively lightweight fiberboard in combination with the internal support 572 contribute to the front sheet 512 and the image substrate 551 thereon remaining substantially planar throughout the life of the image display 501.

Figure 39:
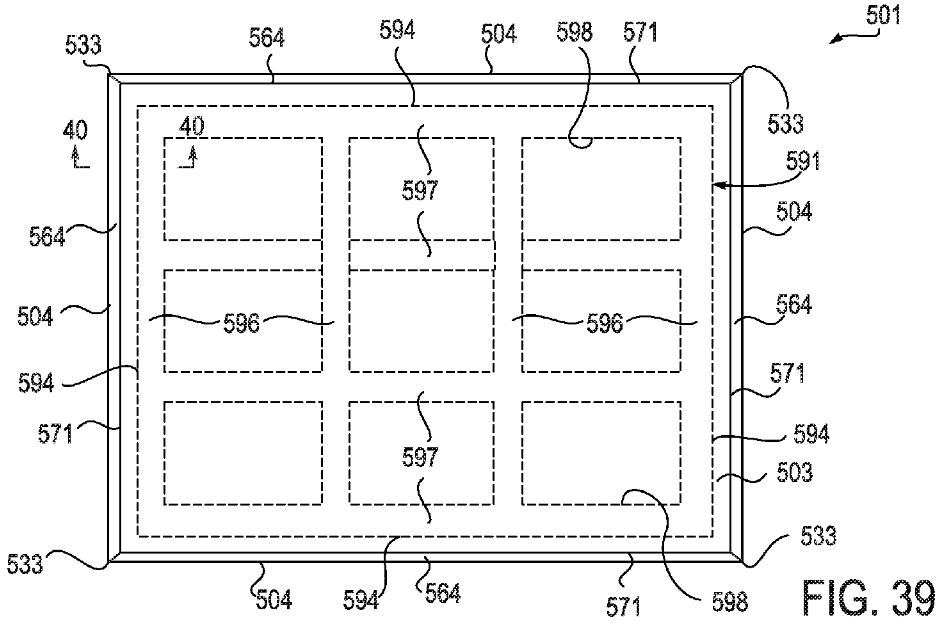
FIG. 39 is a rear plan view, similar to FIG. 35, of the assembled image display of FIG. 33 with another embodiment of the internal support.
Figure 40:
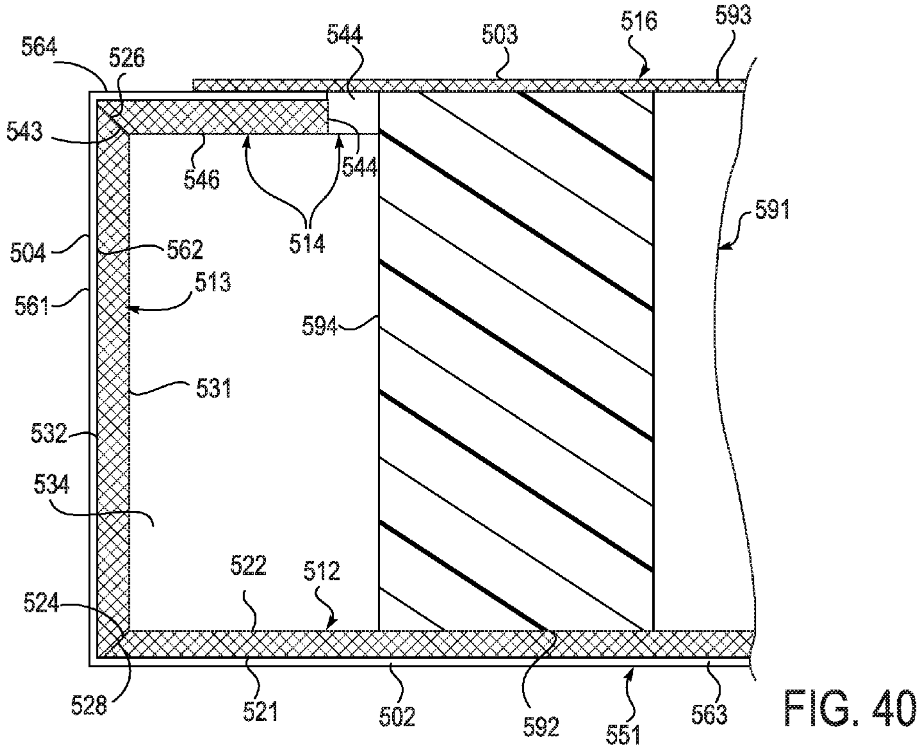
FIG. 40 is a cross-sectional view, taken along the line 40-40 of FIG. 39, of the assembled image display of FIG. 33.

Another embodiment of image display 501 is illustrated in FIGS. 39-40, and includes support structure 511 formed from central sheet 512, a plurality of peripheral or side strips 513, a plurality of optional backs strips 514 and the optional back sheet 516. In such embodiment of image display 501, the central sheet 512, side strips 513 and back strips 514 are each made from fiberboard, for example a high density fiberboard, so as to be substantially rigid. The back sheet 516 is made from paperboard, and is not substantially rigid. An optional internal support 591 can be included in internal cavity 534 of the support structure 511 for enhancing the rigidity of the front sheet 512 of the support structure 511. Although any suitable internal means or structure can be provided for enhancing the rigidity of the front sheet 512, for example similar to internal support 572, in one embodiment the internal support 591 is a suitable foam that fills all or part of the internal cavity 534. The foam serving as the internal support of the present invention can be of any suitable type and in general can be the lowest cost foam that together with the support structure 511 provides a rigid structure for supporting the image substrate 551 and thus provides the image substrate 551 as having the appearance of being stretched across a conventional stretcher bar frame. In one embodiment, the foam of internal support 591 is a suitable expanded polystyrene. In one embodiment, the expanded polystyrene has a weight not above two pounds per cubic foot. In one embodiment, the expanded polystyrene has a weight not above 0.9 pounds per cubic foot. In one embodiment, the expanded polystyrene has a weight not above 0.5 pounds per cubic foot. In another embodiment, the foam of internal support 591 is a suitable polyurethane foam. In one embodiment, the polyurethane foam has a weight not above 0.4 pounds per cubic foot. In one embodiment, the foam is a two-part polyurethane foam.

In one embodiment, foam internal support 591 has a size and shape resembling the size and shape of internal cavity 534. In the illustrated embodiment, internal support 591 has substantially the shape of a parallelepiped with a first or top planar surface 592 that engages rear 522 of central sheet 512, a second or bottom planar surface 593 that engages the rear or backside of back sheet 516, and four side surfaces 594 that can be planar and extend perpendicularly between top surface 592 and bottom surface 593. The top surface 592 can be secured to the rear 522 of the central sheet, and the bottom surface 593 secured to the rear of back sheet 516, by any suitable means such as an adhesive or glue. In one embodiment, the side surfaces do not extend to the periphery of the internal cavity 534, and instead are each spaced inwardly from the inner surface 531 of the respective side strip 513. For example, each side surface 594 can be spaced inwardly from surface 531 a distance approximately equal to the width of the respective back strip 514.

The foam internal support 591 can be solid, for example having no recesses or openings therein, or be an open structure, for example a latticework, so as to reduce the amount of foam and thus the cost of the image display 501. As illustrated, internal support 591 is a latticework or grid structure formed from a plurality of first strips 596 and second strips 597 extending perpendicular to the first strips 596. The grid structure has a plurality of openings 598 or through holes extending between surfaces 593 and 594 which can, for example, be arranged in rows and columns.

The engagement and adherence of the internal support 591 with the central sheet 512 and the back sheet 516 provides rigidity to the support structure 511, and permits the back sheet 516 to be made from a less rigid material, and thus less costly material, such as paperboard. The rigidity of the central sheet 512 is transferred to the less rigid back sheet 516 by the substantially rigid, but lightweight, internal support 591. The engagement of the internal support 591 extends substantially across the entire backs of the central sheet 512 and back sheet 516 so as to provide rigidity to substantially the entire back sheet 516. The rigid connection between the central and back sheets provides a rigid construct that inhibits side strips 513 from moving relative to the central sheet 512, thus providing a substantially rigid support structure 511, for example resembling a conventional stretcher bar frame.

Figure 41:
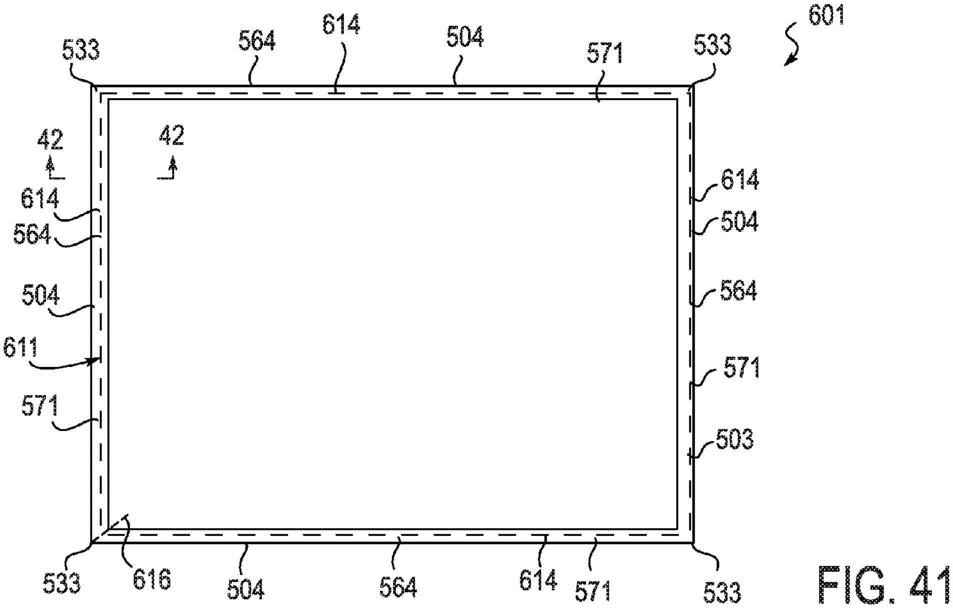
FIG. 41 is a rear plan view, similar to FIG. 39, of an assembled image display similar to the image display of FIG. 33.
Figure 42:
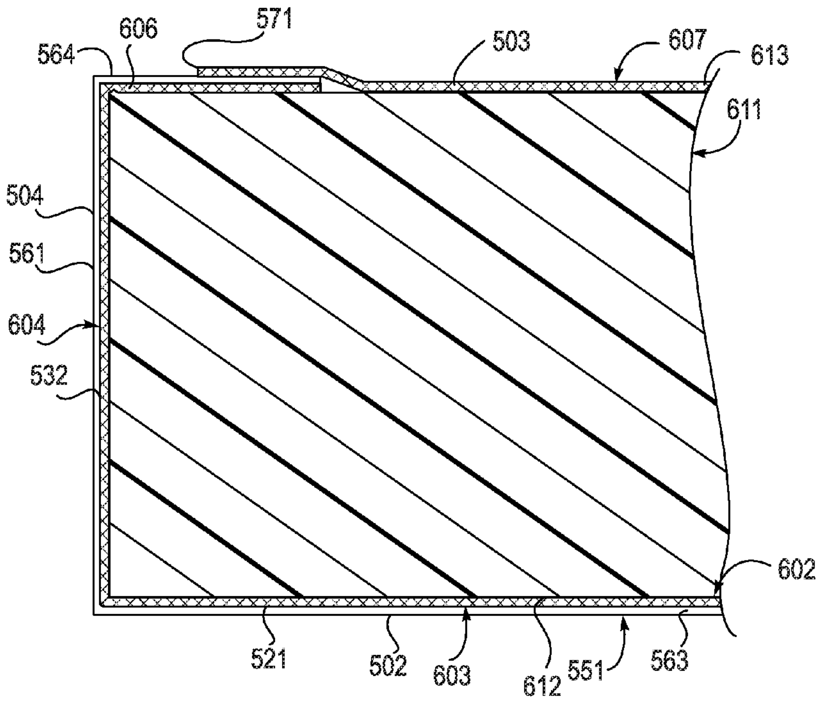
FIG. 42 is a cross-sectional view, taken along the line 42-42 of FIG. 41, of the image display of FIG. 41.

Another embodiment of an image display of the present invention is illustrated in FIGS. 41-42. Image display 601 illustrated therein can be of any suitable size and shape and material, for example as discussed above, and in one embodiment is substantially similar to image display 501. Like reference numerals have been used to describe like components, elements and features of image displays 601 and 501. Images display 601 includes a support structure 602 formed from a front or central sheet 603, a plurality of peripheral or side strips 604 and a plurality of optional backs strips 606. An optional back sheet 607 can be included in the support structure 602. Support structure 602 can be substantially rigid, but each of the central sheet 603, side strips 604, back strips 606 and back sheet 607 can be made from a substantially lightweight and not substantially rigid material such as paperboard, cardboard or plastic. In one embodiment, such elements of the support structure 602 are each made from paperboard or another suitable material of similar weight and rigidity. The paperboard or other material of the support structure 602 can be of any suitable thickness, in one embodiment has a thickness of not more than 0.060 inch. In one embodiment, such paperboard or other material has a thickness of not more than 0.030 inch. In one embodiment, such paperboard or other material has a thickness of not more than 0.014 inch.

Central sheet 603 can have a size and shape similar to central sheet 512 and can have a front surface 521, a rear surface 522 and a periphery 523 formed from a plurality of four edges 524. Side strips 604 can have a size and shape similar to side strips 513 and can have opposite ends 526 and 527, opposite side edges 528 and 529, an inner surface 531 and an outer surface 532. Back strips 606 can have a size and shape similar to back strips 514 and can have opposite ends 541 and 542, opposite edges 543 and 544, an inner surface 546 and an outer surface 547. First and second ends 541 and 542 can be mitered as discussed above.

The central sheet 603, side strips 604 and back strips 606 can be formed from a single sheet of paperboard, or similar material as discussed above, for example having a shape such as the shape of the central sheet 512, side strips 513 and back strips 514 shown in FIG. 33. Instead of beveled edges, as discussed above for sheet 512, side strips 513 and back strips 514, the adjoining edges 524 of sheet 603 and edges 528 of strips 604 can be formed from a score or similar indentation or weakening in the sheet of material so as to facilitate folding of the material at such edges. Similarly, a score or similar indentation or weakening in the sheet of material can be formed at the adjoining edges 529 of strips 604 and edges 543 of back strips 606 to facilitate folding of the material at such edges. Ends 526 and 527 of the side strips 604 need not be beveled. The support structure 602 can be formed by folding the sheet of paperboard or similar material, for example as shown in FIG. 34 and described above with respect thereto and support structure 511, to form the box-like support structure 602 having an internal cavity 534.

An optional internal support 611 can be included in internal cavity 534 of the support structure 602 for enhancing the rigidity of the front sheet 603 of the support structure 602. Although any suitable internal means or structure can be provided for enhancing the rigidity of the front sheet 603, for example similar to internal supports 572 and 591 discussed above, in one embodiment the internal support 611 is a suitable foam that fills all or part of the internal cavity 534. The foam of support 611 can be of any suitable type and in general can be the lowest cost foam that together with the support structure 602 provides a rigid structure for supporting the image substrate 551 and thus provides the image substrate 551 as having the appearance of being stretched across a conventional stretcher bar frame. The foam of internal support 611 can be any of the foams discussed above with respect to internal support 591.

In one embodiment, foam internal support 611 has a size and shape resembling the size and shape of internal cavity 534 of the support structure 602. In the illustrated embodiment, internal support 611 has substantially the shape of a parallelepiped with a first or top planar surface 612 that engages rear 522 of central sheet 603, a second or bottom planar surface 613 that engages the rear or backside of back sheet 607 and the inner surface 546 of back strips 606, and four side surfaces 614 that each engage an inner surface 531 of the respective side strip 604. The top surface 612 can be secured to the rear 522 of the central sheet, the bottom surface 613 can be secured to the rear of back sheet 607 and the inner surface 531 of the back strips 606 and the side surfaces 614 can be secured to the inner surfaces 531 of the side strips 604 by any suitable means such as an adhesive or glue.

The foam internal support 611 can be solid, for example having no recesses or openings therein, or be an open structure, for example a latticework, so as to reduce the amount of foam and thus the cost of the image display 601. For example, the foam internal support 611 can be a latticework or grid structure formed from a plurality of first strips 596 and second strips 597 extending perpendicular to the first strips 596, as discussed and illustrated above with respect to internal support 591, and have a plurality of openings 598 or through holes extending between surfaces 593 and 594 which can, for example, be arranged in rows and columns.

Image display 601 can be used with any suitable image substrate, including image substrate 551 discussed in detail above. Like image display 501, the image display 601 has a clean appearance at each of its corner 553, and in this regard is free of visible flaps or other gathered portions of the image substrate 551. As discussed above with respect to image display 501, the image substrate 551 can be cut to a size which approximates the plan size and shape of the unfolded support structure 602. A flap 566, which can be triangular in shape, extends between the end folded ends 526 and 527 of each adjacent pair of side strips 604. Each flap 566 has an outer edge 567 that is collinear with angled edges 543 and 544 of the adjacent back strips 606.

As part of the folding step of the method, each flap 566 is folded inwardly, for example at a central or other crease 583 illustrated in FIG. 35 with respect to image display 501, so that the inwardly folded flap extends between the abutting ends 526 and 527 of adjoining side strips 604 and between abutting ends 541 and 542 of adjoining optional back strips 606 when the support structure 602 and image display 601 are fully formed. Such inward folding of the corners of image substrate 551 into support structure 602 advantageously provides the image display with corners 533, side surfaces 504 and a rear surface 503 that is clean in appearance and free of visible folds in the image substrate 551. In this manner, the appearance of the image substrate is enhanced.

In one embodiment, the internal support 611 is placed on central sheet 603 before the folding together of the paperboard or other material of the support structure 602. An slit 616 can be provided at each corner of the internal support 611 for receiving the inwardly-folding flaps 566 of the image substrate 551. Each slit 616, one of which is shown schematically in FIG. 41, can between surfaces 612 and 613 of the support 611 and extend diagonally towards the center of the support 611. The back sheet 607 can be secured to the bottom surface 613 of the internal support 611 and to the back strips 606 after the folding of the support structure 602 has been complete.

The engagement and adherence of the internal support 601 with the central sheet 603, the back sheet 607, the side strips 604 and the back strips 607 provides rigidity to the support structure 602, and permits each of such elements or components of the support structure 602 to be made from a relatively non-rigid material, and thus less costly material, such as paperboard. The rigidity of support structure 602 can be similar to the rigidity of a conventional stretcher bar frame, and thus permit the image substrate 551 mounted on the support structure 602 to resemble, in appearance and robustness, an image substrate mounted on a conventional stretcher bar frame.

Any other suitable image substrate can be used with the support structures of the present invention, including the support structures described herein. In one embodiment, for example, the image substrate can be any flexible material that can be laminated to a support structure of the invention. For example, suitable image substrates include conventional photo paper. A suitable image substrate can include any metalized paper or plastic film that can be printed on, or any metal or material that looks like metal that can be printed on. For example, a suitable such image substrate can include an aluminum outer surface that can be printed on. A suitable plastic film can be a film made from polyester. In one embodiment, a suitable image substrate can be paper or another material that has a wood-textured appearance.

The support structures with image substrates mounted thereon of the invention can be used for other than image displays. For example, an image substrate having a face of a clock printed thereon can be mounted to a support structure and clock mechanics provided inside the support structure to provide a clock. It is appreciated that the invention includes any apparatus having a support structure and a image substrate laminated thereon, including an image substrate of the invention, and electrical mechanisms, mechanical mechanisms, electro-mechanical mechanism or any other mechanism provided in the support structure.

In one embodiment, the image display of the present invention can comprise an image substrate having opposite first and second surfaces and a central portion and a periphery, a digitally-printed image on the first surface, a backing having a first planar surface and an opposite second surface and an edge extending between the first planar surface and the second surface of the backing, the central portion of the second surface of the image substrate being secured to the first planar surface of the backing and the periphery of the second surface of the image substrate extending around the edge of the backing and being secured to at least a portion of the second surface of the backing.

The image substrate can include a textile-like material, and the textile-like material can include a layer of a woven textile. The material can be an artist canvas. Display hardware can be included and secured to the second surface of the backing for supporting the backing in a substantially upright position relative to a support surface, and the display hardware can include a leg for resting on the support surface. The display hardware can include a bracket for permitting the backing to be mounted to the wall. The backing can be substantially rigid. The backing can be a board and the backing can be made of a material selected from the group consisting of paperboard, cardboard, fiberboard, wood and metal. The fiberboard can include medium density fiberboard and high density fiberboard. The second surface of the backing can be planar.

In one embodiment, the image display of the present invention can be for use with a support surface and can comprise an image substrate including a textile-like material and having opposite first and second surfaces, an image printed on the first surface, a rigid backing having opposite first and second planar surfaces and an edge extending between the first and second planar surfaces of the backing, the second surface of the image substrate being secured to the first planar surface of the backing and display hardware secured to the second planar surface of the backing for supporting the backing in a substantially upright position relative to the support surface.

The display hardware can include a leg for resting on the support surface. The support surface can be a wall and the display hardware can include a bracket for permitting the backing to be mounted to the wall. The image can be a digitally-printed image. The rigid backing can be a board. The rigid backing can be made of a material selected from the group consisting of paperboard, cardboard, fiberboard, wood, metal and plastic. The textile-like material can include a layer of a woven textile. The image substrate can be an artist canvas.

In one embodiment, the image display of the present invention can comprise an image substrate including a textile-like material and having opposite first and second surfaces, an image printed on the first surface, a support structure formed from a layer of material being folded to provide a planar wall and opposite first and second side walls extending perpendicular to the planar wall and opposite first and second end walls extending perpendicular to the planar wall and the first and second side walls, the second surface of the image substrate being secured to the planar wall of the support structure so that the image extends across the planar wall and appears to be mounted on a stretcher bar frame.

The image substrate can have a central portion and a periphery, the image being printed on at least the central portion and the second surface of the periphery being secured to the first and second side walls and to the first and second end walls. The support structure can have the shape of a parallelepiped and include an additional planar wall spaced apart from the first-named planar wall and extending perpendicular to the first and second side walls and to the first and second end walls. The support structure can have an internal cavity formed by the planar wall, the additional planar wall, the first and second side walls and the first and second end walls, further comprising a filler disposed in the internal cavity, and the filler can be a foam. The filler can be a structure formed from board. The textile-like material can include a layer of woven textile. The image substrate can be an artist canvas. The first and second side walls can each have a side area and the first and second end walls can each have an end area and the planar wall can have an area greater than each of the side area and the end area. The area of the planar wall can be greater than the sum of the first and second side areas and the first and second end areas. The image display can be used with a support surface and the support structure can have a rear, display hardware can be included and secured to the rear of the support structure for supporting the support structure in a substantially upright position relative to the support surface. The display hardware can include a leg for resting on the support surface. The support surface can be a wall and the display hardware can include a bracket for permitting the backing to be mounted to the wall. The planar wall, the first and second side walls and the first and second end walls can form a cavity, and the cavity can be free of filler or bracing elements providing rigidity to the support structure. The planar wall, the first and second side walls and the first and second end walls can form a cavity, at least one bracing element can be disposed in the cavity for providing rigidity to the support structure. The support structure can be formed from a foldable material. The foldable material can be selected from the group consisting of paperboard, cardboard and plastic sheeting. The planar wall and the first and second side walls and the first and second end walls can be formed from a single sheet of material, the sheet having a fold between the planar wall and each of the first and second side walls and each of the first and second end walls.

In one embodiment, the image display of the present invention can comprise a folded structure formed from a sheet of cardboard having a central portion and opposite first and second side portions and opposite first and second end portions, the sheet of cardboard having opposite first and second surfaces, an image printed on the first surface of the central portion, each of the first and second side portions and first and second end portions being folded back towards and secured to the second surface for forming a peripheral cavity behind the central portion, and at least one stiffening element extending through each peripheral cavity for providing rigidity to the folded structure so that the image appears to be mounted on a stretcher bar frame.

The at least one stiffening element in the periphery cavity of each of the first and second side portions can have opposite ends and the at least one stiffening element in the peripheral cavity of each of the first and second end portions can have opposite ends, each end of the at least one stiffening element in the peripheral cavity of each of the first and second side portions can abut an end of the at least one stiffening element in the peripheral cavity of one of the first and second end portions. The sheet of cardboard can have a fold between the central portion and each of the first and second side portions and the first and second end portions. Each of the first and second side portions and the first and second end portions can have a flange portion for abutting against and adhering to the second surface and an additional fold between the first-named fold and the flange portion, and each of the first and second side portions and the first and second end portions can have a further fold between the first-named fold and the additional fold so that the respective peripheral cavity is rectangular in cross section. The image display can be used with a support surface and the folded structure can have a rear, and display hardware can be provided and secured to the rear of the folded structure for supporting the folded structure in a substantially upright position relative to the support surface. The support surface can be a wail and the display hardware can include a bracket for permitting the folded structure to be mounted to the wall. The image can be a digitally-printed image.

In one embodiment, the image display of the present invention can comprise an image substrate having opposite first and second surfaces, an image printed on the first surface, a folded structure having a central portion and opposite first and second side portions and opposite first and second end portions, the central portion having opposite first and second surfaces, the second surface of the image substrate being secured to the first surface of the central portion, each of the first and second side portions and first and second end portions being folded back towards and secured to the second surface of the central portion for forming a peripheral cavity behind the central portion, and at least one stiffening element extending through each peripheral cavity for providing rigidity to the folded structure so that the image appears to be mounted on a stretcher bar frame. The image substrate can include a textile-like material. The textile-like material can include a layer of woven textile. The image substrate can be an artist canvas. The folded structure can be made from a foldable material. The foldable material can be selected from the group consisting of paperboard, cardboard and plastic sheeting. Each of the first and second side portions can include a side wall extending perpendicular to the central portion and each of the first and second end portions can include an end wall extending perpendicular to the central portion, the image substrate can have a central portion and a periphery, the image can be printed on at least the central portion of the image substrate and the second surface of the periphery can be secured to the first and second side walls and to the first and second end walls. The at least one stiffening element in the periphery cavity of each of the first and second side portions can have opposite ends and the at least one stiffening element in the peripheral cavity of each of the first and second end portions can have opposite ends and each end of the at least one stiffening element in the peripheral cavity of each of the first and second side portions can abut an end of the at least one stiffening element in the peripheral cavity of one of the first and second end portions. The folded structure can have a fold between the central portion and each of the first and second side portions and the first and second end portions. Each of the first and second side portions and the first and second end portions can have a flange portion for abutting against and adhering to the second surface of the central portion and an additional fold between the first-named old and the flange portion, and each of the first and second side portions and the first and second end portions can have a further fold between the first-named fold and the additional fold so that the respective peripheral cavity is rectangular in cross section. The image display can be used with a support surface, and the folded structure can have a rear, display hardware can be provided and secured to the rear of the folded structure for supporting the folded structure in a substantially upright position relative to the support surface. The support surface can be a wall and the display hardware can include a bracket for permitting the folded structure to be mounted to the wall. The image can be a digitally-printed image. The at least one stiffening element extending through each peripheral cavity can include a set of stiffening elements having opposite ends with inclined surfaces arranged to abut the opposite ends of the adjacent stiffening elements in the set, and the at least one stiffening element extending through each peripheral cavity can include an additional set of stiffening elements having opposite ends with inclined surfaces arranged to abut the opposite ends of the adjacent stiffening elements in the set. The at least one stiffening element extending through each peripheral cavity can include a set of stiffening elements having sides and opposite square ends, the square ends of the stiffening elements in the peripheral cavity formed by one of the side portions and the end portions can abut the sides of the stiffening elements in the peripheral cavity formed by the other of the side portions and the end portions.

In one embodiment, the image display of the present invention can comprise an image substrate having a surface, an image printed on the surface of the image substrate, a plurality of elongate peripheral elements each having a side surface and opposite ends, the plurality of elongate peripheral elements arranged end-to-end to each other to form a closed peripheral structure having an internal cavity, a board element extending across the cavity and abutting the side surface of each of the elongate peripheral elements, the image substrate extending taut across the internal cavity and secured to the closed peripheral structure, the surface of the image substrate facing outwardly from the internal cavity so that the image is visible and appears to be mounted on a stretcher bar frame.

The image substrate can be spaced apart from the board element. The board element can extend perpendicular to each of the elongate peripheral elements. The board element can be free of holes extending therethrough. The board element can be provided with at least one hole extending therethrough for reducing the mass thereof. An additional board element can be provided and extend across the cavity and abut the side surface of each of the elongate peripheral elements, the additional board element being spaced apart from and extending parallel to the first-named board element. The cavity can have first and second ends, and the layer of material can extend across the first end of the cavity and the additional board element can be adjacent the second end of the cavity. The additional board element can be spaced inwardly from the second end of the cavity. The peripheral structure can include a plurality of elongate structural elements having opposite ends, and the plurality of elongate structural elements can be coupled end-to-end to each other and can extend alongside the plurality of elongate peripheral elements. The cavity can have first and second ends, and the image substrate can extend across the first end of the cavity and the plurality of elongate structural elements can extend inwardly of the plurality of elongate peripheral elements adjacent the second end of the cavity. The image substrate can include a textile-like material. The image substrate can be an artist canvas. Each of the elongate peripheral elements can be made from a material selected from the group consisting of paperboard, cardboard, fiberboard, plastic, wood and metal.

In one embodiment, a method of the present invention for assembling an image display including an image substrate with front and back surfaces and a periphery and a plurality of elongate peripheral elements and a board element is provided and comprises imparting an image on the image substrate, securing the plurality of peripheral elements to the periphery of the back surface of the image substrate, folding the image substrate such that the plurality of peripheral elements are rotated toward the back surface of the image substrate, engaging the plurality of peripheral elements with the board element spaced above the back surface of the image substrate to define a fulcrum for each of the plurality of peripheral elements, further rotating each of the plurality of peripheral elements about its respective fulcrum to tension the image substrate and thus draw the image substrate taut between the plurality of peripheral elements.

The method can include engaging the plurality of peripheral elements with an additional board element spaced above the first-named board element. The method can include securing a plurality of elongate structural elements to the periphery of the back surface of the layer of material adjacent and outside the plurality of peripheral elements, folding the layer of material such that the plurality of structural elements are rotated relative to the plurality of peripheral elements and contact the additional board element. The method can include securing the plurality of structural elements to the additional board element so as to retain the plurality of peripheral elements in position relative to the first-named board element and the additional board element and thus maintain tension in the image substrate. The plurality of peripheral elements can be side peripheral elements and the image display can further include end peripheral elements positioned between the side peripheral elements and the side and end peripheral elements can have adjacent ends, and the method can include folding the image substrate such that the end peripheral elements are rotated toward the back surface of the image substrate, the image substrate including excess material between the side peripheral elements and the end peripheral elements, and gathering the excess material and folding the excess material between the adjacent ends of the side and end peripheral elements to form a clean corner. The method can include engaging the end peripheral elements with the first-named board element to define a fulcrum for each end peripheral element, and further rotating each end peripheral element about its respective fulcrum to tension the image substrate and draw the image substrate taut between the end peripheral elements. The method can include engaging the end peripheral elements with the additional board element. The method can include securing a plurality of elongate structural elements to the periphery of the back surface of the image substrate adjacent and outside the end peripheral elements and folding the image substrate such that the plurality of structural elements are rotated relative to the end peripheral elements and contact the additional board element. The method can include securing the plurality of structural elements to the additional board element so as to retain the end peripheral elements in position relative to the first-named board element and the additional board element and thus maintain tension in the image substrate. The method can include securing an orientation device to the additional board element. The first-named and additional board elements can include corners and the image display can include corner braces formed from blanks, and the method can include forming a corner brace by folding a blank and placing the corner brace between the first-named and additional board elements at one of the corners. The plurality of peripheral elements can include longitudinally extending slots and the step of engaging the plurality of peripheral elements with a board element includes can include inserting the board element in the slots. The image display includes spacer strips, and the method can include positioning a spacer strip between the first-named and additional board elements.

The image displays described herein are inexpensive alternatives to currently-available image displays, particularly currently-available image displays utilizing stretcher bar frames. Despite the innovative and economical support structures of the image displays herein, several of such image displays have the appearance of canvas stretched over a stretcher bar frame or other more expensive support structure. The support structures of the image displays herein use less expensive materials, utilize unique configurations of support elements and are formed in processes capable of automation, thus providing a more economical yet professional looking image display. The image displays herein can simulate a stretched and taut canvas or other image substrate, thus being capable of providing a planar image. Additionally, the image displays herein can be easily scaled to accommodate both small and large images.

The image substrates herein can have the appearance of an artist's canvas, and may or may not include a woven textile layer. Where a woven textile layer is utilized, such woven textile layer can be relatively lightweight so as to be relatively inexpensive. Where a paper layer is utilized in place of a woven textile layer, further cost reductions can be provided.

The image substrates herein, and as illustrated on the support structures herein, can extend across greater or lesser portions of the support structures than as described or illustrated herein. For example, the image substrates need not extend to the rear of the support structures, need not extend to the sides of the support structures and need not extend all of the front of the support structure. The image formed on the outer surface of the image substrates herein can extend across all or any portion of such outer surface, regardless of the position of the image substrate on the respective support structure.

Each of the image substrates herein can be used with each of the support structures herein or any other support structure, including any conventional support structure such as a convention& stretcher bar frame and any support structure having the appearance of a stretcher bar frame. Each of the support structures herein can be used with any image substrate, including any conventional image substrate and any image substrate resembling artist canvas.

As used herein, the terms "front," "back," and/or other terms indicative of direction are used herein for convenience and to depict relational positions and/or directions between the parts of the embodiments. It will be appreciated that certain embodiments, or portions thereof, can also be oriented in other positions.

In addition, the term "about" should generally be understood to refer to both the corresponding number and a range of numbers. In addition, all numerical ranges herein should be understood to include each whole integer or fraction thereof within the range. While an illustrative embodiment of the invention has been disclosed herein, it will be appreciated that numerous modifications and other embodiments can be devised by those skilled in the art. Therefore, it will be understood that the appended claims are intended to cover all such modifications and embodiments that come within the spirit and scope of the present invention.

We claim:

1. An image display, comprising an image substrate having opposite first and second surfaces and a central and peripheral portions, an image printed on the first surface, a support structure including a central sheet, a plurality of side strips, a plurality of back strips and a back sheet, the central sheet having a front and a rear and a plurality of edges at its periphery and the side strips extending alongside respective edges of the central sheet at a right angle to the central sheet, the side strips having respective opposite ends extending end-to-end to form a plurality of corners, the back strips extending alongside respective side strips at a right angle to the side strips, the back strips having respective opposite ends extending end-to-end overlying the periphery of the central sheet, the central sheet, the side strips and the back strips being made of fiberboard and forming an internal cavity of the support structure and the back sheet being made of paperboard, the second surface of the image substrate overlying the front of the central sheet so that the central sheet forms a rigid backing for the central portion of the image substrate and the peripheral portions of the image substrate overlying the side strips and back strips so that the image substrate appears to be mounted on a stretcher bar frame, the back sheet overlying the cavity and the peripheral portions of the image substrate on the back strips, and securement means for rigidly coupling the back sheet to the back strips for forming a closed support structure.

2. The image display of claim 1, wherein the support structure has a plurality of side surfaces formed by the respective side strips and the back sheet is inset from the side surfaces so as to not be readily visible when the image display is viewed from the side.

3. The image display of claim 1, wherein the securement means is glue.

4. The image display of claim 1, further comprising an internal support distinct from the support structure disposed in the cavity and extending between the central sheet and the back sheet for enhancing the rigidity of the central sheet.

5. The image display of claim 4, wherein the internal support is a honeycombed structure formed from a plurality of strips extending between the central sheet and the back sheet.

6. The image display of claim 4, wherein the internal support includes a plurality of elements extending between the central sheet and the back sheet.

7. An image display, comprising an image substrate having opposite first and second surfaces and a central and peripheral portions, an image printed on the first surface, a support structure including a central sheet, a plurality of side strips, a plurality of back strips and a back sheet, the central sheet having a front and a rear and a plurality of edges at its periphery and the side strips extending alongside respective edges of the central sheet at a right angle to the central sheet, the side strips having respective opposite ends extending end-to-end to form a plurality of corners, the back strips extending alongside respective side strips at a right angle to the side strips, the back strips having respective opposite ends extending end-to-end overlying the periphery of the central sheet, the central sheet, the side strips and the back strips forming an internal cavity of the support structure, the second surface of the image substrate overlying the front of the central sheet so that the central sheet forms a rigid backing for the central portion of the image substrate and the peripheral portions of the image substrate overlying the side strips and back strips so that the image substrate appears to be mounted on a stretcher bar frame, the back sheet overlying the cavity and the peripheral portions of the image substrate on the back strips, and securement means for rigidly coupling the back sheet to the back strips for forming a closed support structure, the support structure having a plurality of side surfaces formed by the respective side strips and the back sheet being inset from the side surfaces so as to not be readily visible when the image display is viewed from the side.

8. The image display of claim 7, further comprising an internal support in the internal cavity and extending between the front sheet and the back sheet for enhancing the rigidity of the support structure.

9. The image display of claim 8, wherein the internal support is selected from a group consisting of a honeycombed structure formed from a plurality of strips extending between the central sheet and the back sheet and a plurality of elements extending between the central sheet and the back sheet.

10. The image display of claim 7, wherein the central sheet, the side strips and the back strips are made from a material selected from the group consisting of fiberboard and paperboard.

11. The image display of claim 8, wherein the internal support is secured to each of the plurality of side strips.

12. The image display of claim 11, wherein the internal support is made of foam and occupies the entire internal cavity.

13. The image display of claim 8, wherein the internal support is made of a material selected from the group consisting of paperboard and foam.

14. The image display of claim 7, wherein the image substrate includes a textile-like material.

15. The image display of claim 13, wherein the textile-like material includes to layer of woven textile.

16. The image display of claim 7, wherein the image substrate is an artist canvas.

17. An image display, comprising an image substrate having opposite first and second surfaces and a central and peripheral portions, an image printed on the first surface, a support structure including a central sheet, a plurality of side strips, a plurality of back strips and a back sheet, the central sheet having a front and a rear and a plurality of edges at its periphery and the side strips extending alongside respective edges of the central sheet at a right angle to the central sheet, the side strips having respective opposite ends extending end-to-end to form a plurality of corners, the back strips extending along respective side strips at a right angle to the side strips, the back strips having respective opposite ends extending end-to-end overlying the periphery of the central sheet, the central sheet, the side strips and the back strips being made of fiberboard and forming an internal cavity of the support structure and the back sheet being made of paperboard, the second surface of the image substrate overlying the front of the central sheet so that the central sheet forms a rigid backing for the central portion of the image substrate and the peripheral portions of the image substrate overlying the side strips and back strips, the back sheet overlying the cavity and the peripheral portions of the image substrate on the back strips, securement means for rigidly coupling the back sheet to the back strips for forming a closed support structure and for retaining the side and back strips in position relative to the central sheet and an internal support distinct from the support structure disposed in the cavity and extending between the central sheet and the back sheet for enhancing the rigidity of the central sheet.

18. The image display of claim 17, wherein the support structure has a plurality of side surfaces formed by the respective side strips and the back sheet is inset from the side surfaces so as to not be readily visible when the image display is viewed from the side.

19. The image display of claim 17, wherein the securement means is glue.

20. The image display of claim 17, wherein the internal support is secured to the central sheet and the back sheet.

21. The image display of claim 17, wherein the internal support is a honeycombed structure formed from a plurality of strips extending between the central sheet and the back sheet.

22. The image display of claim 17, wherein the internal support includes a plurality of elements extending between the central sheet and the back sheet.

23. The image display of claim 17, wherein the internal support is made of foam.

24. The image display of claim 23, wherein the internal support is secured to the central sheet and the back sheet.

25. An image display, comprising an image substrate having opposite first and second surfaces, an image printed on the first surface, a support structure including a sheet of paperboard having a central sheet with an external planar surface, a plurality of side strips folded relative to the central sheet and a plurality of back strips folded relative to the respective side strips and forming an internal cavity, the support structure including a back sheet of paperboard overlying the cavity and secured to the back strips, an internal support in the internal cavity and extending between the central sheet and the back sheet for enhancing the rigidity of the support structure, the second surface of the image substrate overlying the external planar surface of the central sheet so that the central sheet forms a rigid backing for the image substrate and the image substrate appears to be mounted on a stretcher bar frame.

26. The image display of claim 25, wherein the internal support is a honeycombed structure formed from a plurality of strips extending between the central sheet and the back sheet.

27. The image display of claim 25, wherein the internal support includes a plurality of elements extending between the central sheet and the back sheet.

28. The image display of claim 25, wherein the support structure is substantially rigid.

29. The image display of claim 25, wherein the internal support is secured to each of the plurality of side strips.

30. The image display of claim 29, wherein the internal support is made of foam and occupies the entire internal cavity.

31. The image display of claim 30, wherein the internal support is secured to the central sheet and the back sheet.

32. The image display of claim 25, wherein the internal support is made of a material selected from the group consisting of paperboard and foam.

33. The image display of claim 25, wherein the image substrate includes a textile-like material.

34. The image display of claim 33, wherein the textile-like material includes a layer of woven textile.

35. The image display of claim 25, wherein the image substrate is an artist canvas.

* * * * *